(12) United States Patent
Weindling

(10) Patent No.: US 12,417,224 B1
(45) Date of Patent: Sep. 16, 2025

(54) MISCONDUCT METRICS REPORTING GENERATION AND RENDERING ENGINE APPARATUSES, METHODS, SYSTEMS AND MEDIA

(71) Applicant: Ariel D. Weindling, Newport Beach, CA (US)

(72) Inventor: Ariel D. Weindling, Newport Beach, CA (US)

( * ) Notice: Subject to any disclaimer, the term of this patent is extended or adjusted under 35 U.S.C. 154(b) by 0 days.

(21) Appl. No.: 18/653,777

(22) Filed: May 2, 2024

Related U.S. Application Data

(63) Continuation of application No. 17/535,610, filed on Nov. 25, 2021, now Pat. No. 12,014,333, which is a continuation-in-part of application No. 17/388,444, filed on Jul. 29, 2021, now Pat. No. 11,636,434, which is a continuation of application No. 17/327,730, filed on May 23, 2021, now Pat. No. 11,521,177, said application No. 17/535,610 is a continuation-in-part of application No. 17/327,730, filed on May 23, 2021, now Pat. No. 11,521,177, which is a continuation of application No. 16/180,988, filed on Nov. 5, 2018, now Pat. No. 11,049,075.

(60) Provisional application No. 63/235,711, filed on Aug. 21, 2021, provisional application No. 62/665,653, filed on May 2, 2018, provisional application No.
(Continued)

(51) Int. Cl.
*G06F 16/248* (2019.01)
*G06F 16/242* (2019.01)
*G06F 16/2453* (2019.01)

(52) U.S. Cl.
CPC ...... *G06F 16/243* (2019.01); *G06F 16/24534* (2019.01); *G06F 16/248* (2019.01)

(58) Field of Classification Search
CPC .......................... G06F 16/248; G06F 16/2428
See application file for complete search history.

(56) References Cited

U.S. PATENT DOCUMENTS

| | | |
|---|---|---|
| 8,776,168 B1 | 7/2014 | Gibson et al. |
| 2005/0125531 A1 | 6/2005 | Singer et al. |

(Continued)

OTHER PUBLICATIONS

Rajan et al., Callisto: A Cryptographic Approach to Detect Serial Predators of Sexual Misconduct, pp. 1-10, www.projectcallisto,org, Mar. 29, 2018.
(Continued)

*Primary Examiner* — Grace Park
(74) *Attorney, Agent, or Firm* — Aleksandr Gilshteyn; Lansing Lights LLC

(57) ABSTRACT

A misconduct metrics report generation request datastructure is obtained. Misconduct metrics report parameters associated with the misconduct metrics report generation request datastructure are determined. The misconduct metrics report parameters specify a misconduct metric. A database query for the specified misconduct metric is dynamically generated. The database query operates on structured data associated with existing misconduct reports. A set of tuples resulting from execution of the dynamically generated database query is transformed into structured chart data for the specified misconduct metric. Rendered in-memory HTML is generated using an HTML template file and a chart image file generated using the structured chart data for the specified misconduct metric. A misconduct metrics report PDF file is generated using the rendered in-memory HTML.

18 Claims, 104 Drawing Sheets

EXEMPLARY WMMR SCREENSHOT

Related U.S. Application Data

62/639,706, filed on Mar. 7, 2018, provisional application No. 62/598,085, filed on Dec. 13, 2017.

(56) References Cited

U.S. PATENT DOCUMENTS

| | | |
|---|---|---|
| 2009/0235084 A1 | 9/2009 | Ferraro et al. |
| 2011/0258200 A1 | 10/2011 | Drummond |
| 2012/0291087 A1 | 11/2012 | Agrawal |
| 2015/0234837 A1 | 8/2015 | Rowe et al. |
| 2016/0314552 A1 | 10/2016 | Schobel |
| 2017/0039274 A1 | 2/2017 | Kaleta et al. |
| 2017/0359220 A1 | 12/2017 | Weith et al. |
| 2018/0033279 A1 | 2/2018 | Chong et al. |
| 2019/0074082 A1 | 3/2019 | Buckler et al. |

OTHER PUBLICATIONS

All Voices website www.allvoices.com.
StopIt! website www.stopitsolutions.com.
Tequitable website www.tequitable.com.
JDoe website www.jdoe.io.
Vault Platform website www.vaultplatform.com.
Spot website www.talktospot.com.
"Can an app get victims to anonymously report workplace harassment?", Bloomberg News. Jun. 20, 2017 (retrieved at: https://financialpost.com/executive/careers/can-apps-get-victims-to-report-workplace-harassment).
Clancy, Kathryn B. H. • Nelson, Robin G. • Rutherford, Julienne N. • Hinde, Katie. "Survey of Academic Field Experiences (SAFE): Trainees Report Harassment and Assault". Jul. 16, 2014. https://doi.org/10.1371/journal.pone.0102172.
International Search Report for international application No. PCT/US2019/030334. Jul. 19, 2019.

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR SCREENSHOT

FIGURE 44A

Report ID: #128

Status: Done

Date: Aug 16, 2018

John

Are you reporting on your behalf or as a witness?

( Self )

Are you reporting about behaviors that took place at your current or former employer?

( Current )

Please provide us with the name of the employer you are reporting about.

( Employer )

Please provide us with the full name of your last supervisor.

( Didier )

Please provide us with the address (or work location)

EXEMPLARY WMMR SCREENSHOT

EXEMPLARY WMMR SCREENSHOT

FIGURE 44 C

EXEMPLARY WMMR SCREENSHOT

FIGURE 44 D

WHEN

Indicate the time and date of when the incident(s) occurred.

(Over social media) (Bathroom)

(Aug 16, 2018) (Aug 16, 2018)

Is the behavior you are reporting still ongoing?

(Yes)

WHO

Please provide us with the name of the alleged harasser.

(Didier)

Please provide us with his / her job title / position.

(CFO)

Do you report directly / indirectly to him / her?

EXEMPLARY WMMR SCREENSHOT

Is he / she your supervisor?

Yes

Did anyone witness any of the incident(s) you are reporting?

Yes

Was / were the witness(es) an employee(s)?

Yes

If the witness(es) was / were an employees, what is his / her / their job title(s) / position(s)?

N/A

Please provide us with the name(s) of the witness(es).

Will

Please provide us with the contact information (phone number and email address if you have them)

EXEMPLARY WMMR SCREENSHOT

FIGURE 44 F

> #NotMe Journal ( Yes )

Was / were the witness(es) an employee(s)?

( Yes )

If the witness(es) was / were an employees, what is his / her / their job title(s) / postion(s)?

( N/A )

Please provide us with the name(s) of the witness(es).

( Will )

Please provide us with the contact information (phone number and email address if you have them) of the witness(es).

( 315-111-1111 )

( SUBMIT REPORT )

EXEMPLARY WMMR SCREENSHOT

EXEMPLARY WMMR SCREENSHOT

EXEMPLARY WMMR SCREENSHOT

FIGURE 49 — EXEMPLARY WMMR SCREENSHOT

FIGURE 50
What
Select the behavior(s), issue(s), or sentiment(s) you would like to report or share:
1/3
 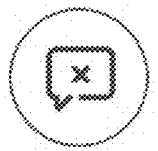 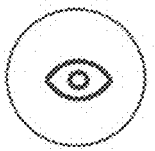 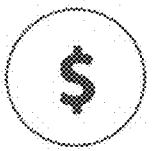 
Physical    Verbal    Visual    Financial
Blocked    Followed
Forced or undesired sexual intercourse
Groping    Hugging
Inappropriate physical contact
Kissing    Leering
Made inappropriate or obscene sexual gestures
< Back    
EXEMPLARY WMMR SCREENSHOT

FIGURE 51

📶 T-Mobile Wi-Fi 🛜      4:11 PM              73% 🔋

What

Select the behavior(s), issue(s), or sentiment(s) you would like to report or share:

1/3

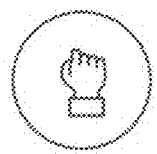  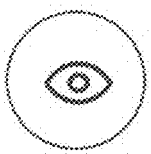 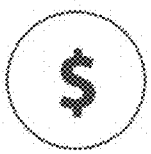 

Physical    Verbal    Visual    Financial    Hea
                                              Sa ( Belittled )    ( Bullying )    ( Coercion )

( Comments about appearance, clothing or body parts )

( Encouraged others to behave in a racist way )

( Expressions of sexual interests )

( Inappropriate advances )

( Inappropriate compliments )

< Back                         

EXEMPLARY WMMR SCREENSHOT

FIGURE 52

.ıll T-Mobile Wi-Fi 🛜    4:12 PM        73% 🔋

What

Select the behavior(s), issue(s), or sentiment(s) you would like to report or share:

1/3

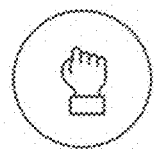 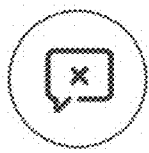 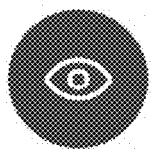 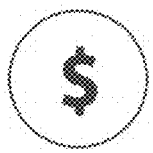 

Physical    Verbal    Visual    Financial    Hea
                                              Sa ( Displayed/shared sexual content or objects )

( Sent suggestive content )

( Shared inappropriate content )

( Shared private content without consent )

( Stared in a sexually suggestive manner )

< Back                                    

EXEMPLARY WMMR SCREENSHOT

FIGURE 53

▪ T-Mobile Wi-Fi 🛜  4:12 PM  73% 🔋

What

Select the behavior(s), issue(s), or sentiment(s) you would like to report or share:

1/3

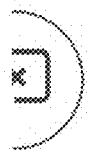 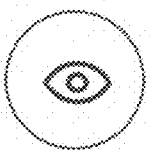  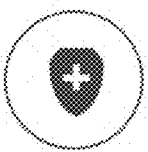 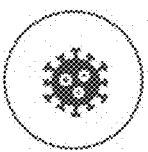

·bal    Visual    Financial    Health &    COVID-19  R·
                               Safety ( Bribery )   ( Corruption )

( Embezzlement )

( Failure to pay meal/rest breaks )

( Failure to pay wages/benefits )

( Falsifying and/or manipulating financial reporting information )

( Falsifying expense report )

〈 Back    

EXEMPLARY WMMR SCREENSHOT

FIGURE 54
EXEMPLARY WMMR SCREENSHOT

FIGURE 55

.ıll T-Mobile Wi-Fi  4:12 PM  73%

What

Select the behavior(s), issue(s), or sentiment(s) you would like to report or share:

1/3

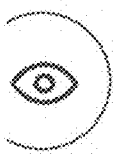 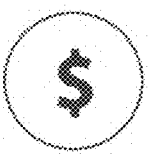 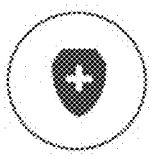 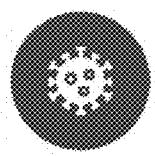 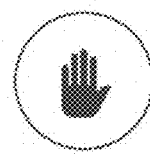

Visual   Financial   Health & Safety   COVID-19   Retaliation ( Denied meal/rest breaks )

( Denied medical attention despite exhibiting symptoms )

( Denied time off to care for a close relative who is at risk )

( Denied vacation/PTO time while on furlough )

( Discriminated against for being Asian or of Asian decent )

< Back

EXEMPLARY WMMR SCREENSHOT

FIGURE 56
📶 T-Mobile Wi-Fi 🛜   4:12 PM        73% 🔋
What
Select the behavior(s), issue(s), or sentiment(s) you would like to report or share:
1/3
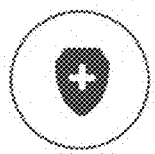 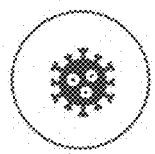 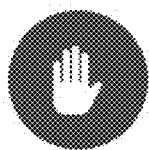 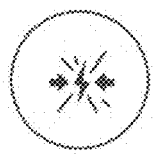 
Health &    COVID-19   Retaliation   Conflict of    Priv
Safety                                       interest
( Decrease in pay )
( Decrease in work hours )
( Demotion )
( Engaged in verbal or physical abuse )
( Excluded from meetings )
( Hindering company investigation )
< Back                            
EXEMPLARY WMMR SCREENSHOT

FIGURE 57

What

Select the behavior(s), issue(s), or sentiment(s) you would like to report or share:

1/3

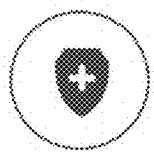 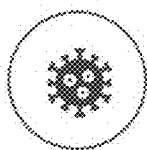 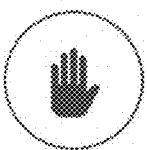 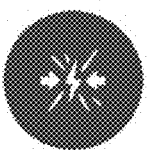 

Health & Safety   COVID-19   Retaliation   Conflict of interest   Priva

- Accepting gifts/entertainment from vendor/supplier
- Doing business with/hiring family/close friend
- Romantic/close relationship with co-worker
- Starting, working for, making significant investments in, or advising a competing business
- Working for, making significant < Back 

EXEMPLARY WMMR SCREENSHOT

FIGURE 58
What
Select the behavior(s), issue(s), or sentiment(s) you would like to report or share:
1/3
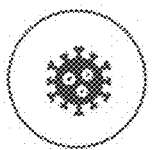 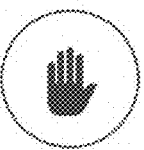 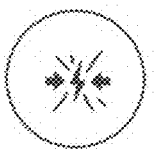 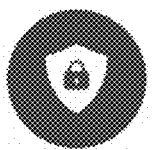 
COVID-19   Retaliation   Conflict of interest   Privacy   Vendor Suppli
Breaching customer or consumer privacy expectations
Breaching worker privacy expectations
Violation of the company confidentiality expectations
Other
< Back    
EXEMPLARY WMMR SCREENSHOT FIGURE 59
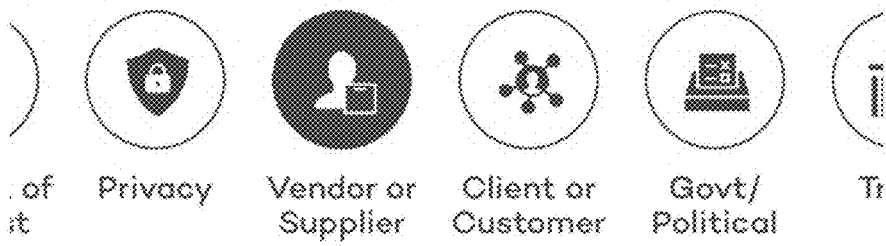
EXEMPLARY WMMR SCREENSHOT

EXEMPLARY WMMR SCREENSHOT

EXEMPLARY WMMR SCREENSHOT

EXEMPLARY WMMR SCREENSHOT

EXEMPLARY WMMR METRICS REPORT DATA STRUCTURE GENERATING (MRDSG) COMPONENT

EXEMPLARY WMMR SCREENSHOT

EXEMPLARY WMMR SCREENSHOT

FIGURE 67B
Reports Created Per Company
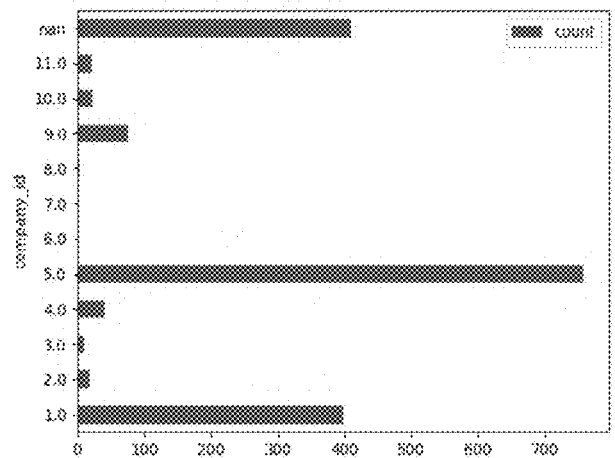
Report Status Breakdown
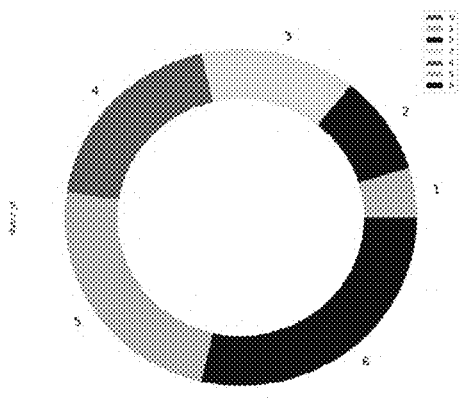
EXEMPLARY WMMR SCREENSHOT

EXEMPLARY WMMR SCREENSHOT

FIGURE 68A
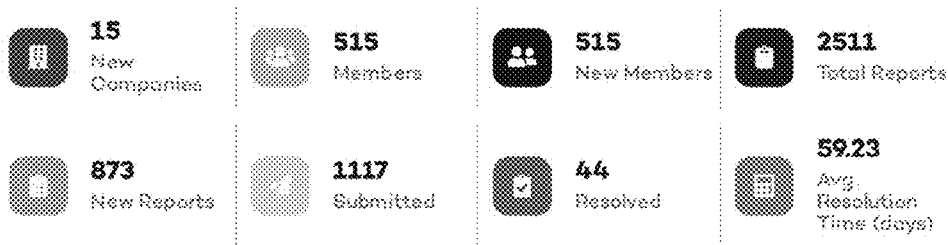
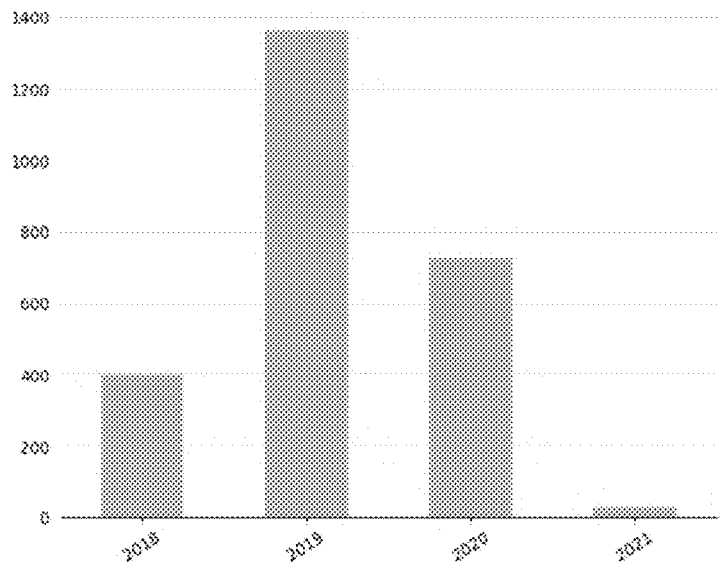
EXEMPLARY WMMR SCREENSHOT

FIGURE 68B
Report Status Breakdown
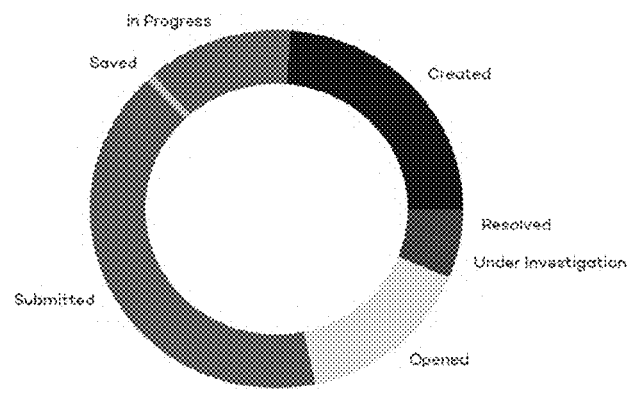
What is being reported
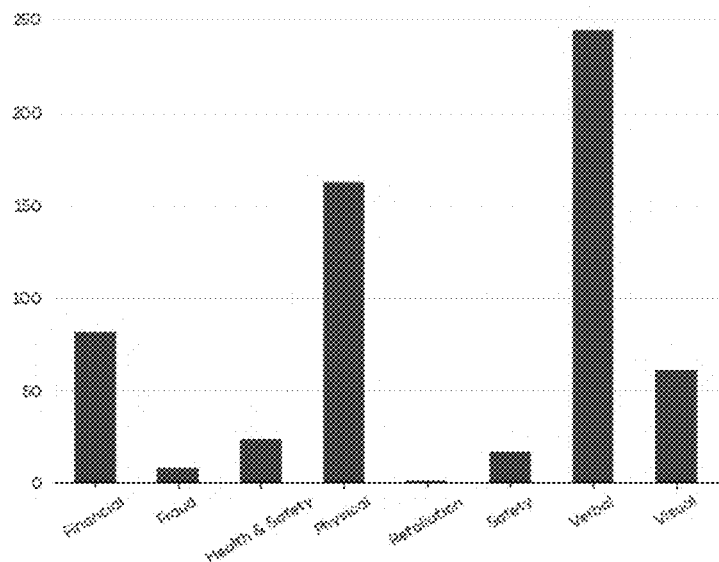
EXEMPLARY WMMR SCREENSHOT FIGURE 68 C
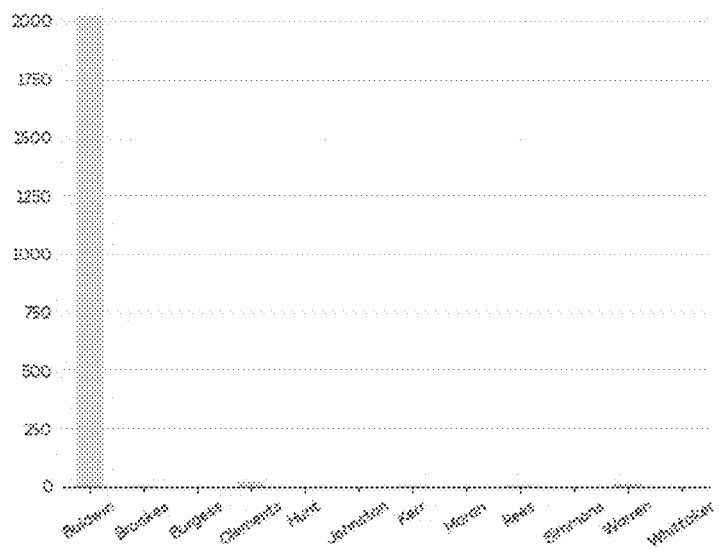
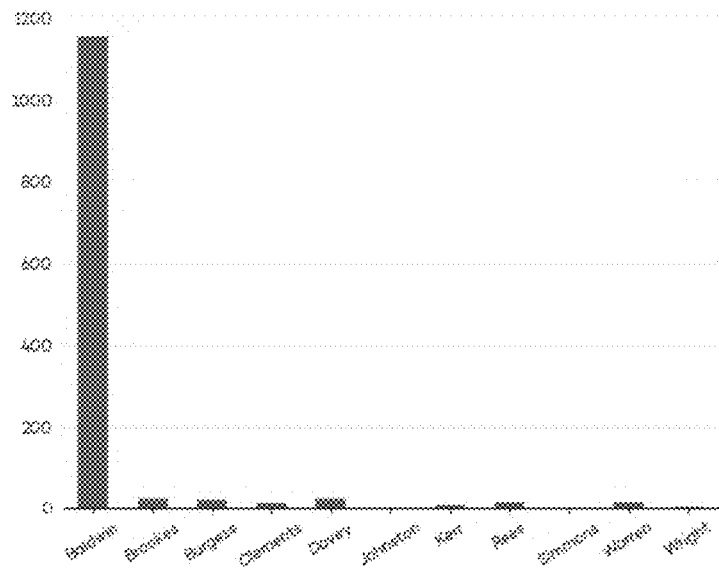
EXEMPLARY WMMR SCREENSHOT

EXEMPLARY WMMR SCREENSHOT

EXEMPLARY WMMR SCREENSHOT

FIGURE 69B
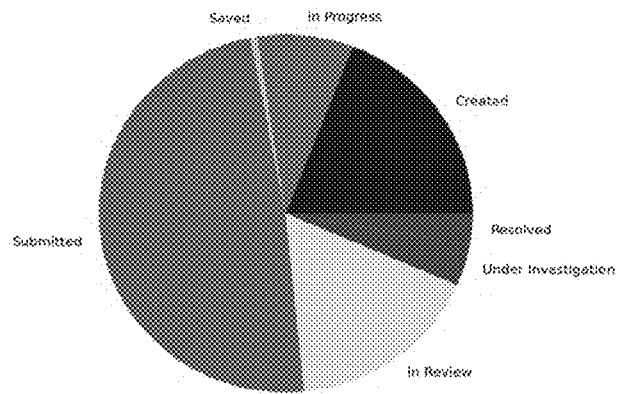
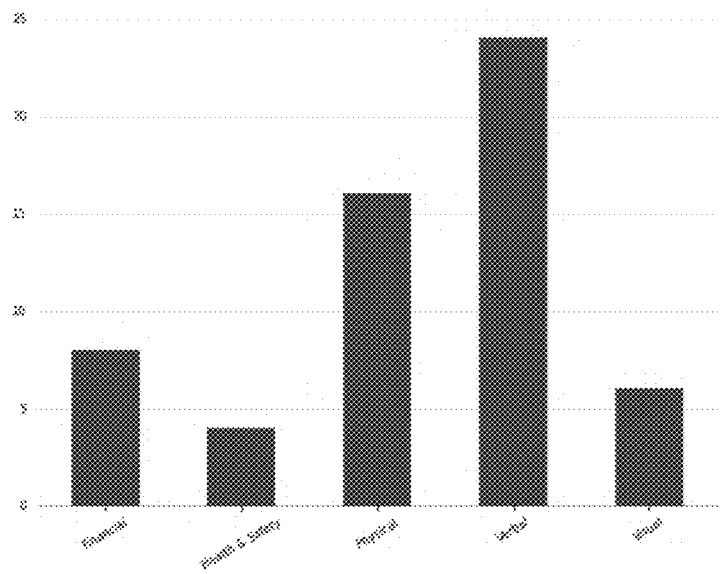
EXEMPLARY WMMR SCREENSHOT

EXEMPLARY WMMR SCREENSHOT

EXEMPLARY WMMR SCREENSHOT

FIGURE 70B
Report Status Breakdown
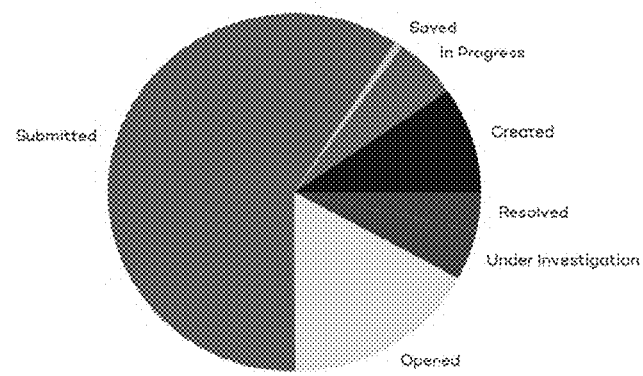
What is being reported
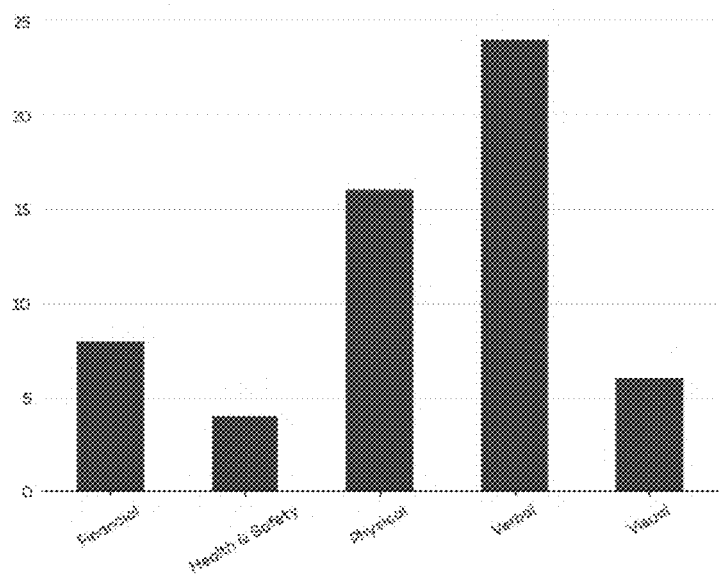
EXEMPLARY WMMR SCREENSHOT

EXEMPLARY WMMR SCREENSHOT

FIGURE 71A
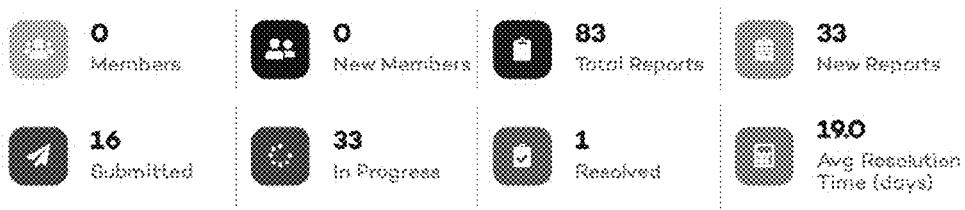
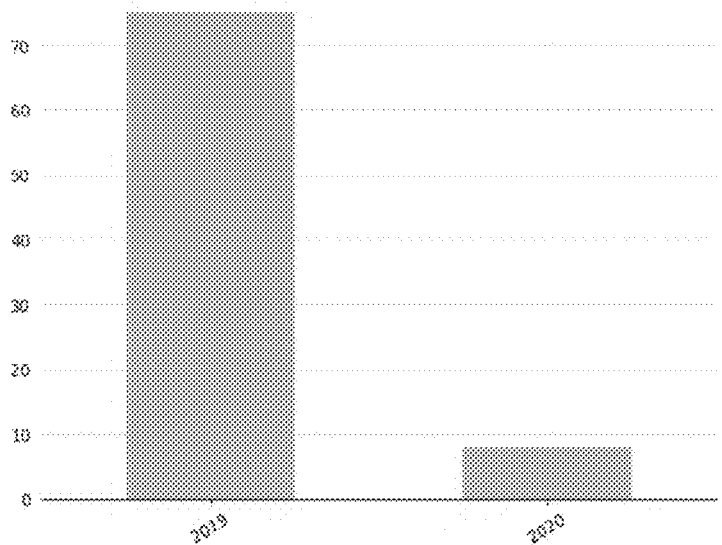
EXEMPLARY WMMR SCREENSHOT

FIGURE 71B
Report Status Breakdown
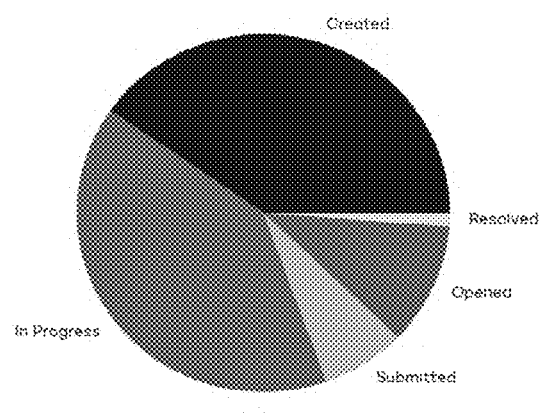
What is being reported
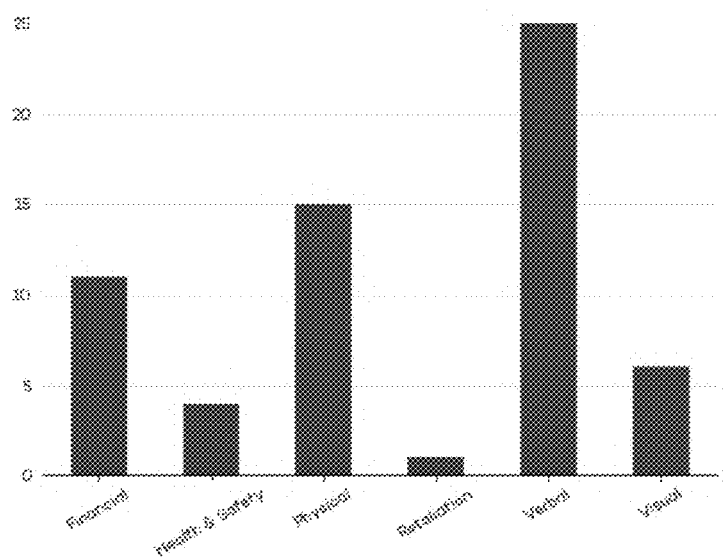
EXEMPLARY WMMR SCREENSHOT FIGURE 71 C
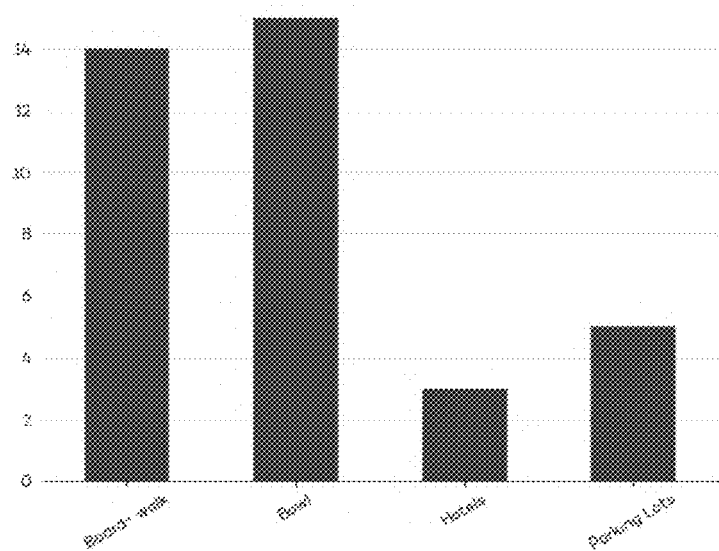
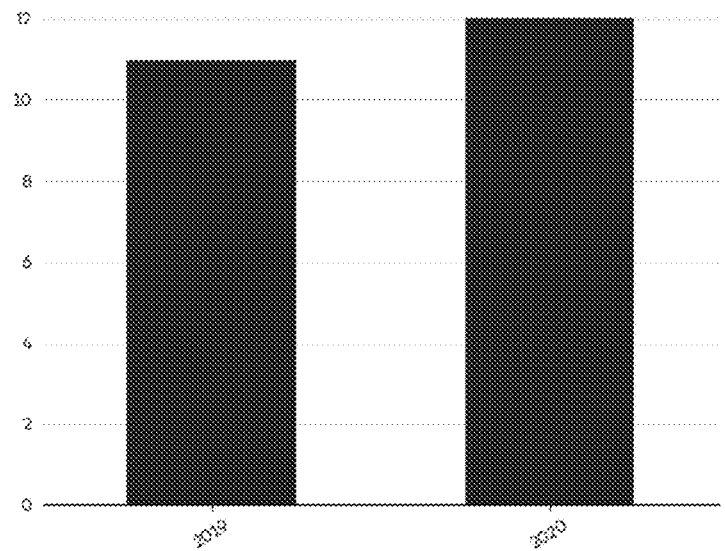
EXEMPLARY WMMR SCREENSHOT

EXEMPLARY WMMR SCREENSHOT

FIGURE 72B
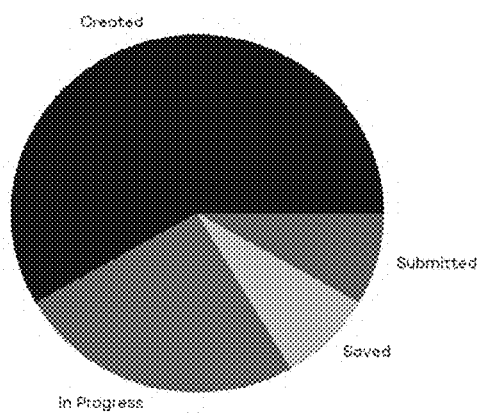
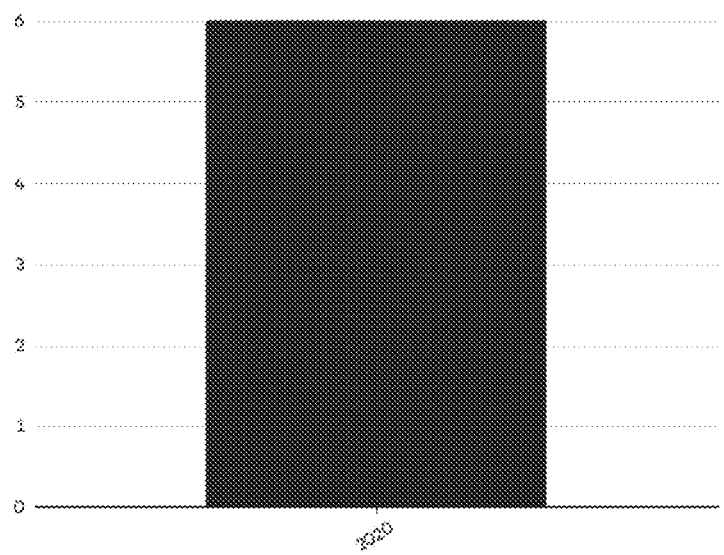
EXEMPLARY WMMR SCREENSHOT

FIGURE 73A

| Report / Report Purpose | Attributes | Relevant Info |
|---|---|---|
| 1 Overview of reports submitted from the current year. | Current status of reports<br>Top reported key areas<br>Resolution time | Date picker for the user to choose but default to current year. |
| 2 Trends of what is happening over time | Report submissions<br>Basic reporter information<br>Outcome information | Date picker for the user to choose but default to current year.<br>Date picker for the user to choose but default to current year. |
| 3 All or Industry-specific | Top reported key areas | Ability to choose the industry or all. |
| 4 Desired Outcomes | Requested outcome vs. Actual outcome | Date picker for the user to choose but default to current year.<br>Ability to choose the industry or all. |
| 5 Location | Top reported key areas | In which state, office location, etc. do we have the most cases for x |
| 6 Type of people that are reporting | Hierarchy Level | Entry level, upper management, etc. |
| 7 The type of people they are reporting | Hierarchy Level | Entry level, upper management, co-worker vs. superior, etc. |
| 8 % Increase of reports due to illness (e.g., COVID-19) | Report submissions<br>Basic reporter information<br>Outcome information | Since the start of COVID-19 (March), what are the % increase on these reports |
| 9 % Increase of reports due to Race | Report submissions<br>Basic reporter information<br>Outcome information | Since the start of BLM, what are the % increase on these reports |
| 10 Virtual vs. in-office misconduct | Virtual vs. in-office misconduct | What are the percentage between both virtual vs. in-office and has virtual misconduct increased. |
| 11 % Increase of reports due to Mental Health | Report submissions<br>Basic reporter information<br>Outcome information | During a time period (e.g., since 2020), have mental health reports increased and since when? |

EXEMPLARY WMMR IMPLEMENTATION CASE

FIGURE 73B

| Field Name | Selections | Notes |
|---|---|---|
| Start Date | Calendar | Ability to choose high level (all) or down to the individual answers. |
| End Date | Calendar | A counter next each answer to know how many selections there were. |
| Status | Low | |
| | Medium | |
| | High | |
| Reporter Type | Self | |
| | Witness | |
| Feelings | <Answers> | |
| Desired Outcome | <Answers> | |
| Behaviors/Issues/Sentiments | <Each category> | <Each answer> |
| Traits | <Answers> | |
| Previously Reported | <Answers> | |
| Where It Occurred | <Each category> | <Each answer> |
| Behavior Occuring | Yes | |
| | No | |
| Accused Name | <Answers> | |
| Direct Report | Yes | |
| | No | |
| | Indirect | |

EXEMPLARY WMMR IMPLEMENTATION CASE

FIGURE 73 C

| Name: | #NotMe Standard Report 1 | |
|---|---|---|
| # of Reports Submitted 2020: | | 54 |
| Average Report Time From Submitted to Resolved: | 5 days 10 hours 23 minutes | |
| Current Status: | Resolved | 35 |
| | Under Investigation | 15 |
| | Opened | 3 |
| | Submitted | 1 |
| # of reports non-management accused: | | 18 |
| # of reports management accused: | | 4 |
| # of reports requiring disciplinary action: | | 13 |
| Top 5 Reported WHAT categories: | COVID19: Not provided PPE | 10 |
| | Verbal: Inappropriate Jokes | 8 |
| | Physical: Blocked Me | 5 |
| | Physical: Touching | 3 |
| | Visual: Sent suggestive Content | 3 |
| Top 5 Reported WHERE categories: | In the workplace: Desk | 8 |
| | In the workplace: Break room | 6 |
| | Out of the workplace: Work related event | 3 |
| | In the workplace: Cubicle | 3 |
| | Other: Elevator | 2 |
| Top 5 Reported Protected Traits: | Age | 6 |
| | Race | 3 |
| | Sexual Orientation | 2 |
| | Sex | 2 |
| | Medical condition | 1 |

EXEMPLARY WMMR IMPLEMENTATION CASE

FIGURE 73 D

| Name: #NotMe Standard Report 2 | | | | | |
|---|---|---|---|---|---|
| Q3 | | | Q4 | | % Increase |
| # of reports | 5 | | # of reports | 16 | 220 |
| # of reports non-management accused | 18 | | # of reports non-management accused | 9 | -50 |
| # of reports management accused | 4 | | # of reports management accused | 6 | 50 |
| # of reports requiring disciplinary action | 13 | | # of reports requiring disciplinary action | 4 | -69 |

EXEMPLARY WMMR IMPLEMENTATION CASE

FIGURE 73E

| Name: | #NotMe Standard Report 3 | | Date/Time Ran: | 6/29/2022 10:20:42 |
|---|---|---|---|---|
| Industry: | Legal | | # of reports submitted: | 98 |
| Top 5 Reported WHAT categories: | COVID19: Not provided PPE | 10 | Date Range: | Q3 |
| | Verbal: Inappropriate Jokes | 8 | | |
| | Physical: Blocked Me | 5 | | |
| | Physical: Touching | 3 | | |
| | Visual: Sent suggestive Content | 3 | | |
| Top 5 Reported WHERE categories: | In the workplace: Desk | 8 | | |
| | In the workplace: Break room | 6 | | |
| | Out of the workplace: Work related event | 3 | | |
| | In the workplace: Cubicle | 3 | | |
| | Other: Elevator | 2 | | |
| Top 5 Reported Protected Traits: | Age | 6 | | |
| | Race | 3 | | |
| | Sexual Orientation | 2 | | |
| | Sex | 2 | | |
| | Medical condition | 1 | | |

EXEMPLARY WMMR IMPLEMENTATION CASE

FIGURE 73 F

| Name: | #NotMe Standard Report 4 | | Date/Time Ran: | 6/29/2022 10:20:42 | |
|---|---|---|---|---|---|
| Industry: | ALL | | # of reports submitted: | 98 | |
| | | | Date Range: | Q3 | |
| Desired Outcome: | | | Actual Outcome: | | Difference: |
| An apology | 5 | | An apology | 5 | 0 |
| Be assigned a new supervisor or team | 9 | | Be assigned a new supervisor or team | 3 | 6 |
| Behavior to stop | 12 | | Behavior to stop | 10 | 2 |
| Be safe | 3 | | Be safe | 3 | 0 |
| Have the accused receive counseling | 4 | | Have the accused receive counseling | 1 | 3 |
| Have the organization conduct an investigation | 31 | | Have the organization conduct an investigation | 30 | 1 |
| Help with stress management | 10 | | Help with stress management | 8 | 2 |
| Protection | 7 | | Protection | 7 | 0 |
| Provided sufficient PPE | 4 | | Provided sufficient PPE | 4 | 0 |
| Receive counseling | 8 | | Receive counseling | 4 | 4 |
| Work from home, if possible | 5 | | Work from home, if possible | 2 | 3 |
| | | | Other | 25 | -25 |

EXEMPLARY WMMR IMPLEMENTATION CASE

EXEMPLARY WMMR COORDINATOR

MISCONDUCT METRICS REPORTING GENERATION AND RENDERING ENGINE APPARATUSES, METHODS, SYSTEMS AND MEDIA

This disclosure describes MISCONDUCT METRICS REPORTING GENERATION AND RENDERING ENGINE APPARATUSES, METHODS, SYSTEMS AND MEDIA (hereinafter "WMMR"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

CROSS-REFERENCE TO RELATED APPLICATIONS

This is a Continuation of prior U.S. patent application Ser. No. 17/535,610, filed Nov. 25, 2021, entitled "MISCONDUCT METRICS REPORTING GENERATION AND RENDERING ENGINE APPARATUSES, METHODS, SYSTEMS AND MEDIA", to which priority under 35 U.S.C. § 120 is claimed, and which:
  a. is a Continuation-In-Part of prior U.S. patent application Ser. No. 17/388,444, filed Jul. 29, 2021, entitled "VICTIM REPORTING AND NOTIFICATION SYSTEM AND ALERT MECHANISM FOR ORGANIZATIONS", to which priority under 35 U.S.C. § 120 is claimed, and which is a Continuation of prior U.S. patent application Ser. No. 17/327,730, filed May 23, 2021, entitled "VICTIM REPORTING AND NOTIFICATION SYSTEM AND ALERT MECHANISM FOR ORGANIZATIONS,", to which priority under 35 U.S.C. § 120 is claimed, and which is a Continuation of prior U.S. patent application Ser. No. 16/180,988, filed Nov. 5, 2018, entitled "VICTIM REPORTING AND NOTIFICATION SYSTEM AND ALERT MECHANISM FOR ORGANIZATIONS," to which priority under 35 U.S.C. § 120 is claimed, and which claims the benefit of U.S. Provisional Application Ser. Nos. 62/598,085, entitled "VICTIM REPORTING SYSTEM," filed Dec. 13, 2017, 62/639,706, entitled "VICTIM REPORTING SYSTEM," filed Mar. 7, 2018, 62/665,653, entitled "VICTIM REPORTING SYSTEM," filed May 2, 2018.
  b. is a Continuation-In-Part of prior U.S. patent application Ser. No. 17/327,730, filed May 23, 2021, entitled "VICTIM REPORTING AND NOTIFICATION SYSTEM AND ALERT MECHANISM FOR ORGANIZATIONS,", to which priority under 35 U.S.C. § 120 is claimed, and which is a Continuation of prior U.S. patent application Ser. No. 16/180,988, filed Nov. 5, 2018, entitled "VICTIM REPORTING AND NOTIFICATION SYSTEM AND ALERT MECHANISM FOR ORGANIZATIONS,", to which priority under 35 U.S.C. § 120 is claimed, and which claims the benefit of U.S. Provisional Application Ser. Nos. 62/598,085, entitled "VICTIM REPORTING SYSTEM," filed Dec. 13, 2017, 62/639,706, entitled "VICTIM REPORTING SYSTEM," filed Mar. 7, 2018, 62/665,653, entitled "VICTIM REPORTING SYSTEM," filed May 2, 2018.
  c. claims priority under 35 U.S.C. § 119 to United States provisional patent application No. 63/235,711, filed Aug. 21, 2021, entitled "WORKPLACE MISCONDUCT REPORTING GENERATION AND RENDERING ENGINE APPARATUSES, METHODS, SYSTEMS AND MEDIA".

The entire contents of the aforementioned applications are herein expressly incorporated by reference in their entirety.

FIELD

The present disclosure is directed generally to reporting and rendering engines.

BACKGROUND

Unlawful sexual harassment, long a problem in the workplace, has become the most visible employment issue in corporate America. In 2016, more than 13,000 administrative EEOC (Equal Employment Opportunity Commission) charges alleged sex-based harassment. 1 in 4 women will be the victim of sexual harassment in the workplace. The EEOC also estimates that 75% of those who are victims of these hostile work environments do not report their harassment.

Ultimately, very few instances of harassment are reported. It is believed the limited reporting is a result of the fact that employees don't know who is to blame, employees worry about immediate repercussions and consequences, PTSD ("Post-Traumatic Stress Disorder") and trauma, and employees do not necessarily know they are being harassed. The bottom line is that reporting instances of harassment is not easy for victims.

As such, an easy, safe, convenient, and un-shameful mechanism for reporting instances of harassment is needed.

Additionally, reporters of unlawful conduct need in certain cases to be connected with counseling (psychologists, lawyers, etc.) and representation to understand their rights and deal with such conduct.

Conversely, employers need to know right away when a report of harassment and/or discrimination or other conducts or behaviors they do not want to see in their workforce has happened so that they can act, protect the victim, investigate and comply with their legal obligations.

BRIEF DESCRIPTION OF THE FIGURES

The accompanying figures and/or appendices illustrate various exemplary embodiments in accordance with the present disclosure.

FIG. 50 shows screenshot diagram(s) illustrating examples of misconduct that may be reported using the reporting app in one embodiment of the WMMR;

FIG. 51 shows screenshot diagram(s) illustrating examples of misconduct that may be reported using the reporting app in one embodiment of the WMMR;

FIG. 52 shows screenshot diagram(s) illustrating examples of misconduct that may be reported using the reporting app in one embodiment of the WMMR;

FIG. 53 shows screenshot diagram(s) illustrating examples of misconduct that may be reported using the reporting app in one embodiment of the WMMR;

FIG. 54 shows screenshot diagram(s) illustrating examples of misconduct that may be reported using the reporting app in one embodiment of the WMMR;

FIG. 55 shows screenshot diagram(s) illustrating examples of misconduct that may be reported using the reporting app in one embodiment of the WMMR;

FIG. 56 shows screenshot diagram(s) illustrating examples of misconduct that may be reported using the reporting app in one embodiment of the WMMR;

FIG. 57 shows screenshot diagram(s) illustrating examples of misconduct that may be reported using the reporting app in one embodiment of the WMMR;

FIG. 58 shows screenshot diagram(s) illustrating examples of misconduct that may be reported using the reporting app in one embodiment of the WMMR;

FIG. 59 shows screenshot diagram(s) illustrating examples of misconduct that may be reported using the reporting app in one embodiment of the WMMR;

FIGS. 71A-C show screenshot diagram(s) illustrating an exemplary metrics report in one embodiment of the WMMR;

FIGS. 72A-B show screenshot diagram(s) illustrating an exemplary metrics report in one embodiment of the WMMR;

FIGS. 73A-F show implementation case(s) in one embodiment of the WMMR;

DETAILED DESCRIPTION

Introduction

Figure 1A:
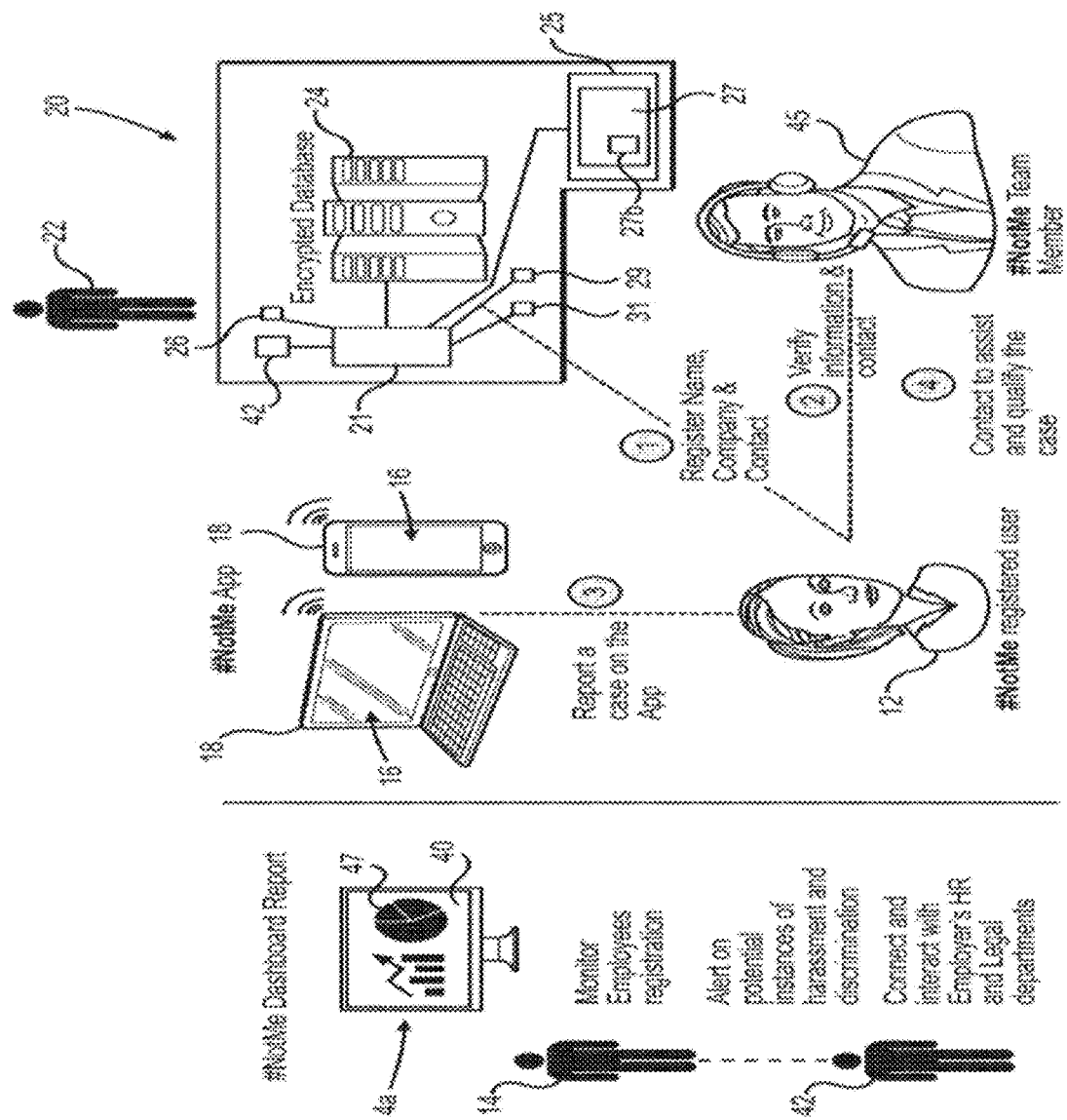
FIG. 1A shows an exemplary architecture schematic in one embodiment of the WMMR.

The WMMR introduces a metrics reporting and rendering engine that avoids the use of hardcoded SQL queries to generate misconduct metrics reports by utilizing a query builder to generate custom queries, and generates PDF versions of misconduct metrics reports faster and more efficiently by avoiding a write to disk when converting in-memory generated HTML to PDF.

DETAILED DESCRIPTION OF THE WMMR

Detailed embodiments of the WMMR are disclosed herein. It should be understood, however, that the disclosed embodiments are merely exemplary. Therefore, the details disclosed herein are not to be interpreted as limiting, but merely as a basis for teaching one skilled in the art how to make and/or use the WMMR.

With reference to the figures, and as will be explained below in greater detail, a victim reporting and notification system 10 in accordance with the WMMR provides a mechanism whereby one can safely, easily and anonymously (or not) report conduct that is believed to constitute harassment, bullying and/or discrimination. As the drawings accompanying the present disclosure show, the victim reporting and notification system 10 is operating under the name #NotMe™, and this term is used on various drawings. While the victim reporting and notification system 10 offers many tools applicable to workplace harassment and/or discrimination as a mechanism for protecting employees 12 who are the victims of workplace harassment and/or discrimination and assisting employers 14 in protecting their employees, it is fully appreciated harassment and/or discrimination occur in a wide variety of environments, for example, nursing homes, clubs and organizations, homes, schools, colleges, universities for students to report misconduct, at live events like conferences, etc., and the victim reporting and notification system 10 is equally applicable to these environments. The victim reporting and notification system 10 goes beyond the scope of employment and can be used in other settings and environments for people to easily report through the #NotMe™ app other behaviors or instances they would like to prevent from happening, avoid or see stop.

The victim reporting and notification system 10 also helps individuals and organizations tangentially affected by harassment and/or discrimination and protects employees as well as it empowers them to report and facilitate the reporting. As explained above, the workplace is a regular site for harassment and/or discrimination. As such, and in addition to employees 12 who are the victims of harassment and/or discrimination, employers 14 (and others running organizations of various types) and others associated with the employers or organizations are deeply affected by actions of the perpetrators of harassment and/or discrimination. As such, the victim reporting and notification system 10 has been developed with tools providing employers 14 (and others running organizations of various types) the ability to eliminate harassment and/or discrimination. By reporting questionable or inappropriate conduct, employees 12 who are the victims of harassment and/or discrimination, as well as those associated with the victims, are empowered to help employers 14 monitor and properly address inappropriate behavior.

As noted above, the victim reporting and notification system 10 is highly applicable to the workplace and the following description describes the victim reporting and notification system 10 in this context. However, and despite the fact the terms "employee(s)" and "employer(s)" are used throughout the present disclosure as a mechanism to fully disclose the victim reporting and notification system 10, the WMMR is applicable to anyone who is a victim of harassment and/or discrimination or of other unwanted/undesirable behaviors/conducts, a witness to harassment and/or discrimination or of other unwanted/undesirable behaviors/conducts (wherein both victims and witnesses who report such action are considered "accusers" in accordance with the WMMR), and/or those running organizations where such unlawful and/or inappropriate conduct occurs.

The victim notification system 10 employs a computer-based reporting application ("reporting app") 16 used by an employee 12 via a smartphone, tablet, laptop, or other computer device 18 to safely, easily and (if desired) anonymously report conduct that is believed to constitute harassment and/or discrimination or that should not happen in the workplace. The reporting app 16 empowers employees 12 to report inappropriate and/or unlawful conduct to an independent company and to their employer 14 to the extent it subscribes to the victim notification system. The reporting app 16 of the victim notification system 10 is a powerful tool provided by an employer 14 to help the employees 12 in its effort to eliminate workplace harassment and discrimination. By having employers 14 adopt the victim notification system 10 and making reporting so easy, the perpetrators of workplace harassment and/or discrimination will be deterred from further conduct. While the present disclosure focuses upon the ability of the employee 12 to report workplace harassment and/or discrimination, it is appreciated the victim notification system 10 has been developed so as to allow for witnesses (and other people) to similarly report workplace harassment and/or discrimination and/or other behaviors and situations.

The victim notification system 10 includes a central operational facility 20 operated by a system administrator(s) 22. Users of the victim notification system 10, whether they be employees 12, employers 14, or others working in conjunction with the victim notification system 10, communicate with the victim notification system 10 via a global communication network using various computing devices well known to those skilled in the art. The central operational facility 20 includes a central server 21 with a central server database 24, a notification system 26, and data analysis system 25 with a scoring system 27 having a scoring system database 27b. The central operational facility 20 may also include other hardware and software based elements that are well known for use in the implementation of such a computer based communication network.

In accordance with a preferred embodiment, both the central server database 24 and the scoring system database 27b store information in an encrypted manner such that the stored information can only be accessed by authorized users, wherein authorization is given by the system administrator(s) 22. The data storage is fully encrypted and decrypted "on-the-fly" when read. Access to both the central server database 24 and the scoring system database 27b is done either through HTTPS (SSL encryption) or through an SSH (Secure Shell) access restricted by private keys.

It is appreciated the elements of the central operational facility 20 need not be found at a single location, but may constitute distributed elements located at various locations and connected via network connections in a manner well known to those skilled in the art. The central operational facility 20 is designed to be accessed by employers 14, employees 12, the system administrator 22, third-party law enforcement agencies 28, and other stakeholders desiring to eradicate and address occurrences of the harassment and/or discrimination or other behaviors such as for example mass shooting.

In accordance with one embodiment, and as will be appreciated based upon the following disclosure, the victim notification system 10 operates to provide objective assessments of reported behavior. This is achieved by receiving reports regarding harassing, bullying and/or discriminatory type behavior, wherein the reports are composed of structured data limited to a predetermined list of specific conducts, behaviors, locations, etc. Thereafter, the severity and pervasiveness of the harassing or discriminatory behavior is ranked using the previously mentioned scoring system 27 of the data analysis system 25. The severity and pervasiveness of the reported harassing or discriminatory behavior is then analyzed and recommendations are generated. In accordance with the recommendations, appropriate action (for example, notifying employers, initiating investigations, etc.) is then taken.

The employees 12 access the central operational facility 20, in particular, the central server database 24, via the reporting app 16. The reporting app 16 is designed to be free to employees 12 and simply downloaded in a well-known manner. Once the reporting app 16 is downloaded, the employee 12 registers their device and creates an account. Thereafter, the employee 12 may report instances of harassment, discrimination and/or bullying.

In particular, and with reference to FIGS. 2A to 45, the employee 12 first downloads the reporting app 16 to his or her smart phone or other computer device 18. As explained above, and as presented in the introductory screen shots of the reporting app 16, the reporting app 16 allows an employee 12 to discreetly and easily report questionable or inappropriate conduct such as harassment, discrimination or bullying. By reporting questionable, unlawful and/or inappropriate conduct, the employee 12 is empowered to help their employer 14 monitor and properly address inappropriate behavior. See FIGS. 2A-D.

Once the employee 12 downloads the reporting app 16, and where an employee 12 is new to the victim notification system 10, he or she is asked to sign up for an account (see FIGS. 3, 4, 5, 6, 7A, and 7B). During the sign up process, the employee 12 is asked to provide the following information: first name, last name, email, birthdate, phone number, and is asked to create a password. The employee 12 is also asked to review and approve of the terms of use and the privacy policy. Finally, the employee 12 confirms their email address and cell phone number via a confirmation mechanism known to those skilled in the art.

Upon registration each employee 12 is provided a unique token that is hashed and stored in the central server database 24. When an employee 12 logs in, the token is sent through the public API 31 so each employee 12 can be differentiated. When an employee 12 logs in on the victim notification system 10, a public API 31 (used by the reporting app 16) allows access to each employee's information, but prevents employees from accessing other users' information.

Figure 9:
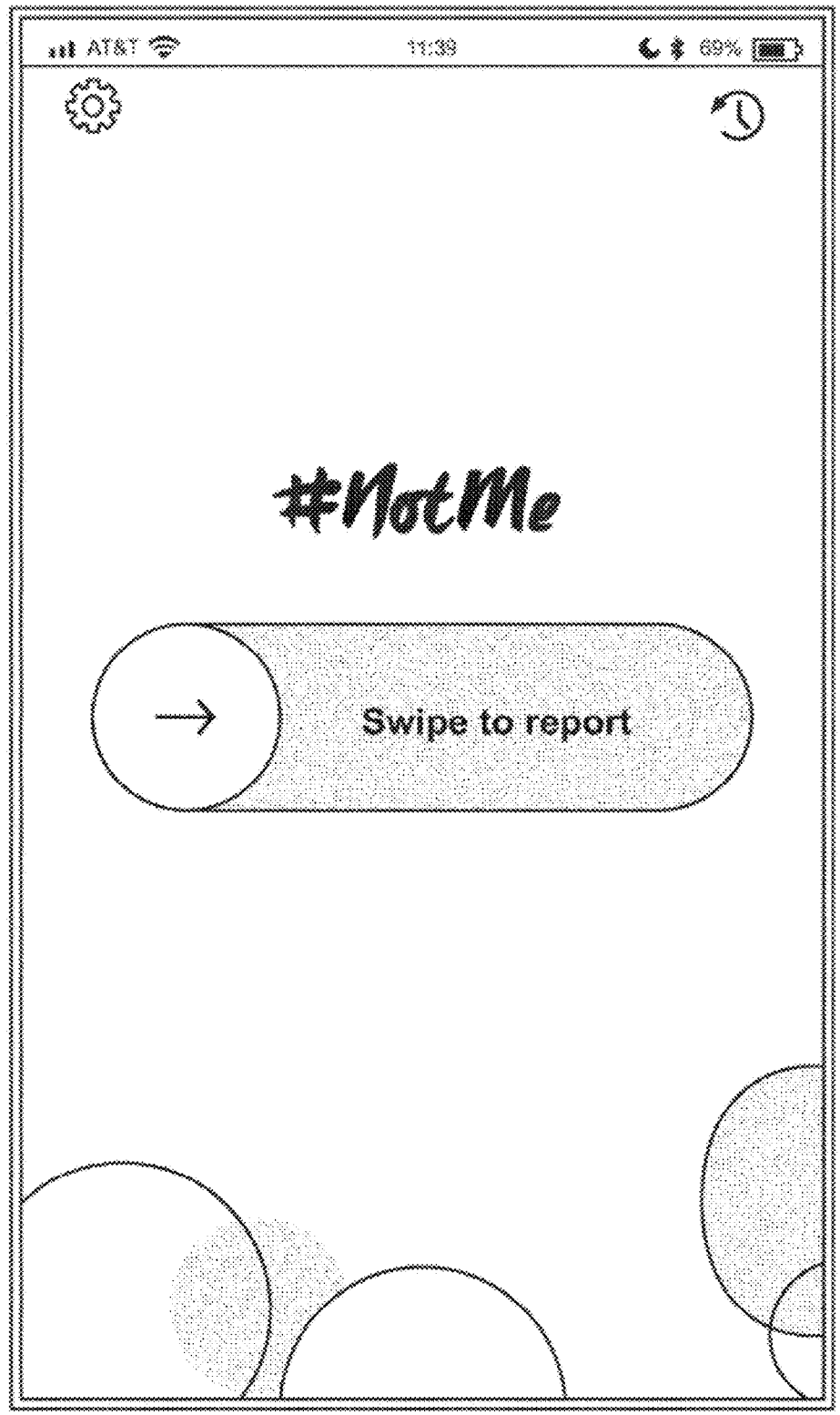
Figure 10:
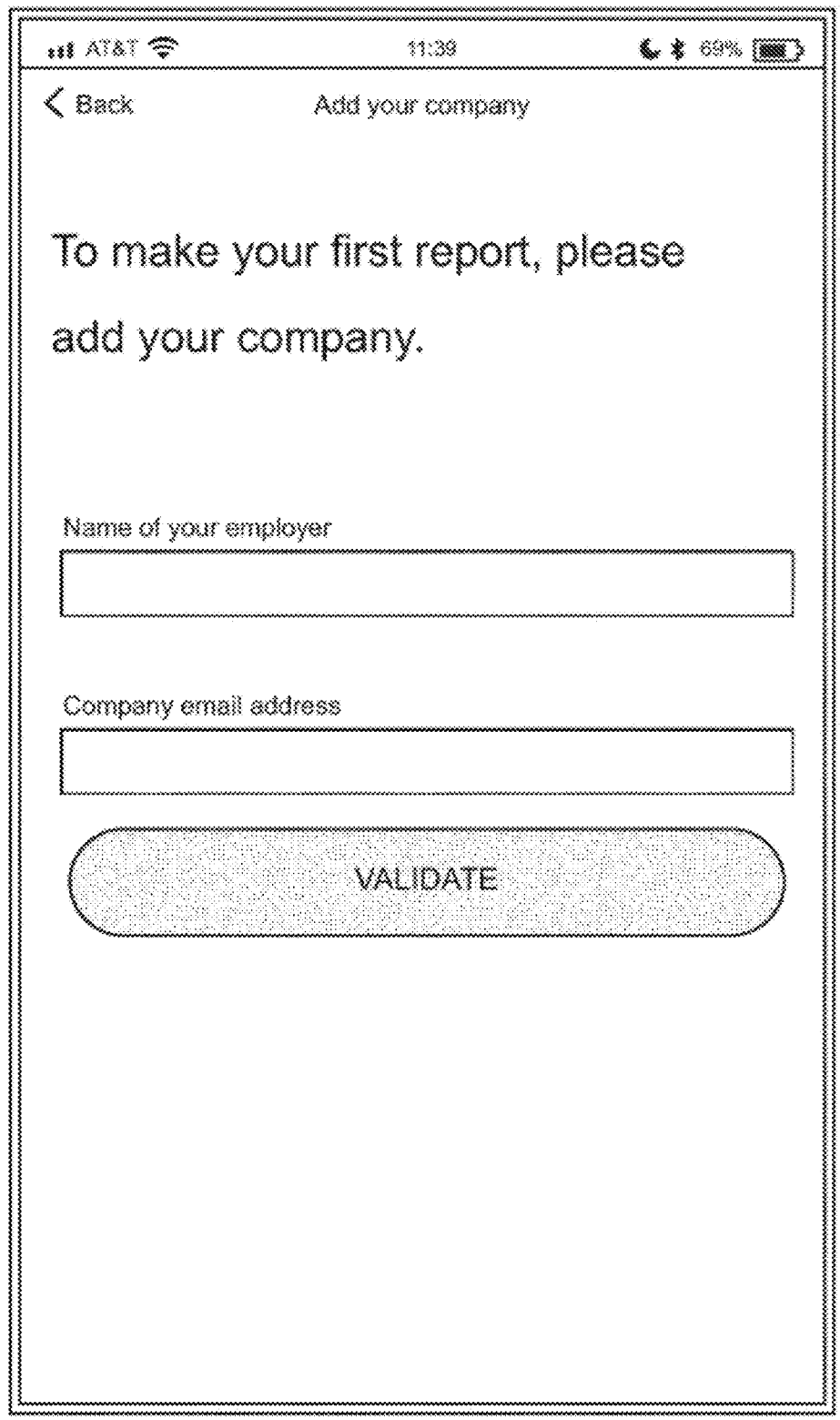
Figure 11:
Figure 12:
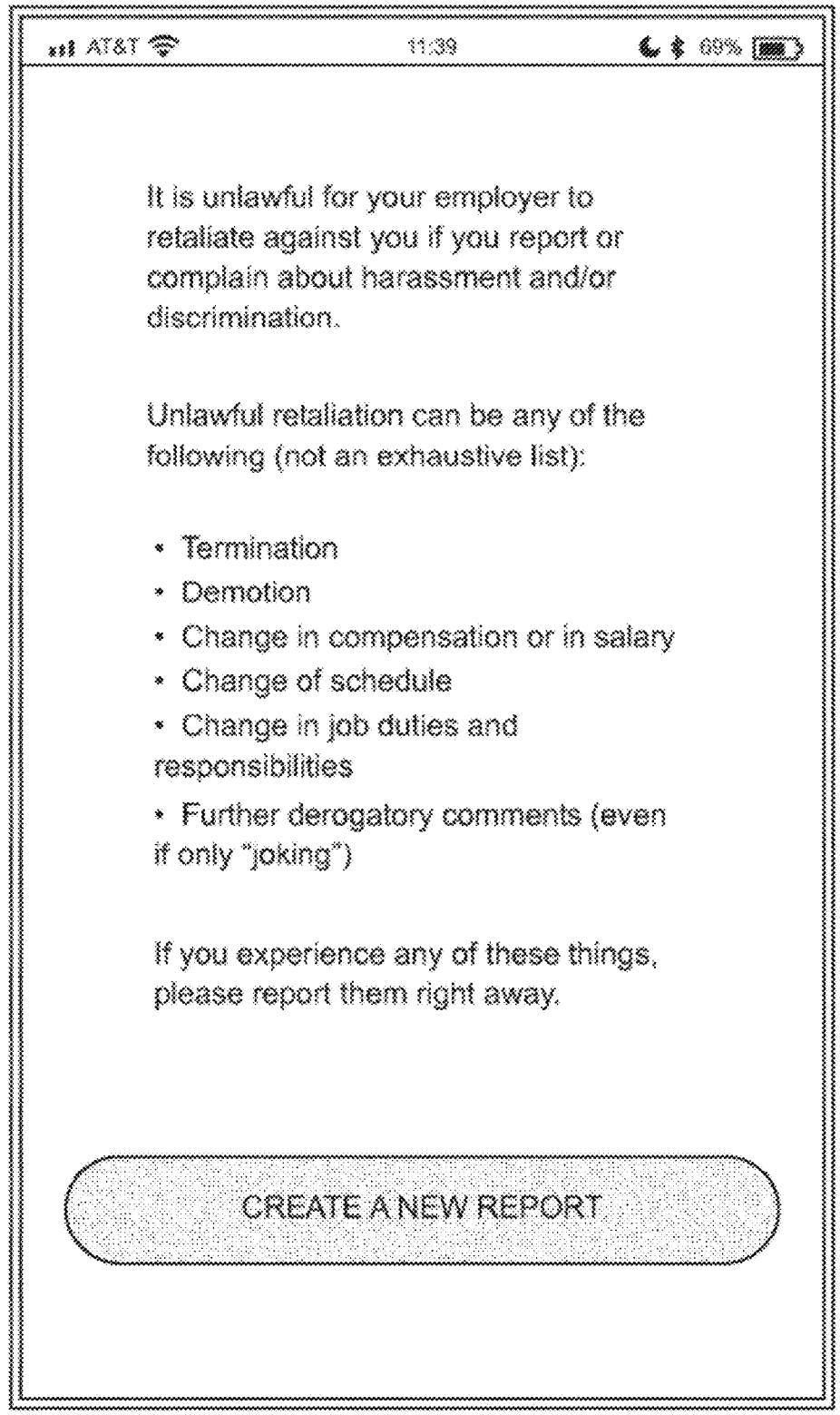
Figure 13:
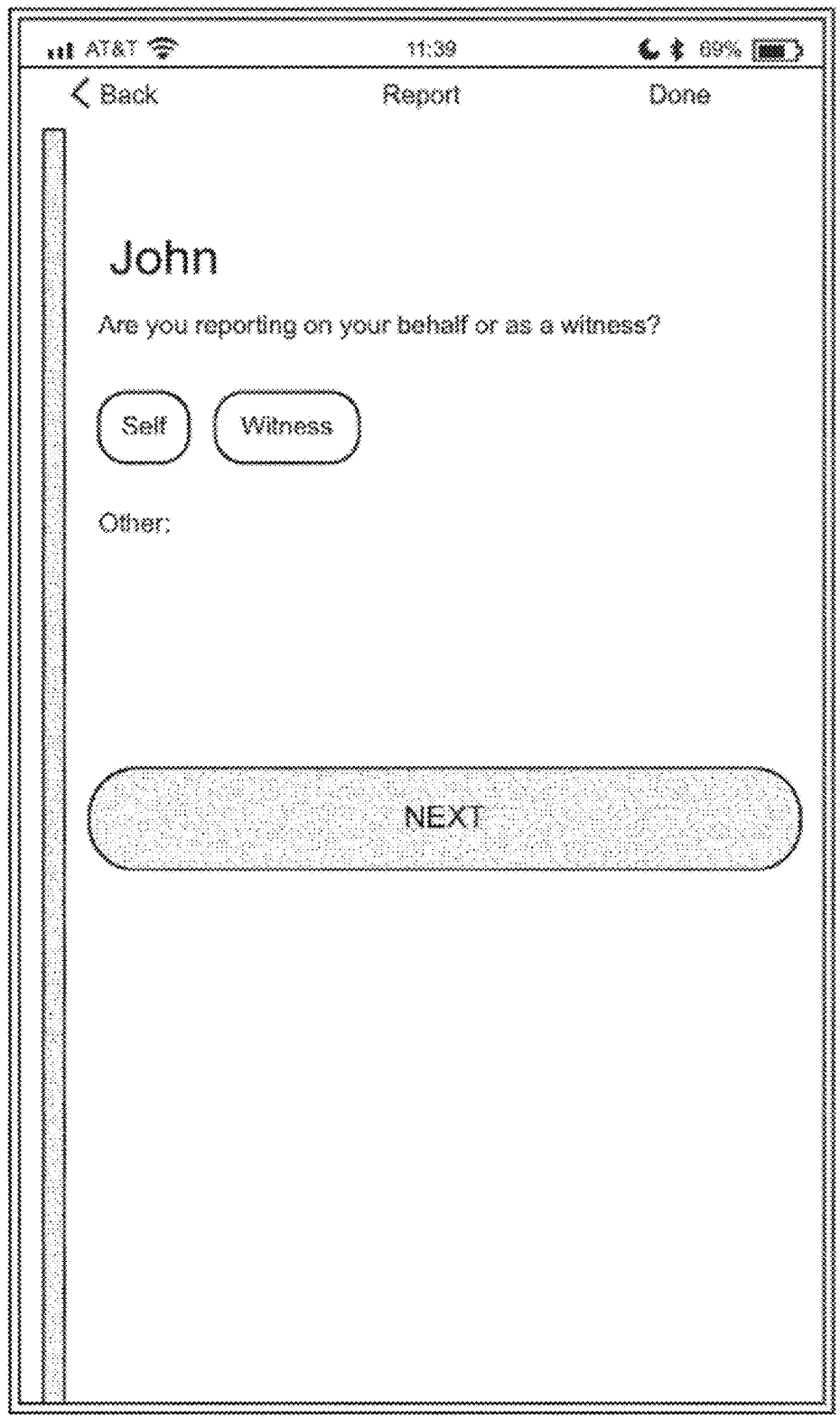
Figure 14:
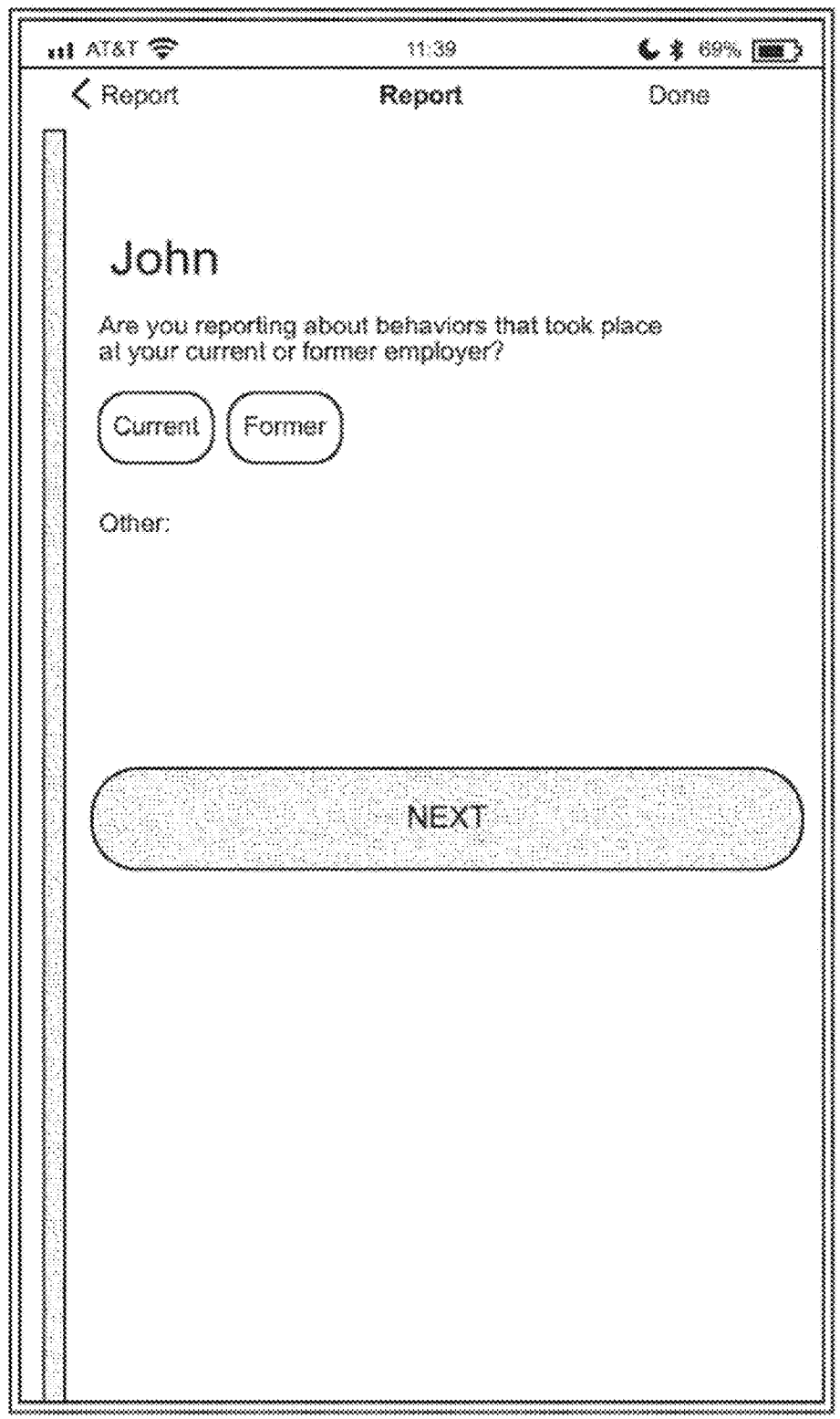
Figure 15:
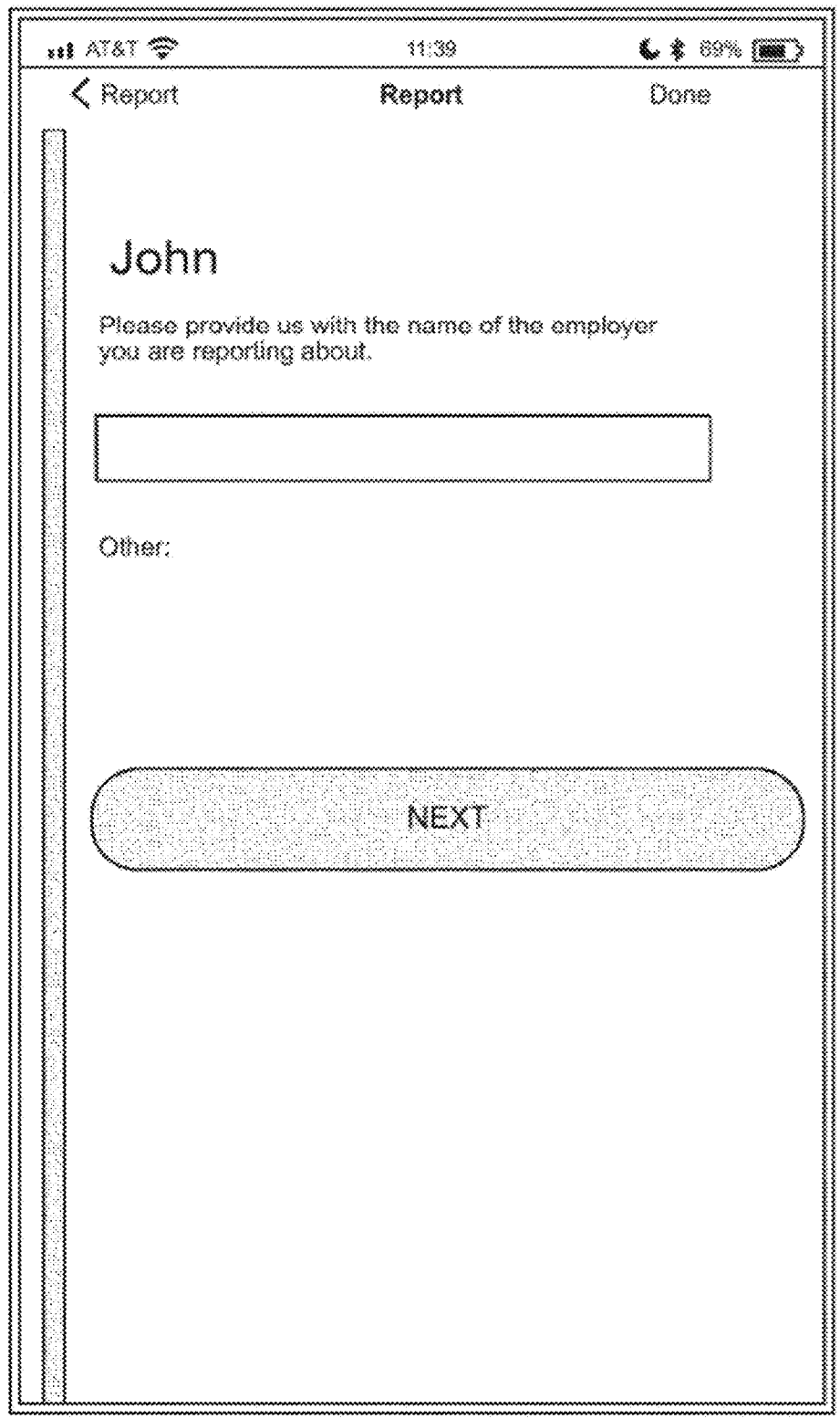
Figure 16:
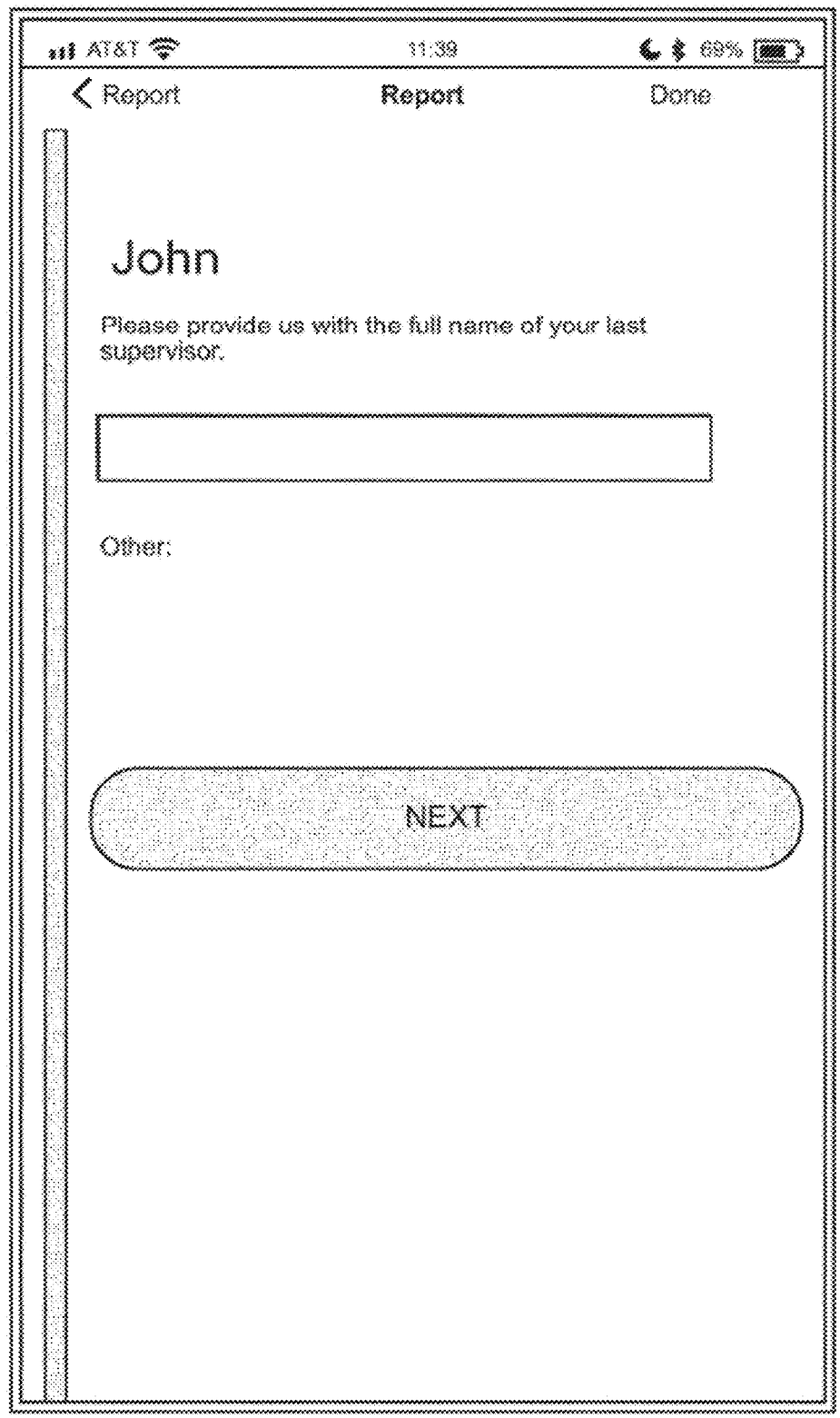
Figure 17:
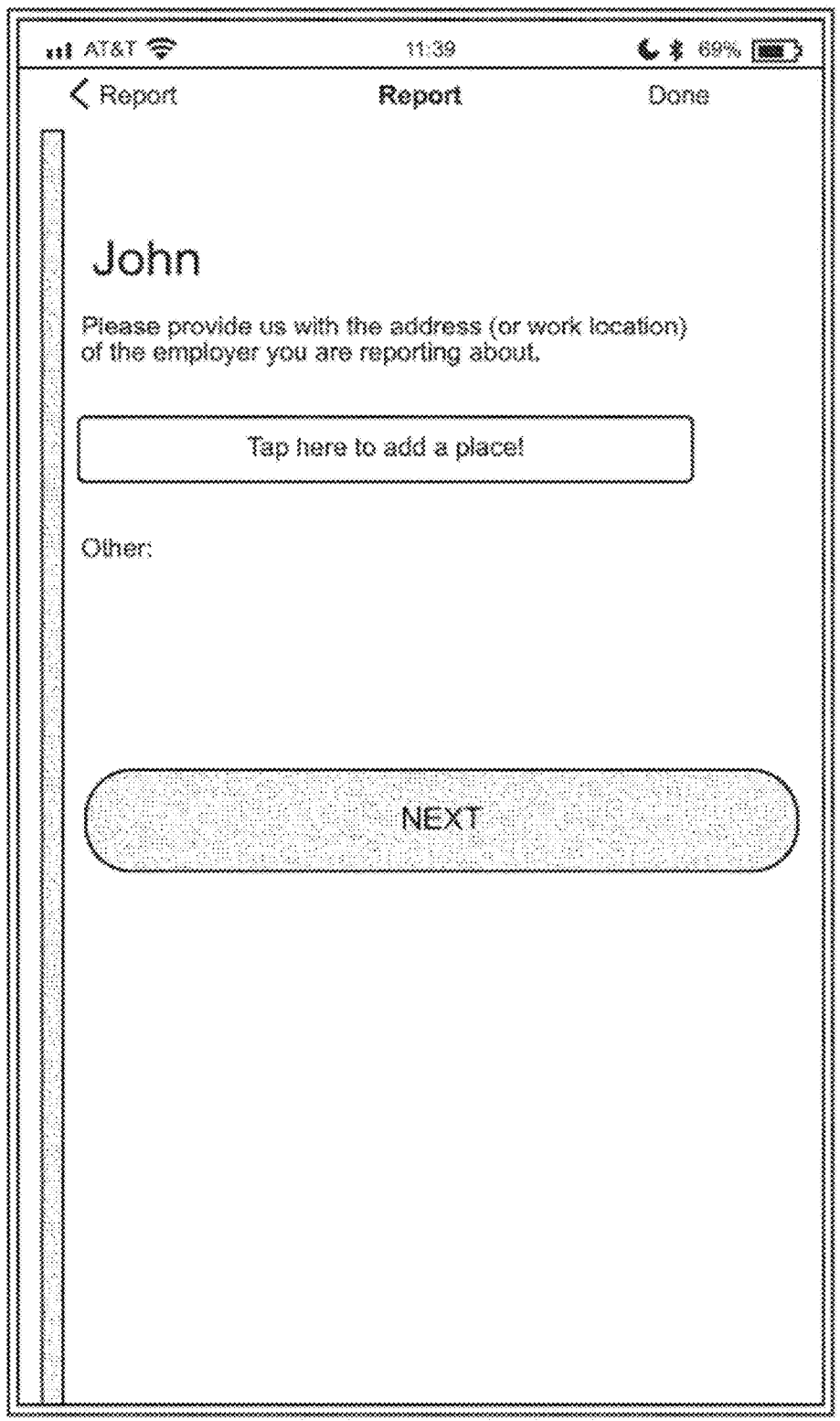
Figure 18:
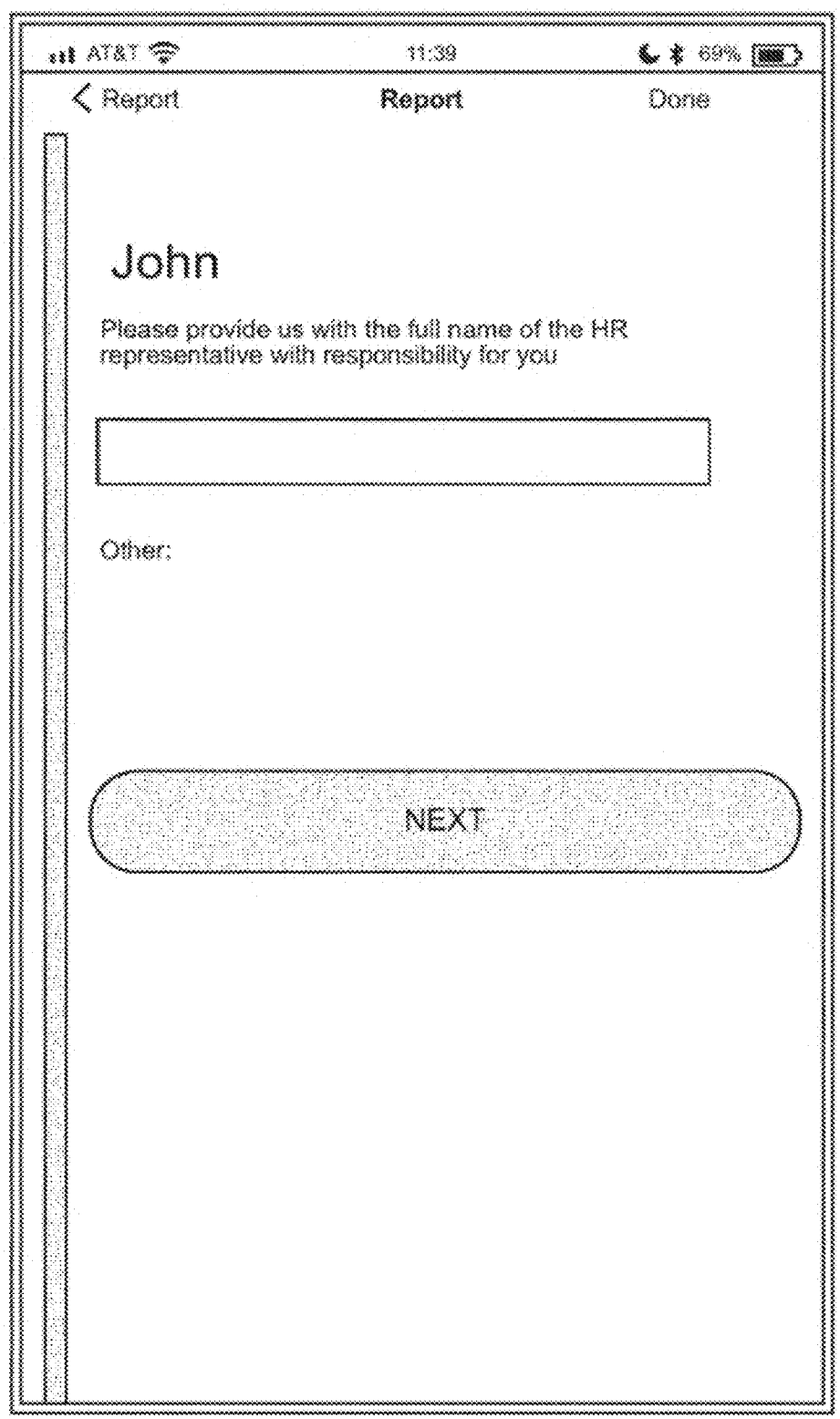
Figure 19:
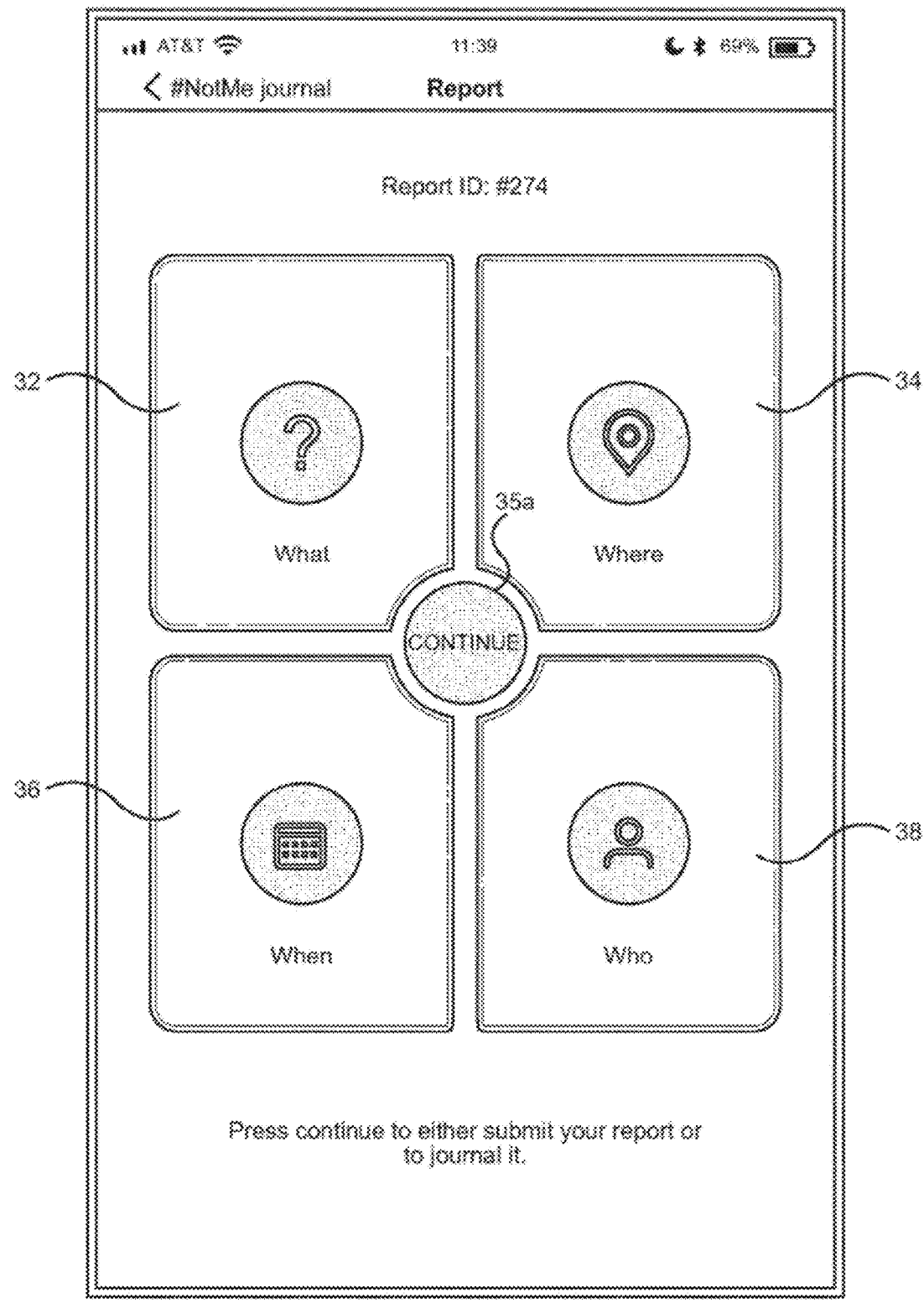
Figure 20A:
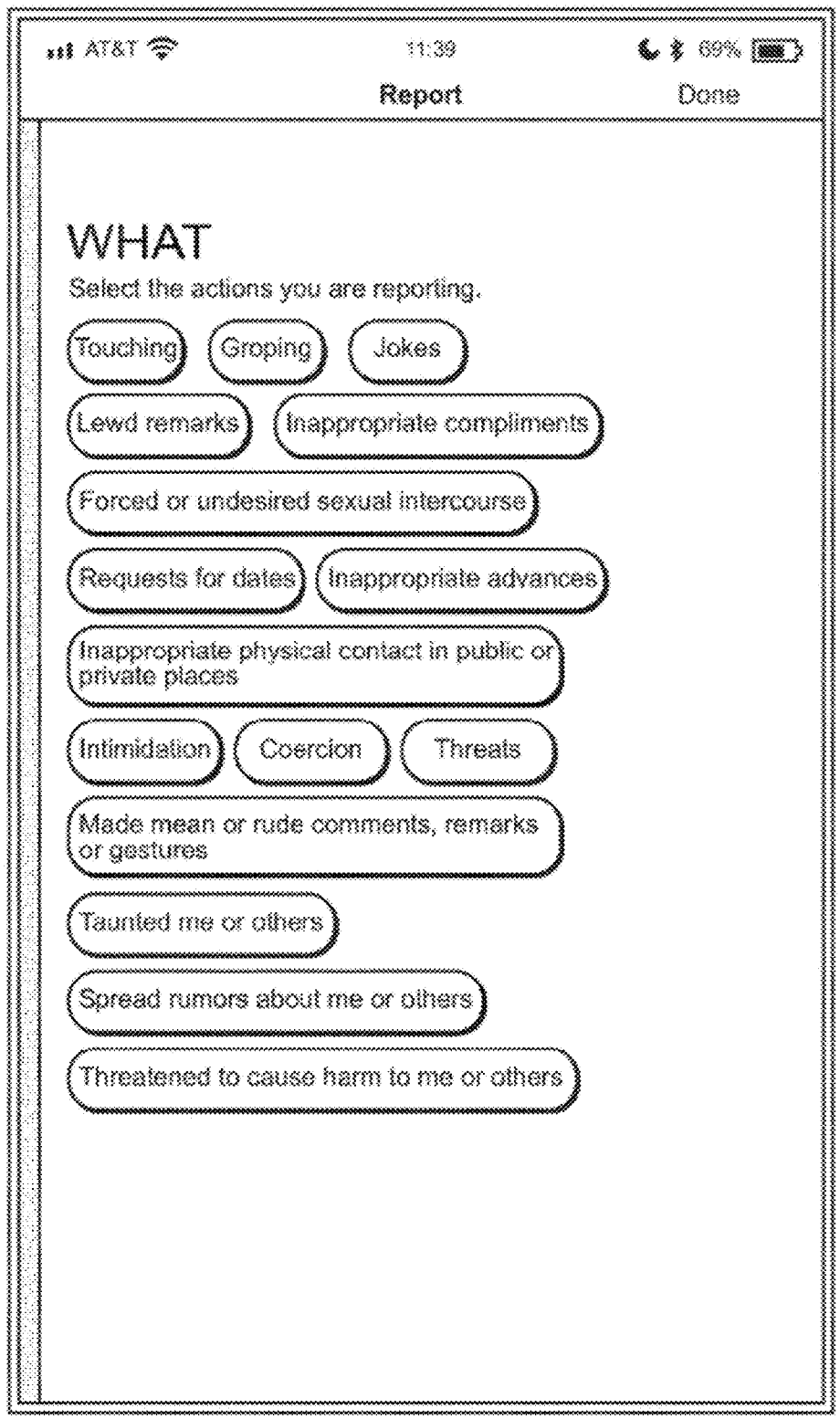
Figure 20B:
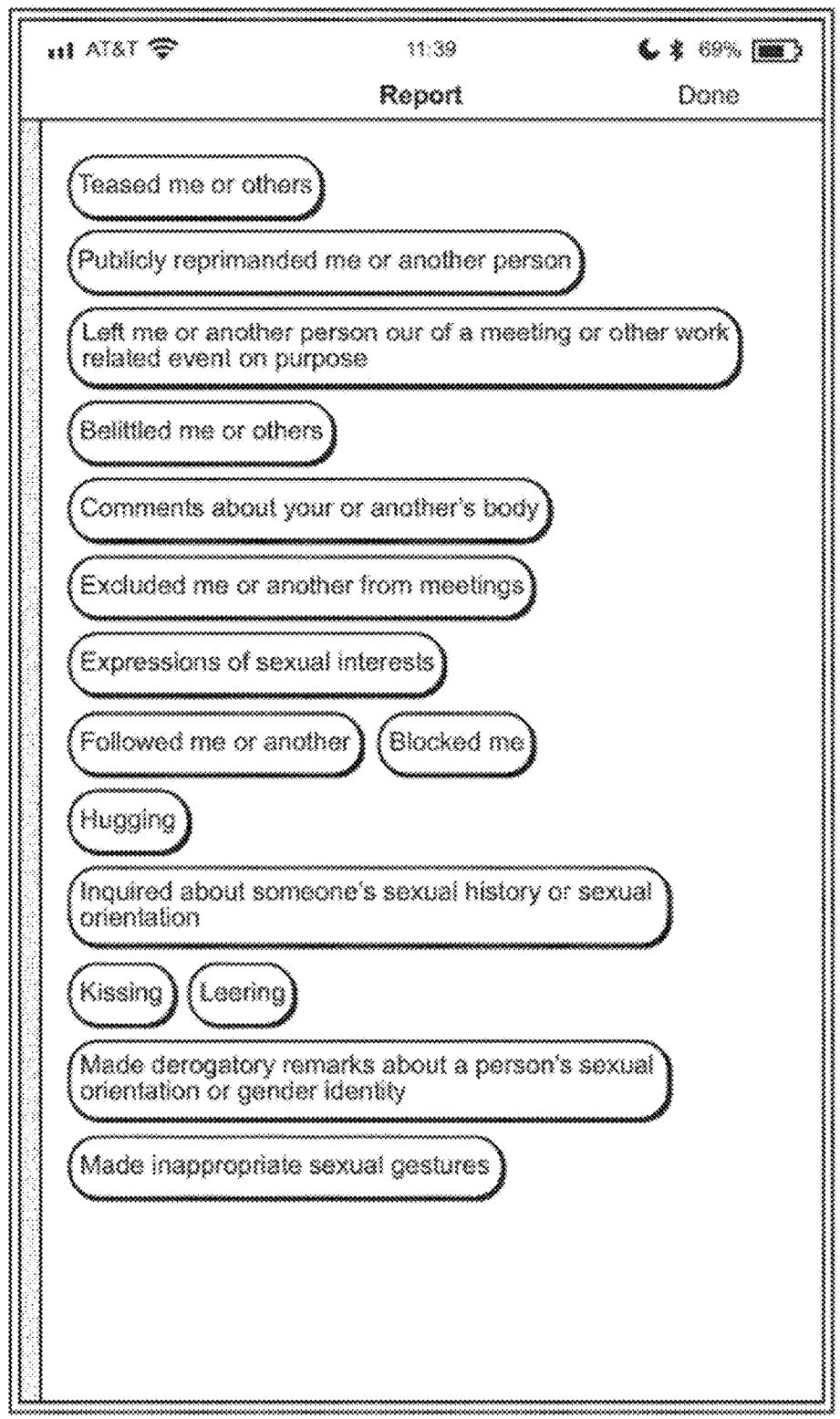
Figure 20:
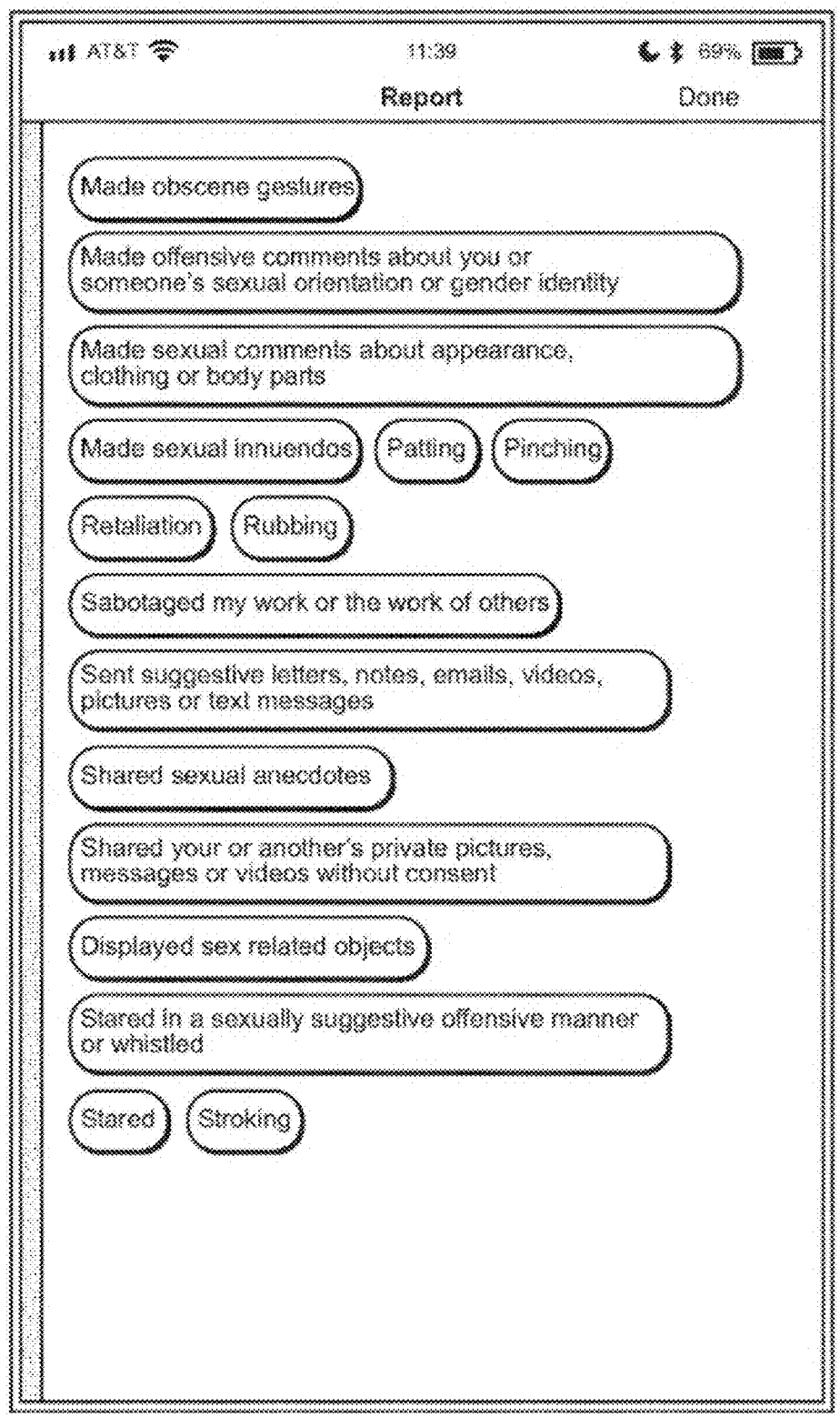
Figure 20:
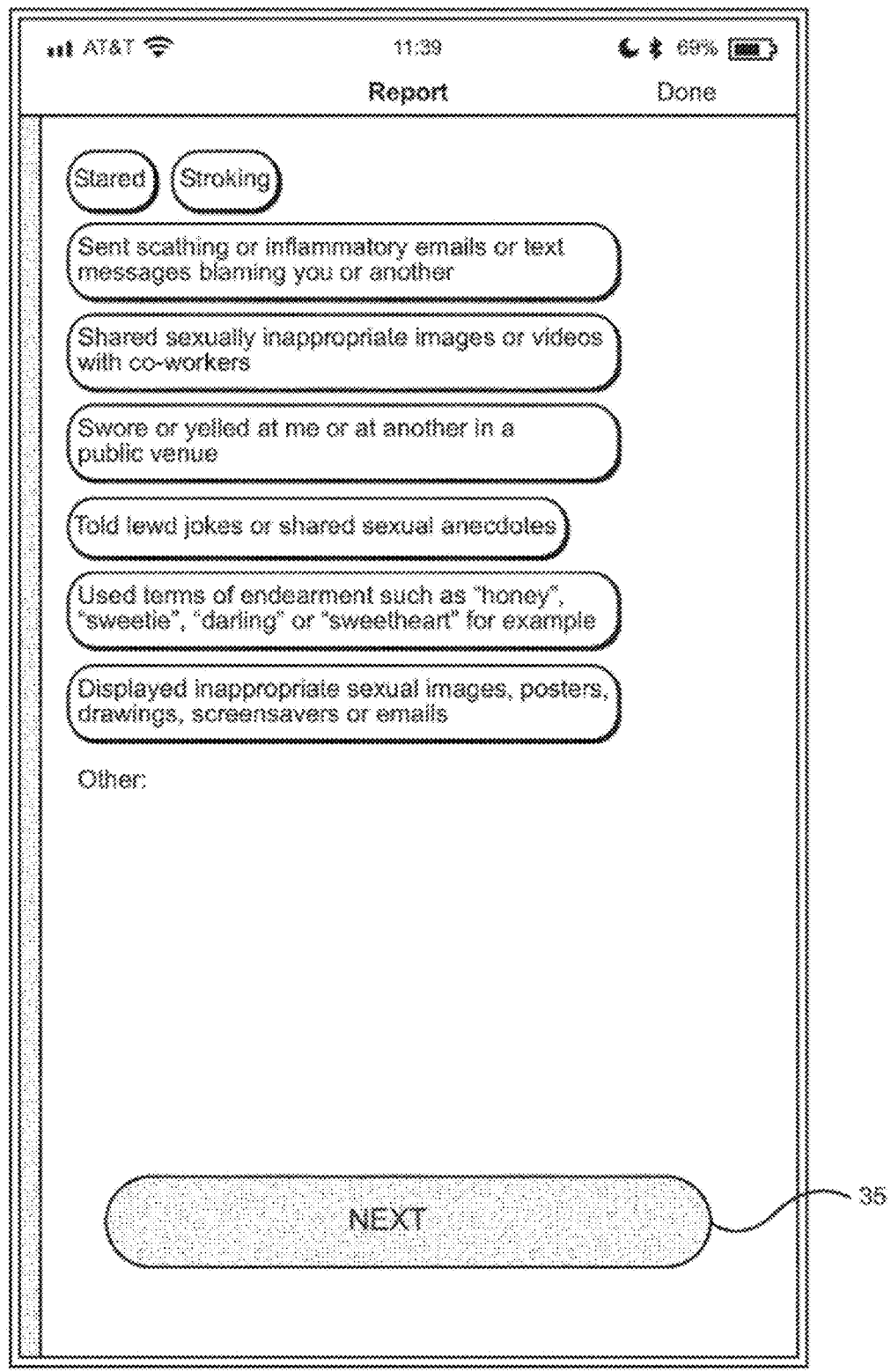
Figure 21:
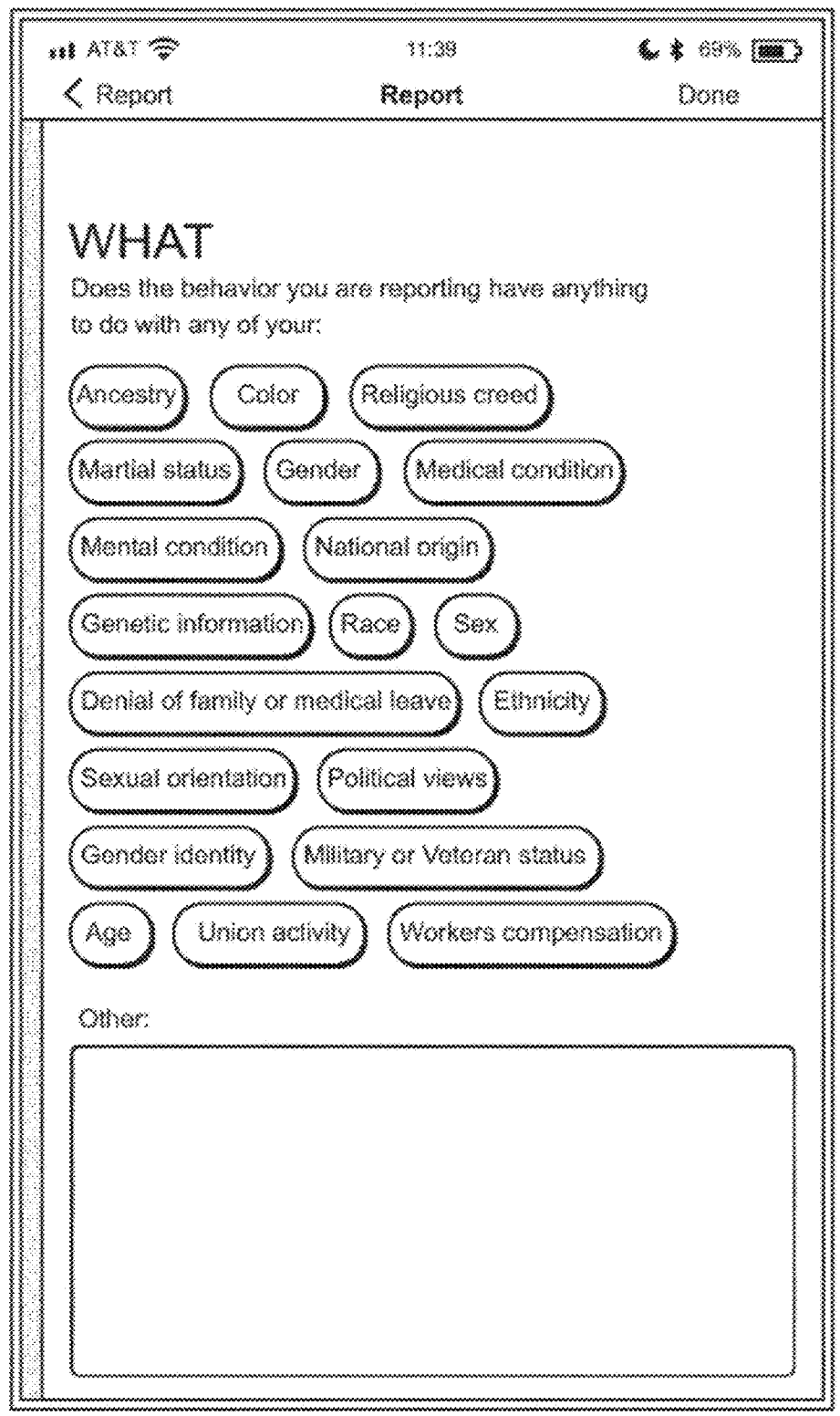
Figure 22:
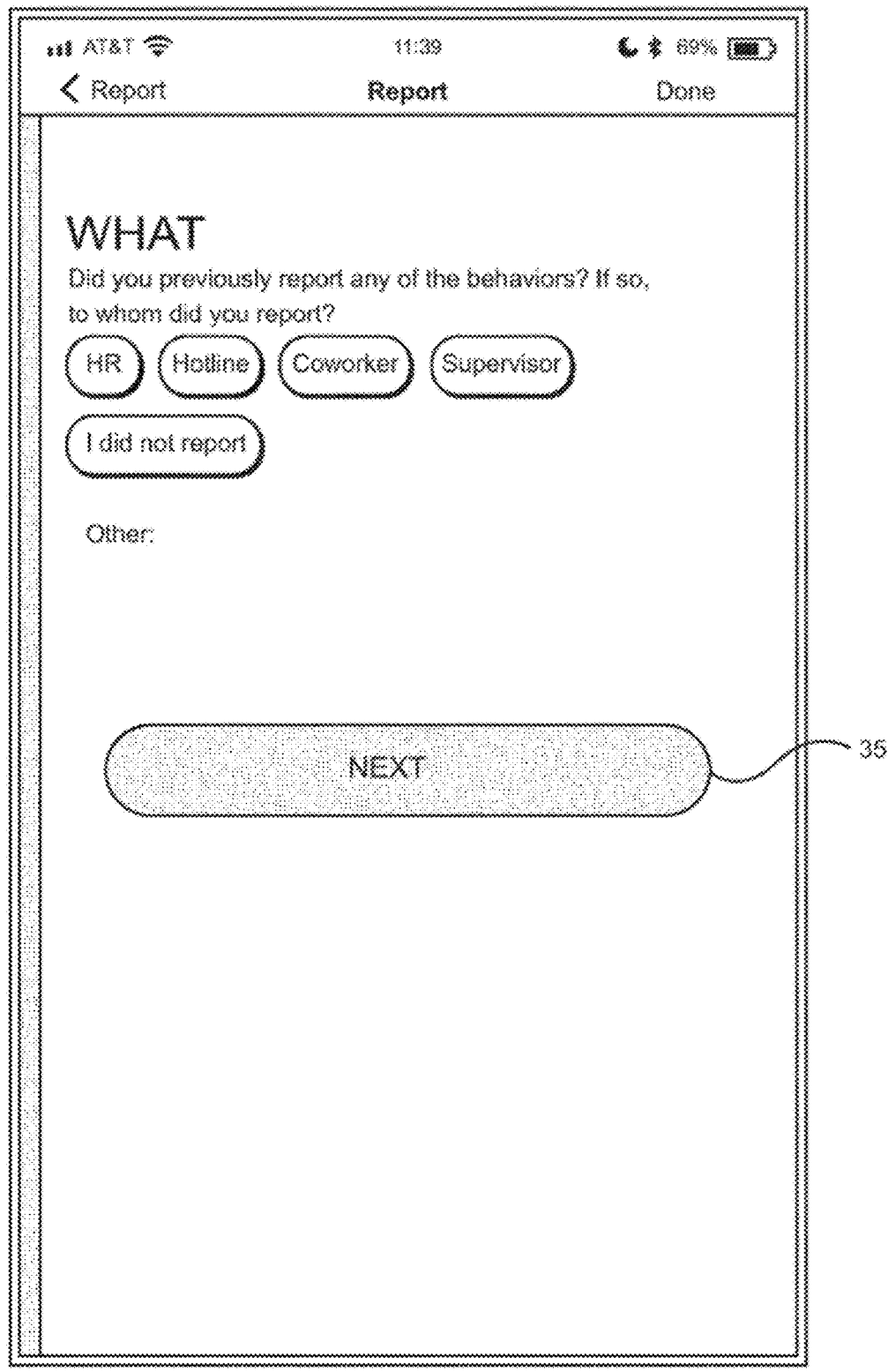
Figure 23:
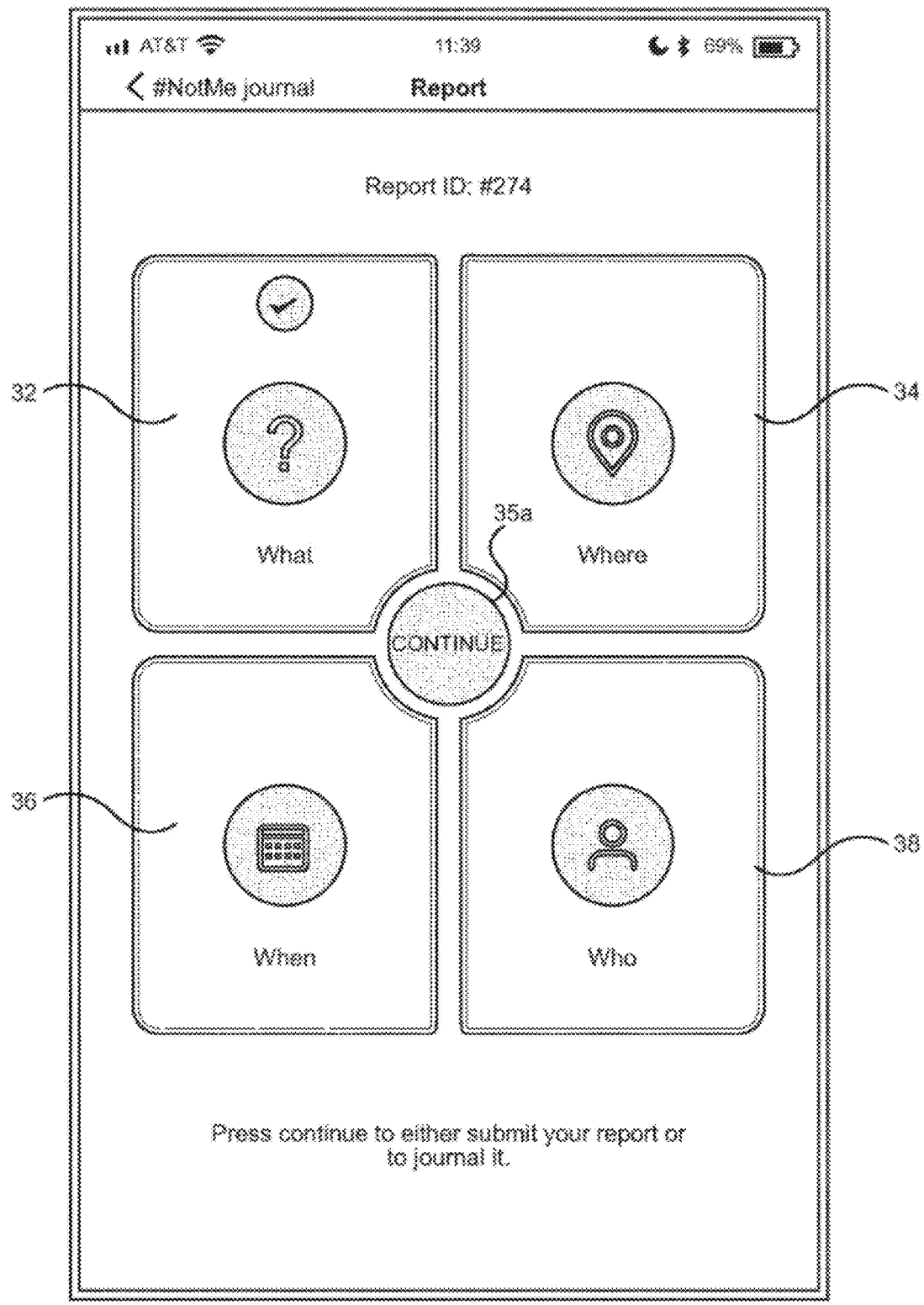
Figure 24:
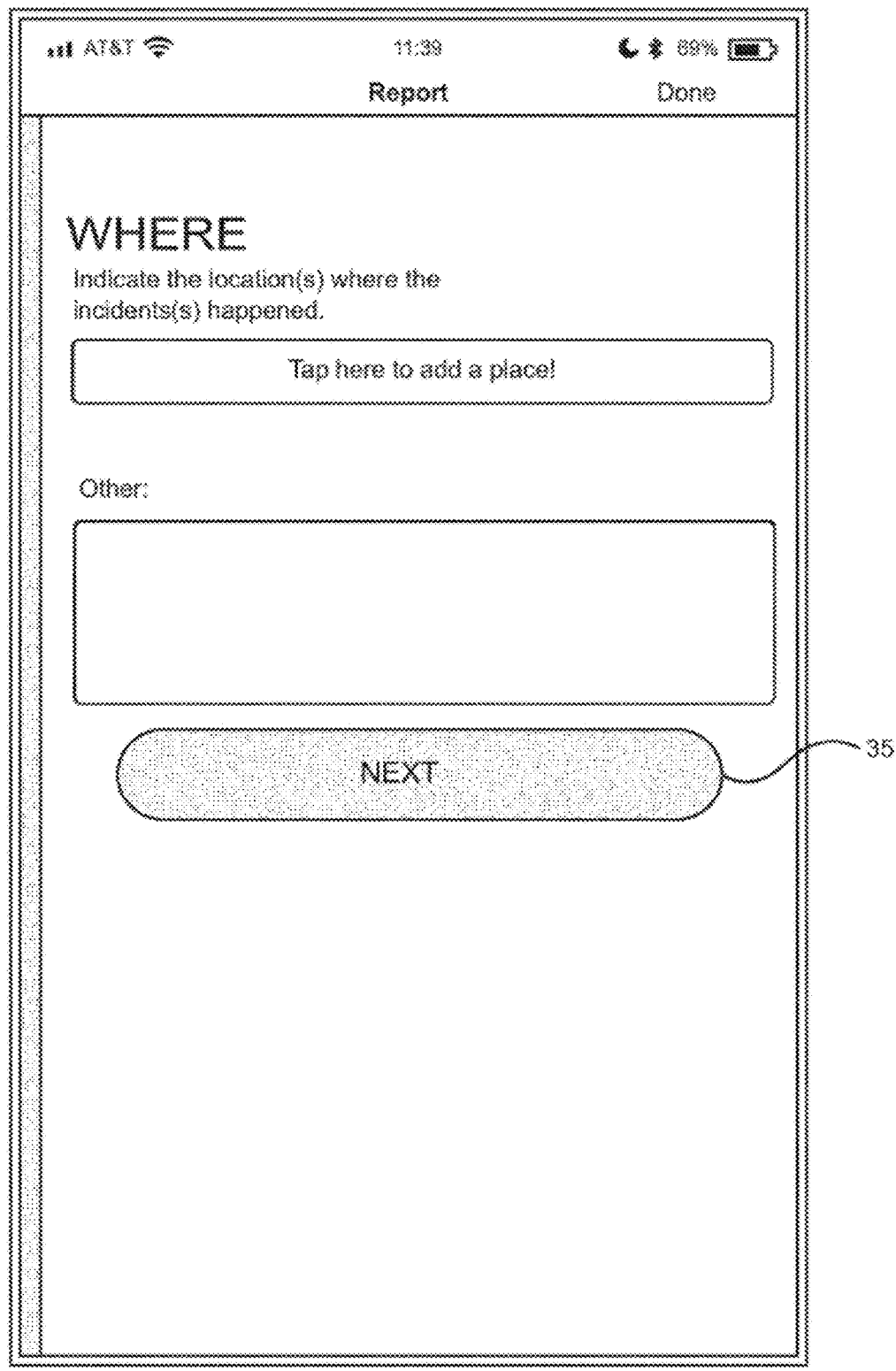
Figure 25:
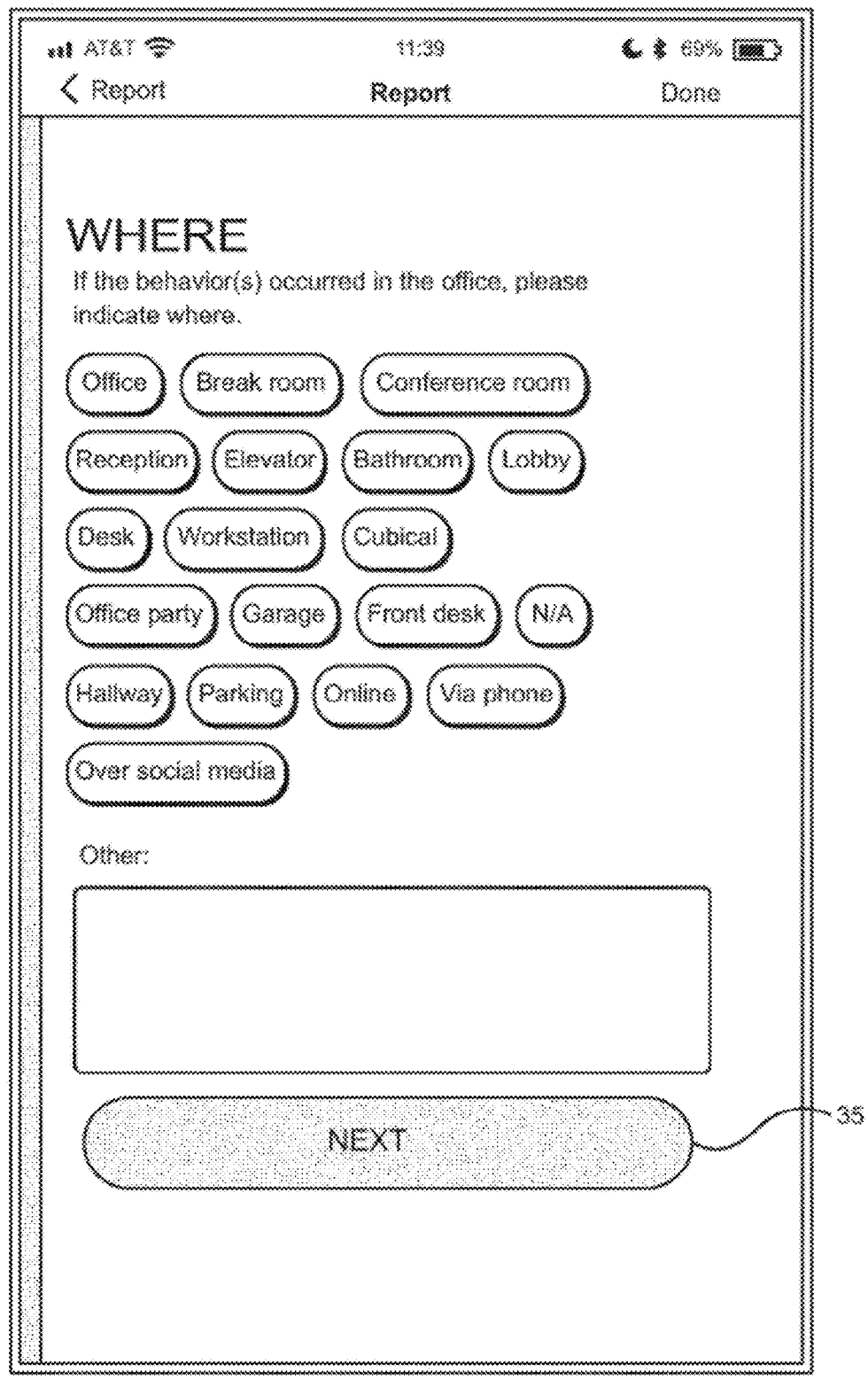

When it is time to report an incident, the employee 12 simply opens the reporting app 16, logs in (see FIG. 8) and swipes the "SWIPE TO REPORT" button 30 (see FIG. 9). In addition, and at this point, the employee 12 is asked to identify the name of the employer, enter the company email address, and confirm the company email (see FIGS. 10 and 11). Through the utilization of the victim notification system 10, and as part of the agreement between the employer 14 and the system administrator 22 of the victim notification system 10, the employer 14 reminds its employees that it cannot retaliate against the employee for reporting or complaining about harassment and/or discrimination (see FIG. 12). Retaliation is unlawful. The employee 12 is made aware of this fact and that unlawful retaliation can be any of the following: termination, demotion, change in compensation or in salary, change of schedule, change in job duties and responsibilities, and further derogatory comments. The employee 12 is notified that if they experience any of these activities after making a report the actions should be reported to either the system administrator 22 of the victim notification system 10 or to another individual empowered to handle the situation. With regard to gathering employee information, the employee 12 is further requested to identify whether he/she is reporting on their own or as a witness (see FIG. 13), whether he/she is reporting about current or past behavior (see FIG. 14), the name of the employer (see FIG. 15), the name of the last supervisor (see FIG. 16), the address of the employer where the act took place (see FIG. 17), and the name of the human resource representative (see FIG. 18).

The reporting app 16 is developed to make reporting of instances of harassment, discrimination or bullying (or other behaviors) very simple. In particular, and after the "SWIPE TO REPORT" button 30 is swiped and the employee has answered the few questions discussed in the above paragraph, the employee 12 is provided with a graphical user interface showing four icons that are provided for inputting relevant information (see FIG. 19). As mentioned above, a witness may similarly report an incident and the reporting app 16 provides a mechanism to allow for the user to designate whether the report is being initiated by an employee or a witness.

Initiation of the reporting process generates an API call via the public API 31 to the central operational facility 20 to generate a blank report that includes a report ID, the date of creation for the report, the company the person works for, and whether the person is the victim or witness. The blank report is stored in the central server database 24.

The icons of the reporting app 16 include a "WHAT" icon 32, a "WHERE" icon 34, a "WHEN" icon 36, a "WHO" icon 38 and a "CONTINUE" button 35a. This allows the employee 12 to provide as much or as little of the information as desired by the employee 12. While the description below presents the access to prompts and structured inputs in a specific order, it is appreciated the order may be varied and employees may access the "WHAT" icon 32, "WHERE" icon 34, "WHEN" icon 36, and "WHO" icon 38 in the order they desire.

It is appreciated the questions associated with the "WHAT" icon 32, "WHERE" icon 34, "WHEN" icon 36, and "WHO" icon 38 are customizable by the employer (or organization using the system) 14. As such, an employee of a company, for example, when he or she wants to start filling out the "What" questions and taps on the "WHAT" icon 32, generates an API call via the public API to the central operational facility 20 that queries questions that the company has decided it wants to ask its employees about "What" happened and then push those questions to the reporting app 16 of the user's smartphone 18 or other computer device.

Figure 1B:
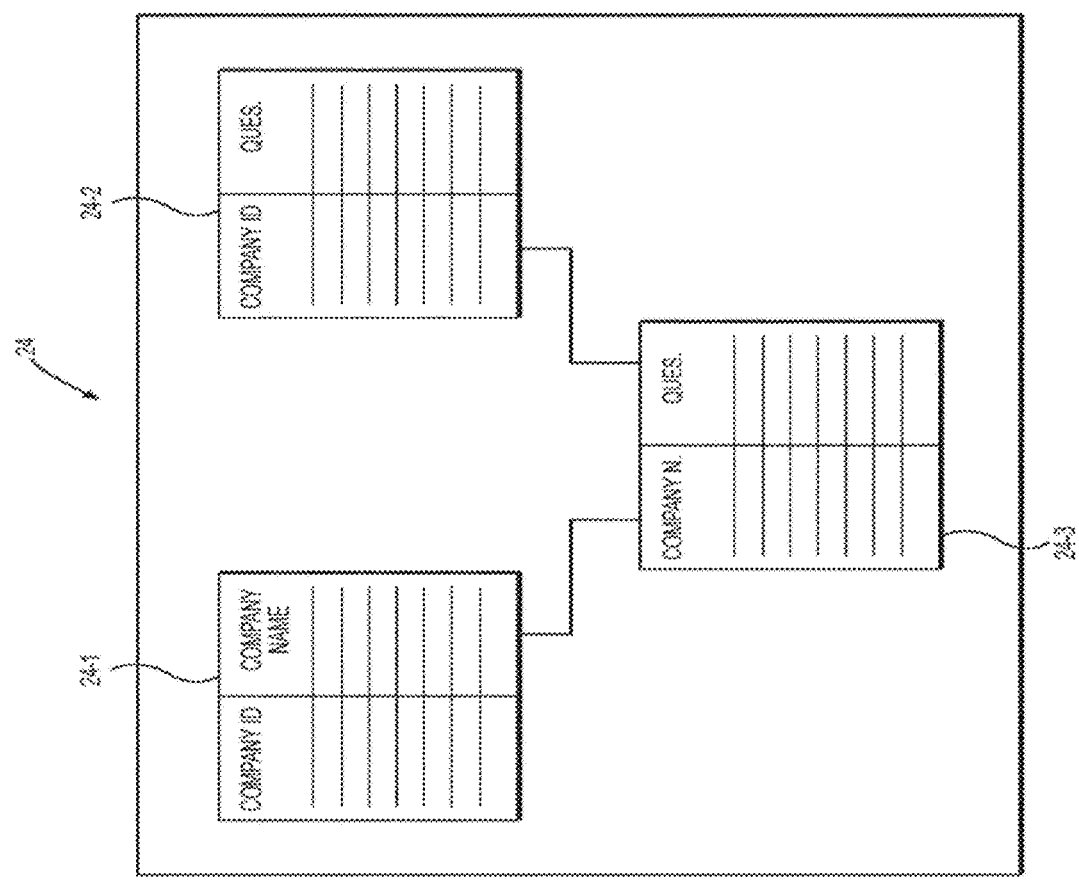
FIG. 1B shows an exemplary architecture schematic representation of the relational database tables in one embodiment of the WMMR.
Figure 2A:
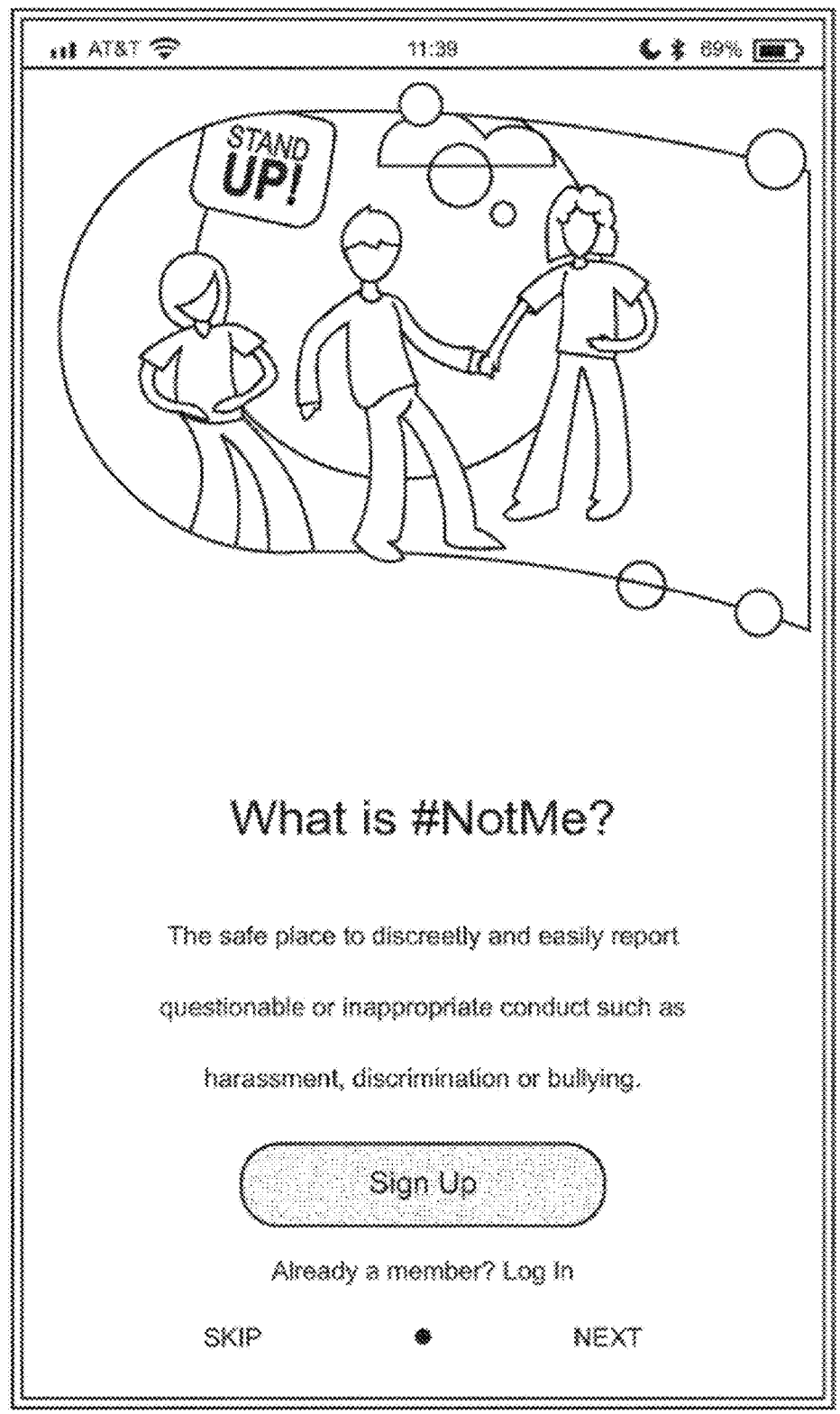
FIGS. 2A-49 show screenshot diagrams in various embodiments of the WMMR.
Figure 2B:
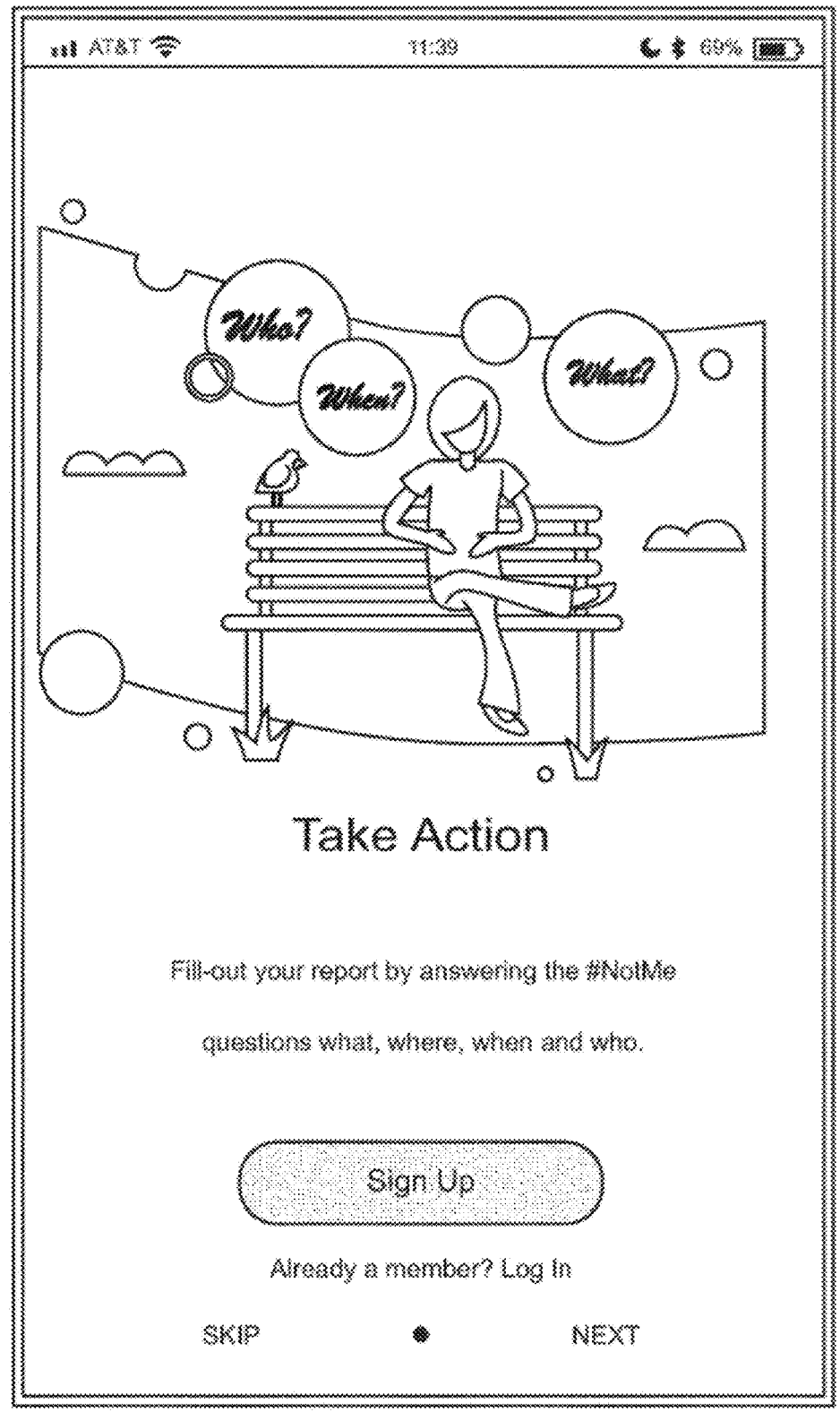
Figure 2:
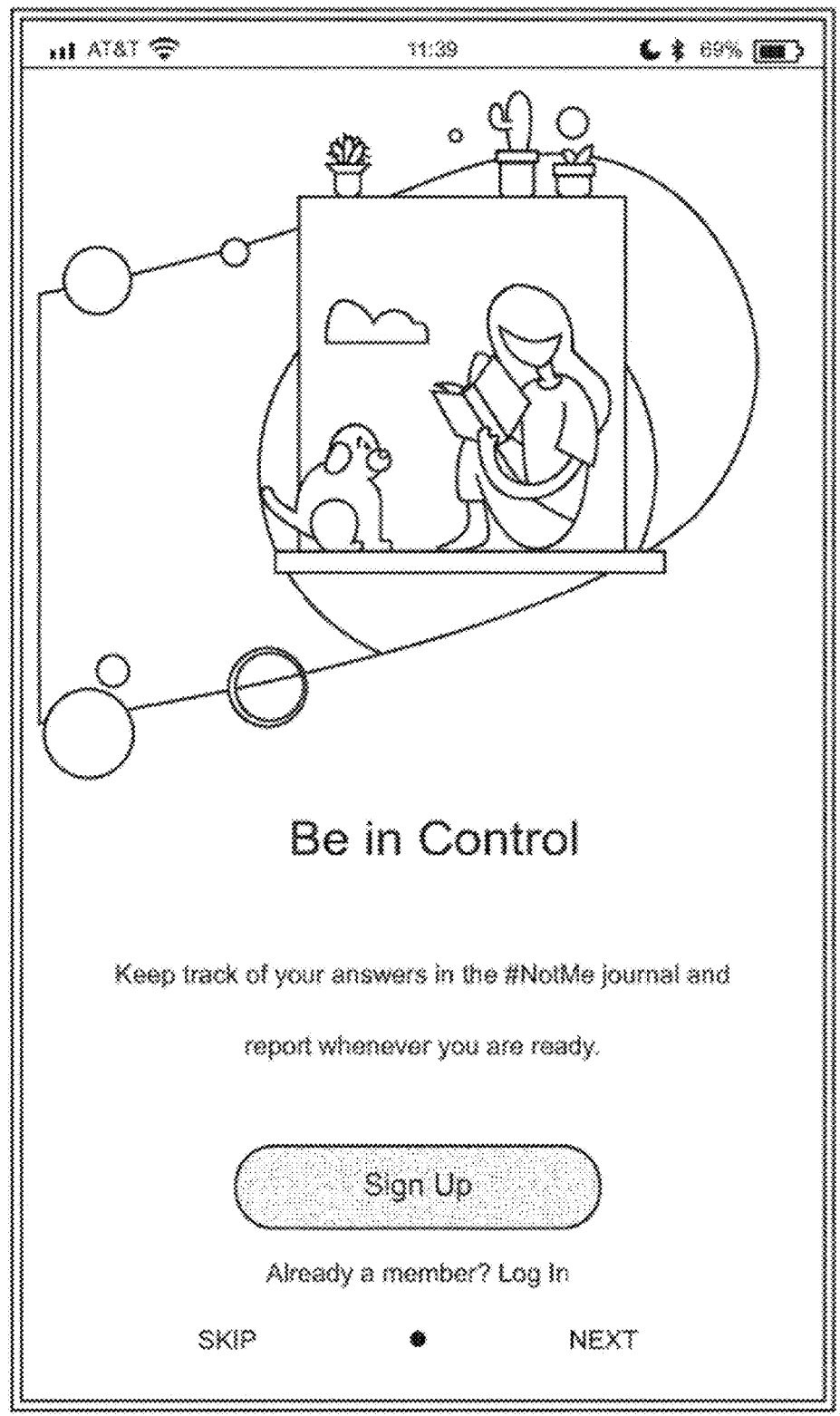
Figure 2:
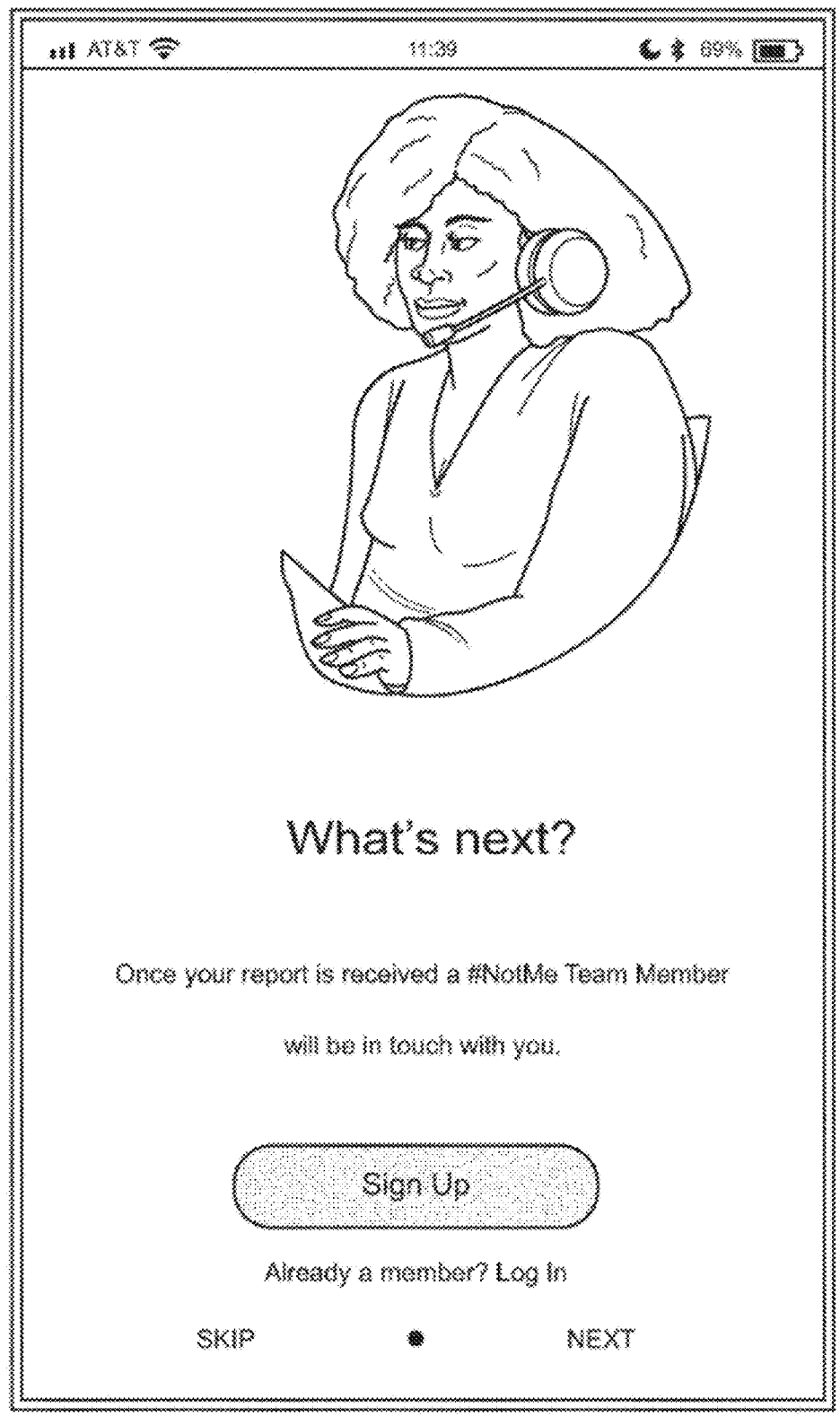
Figure 3:
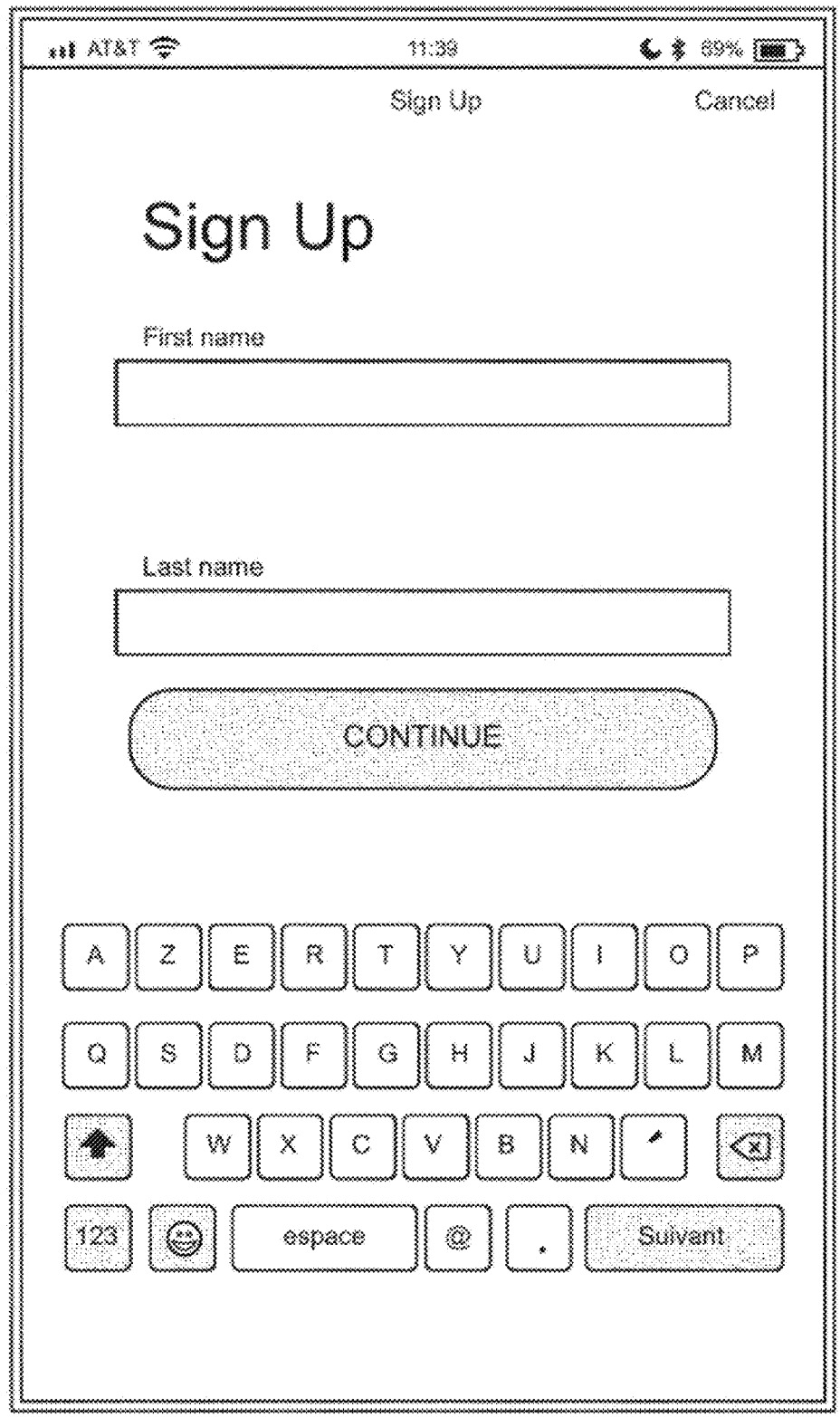
Figure 4:
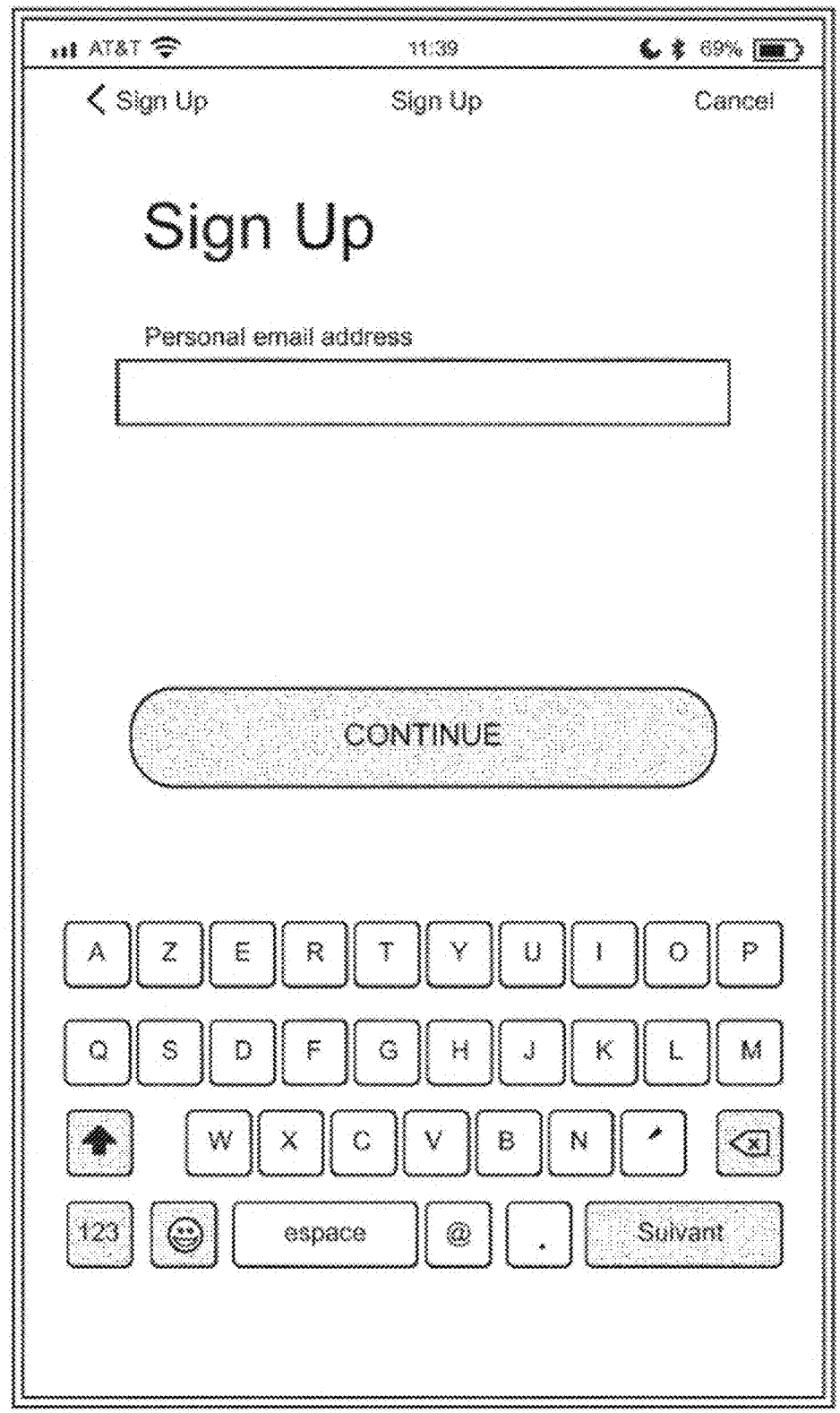
Figure 5:
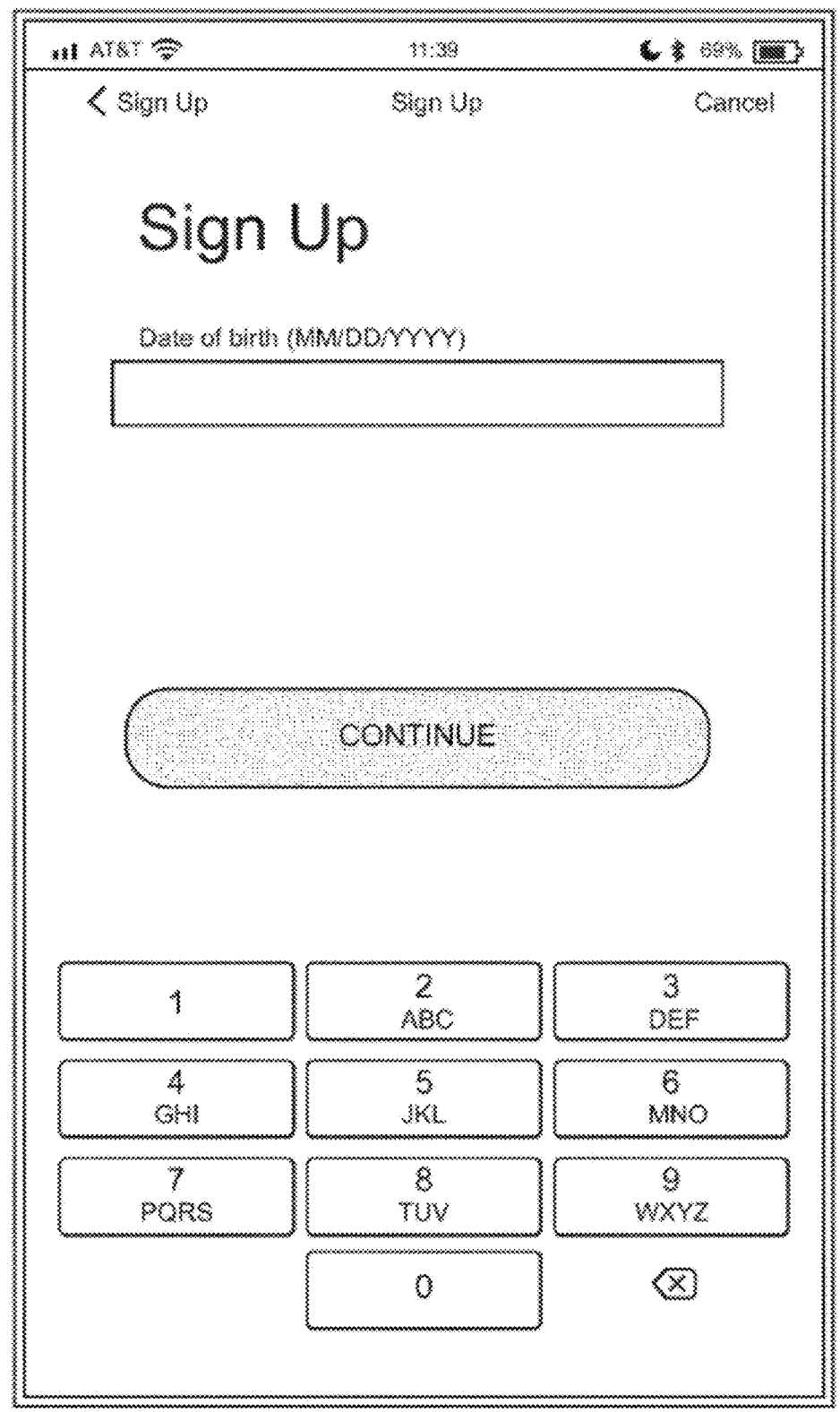
Figure 6:
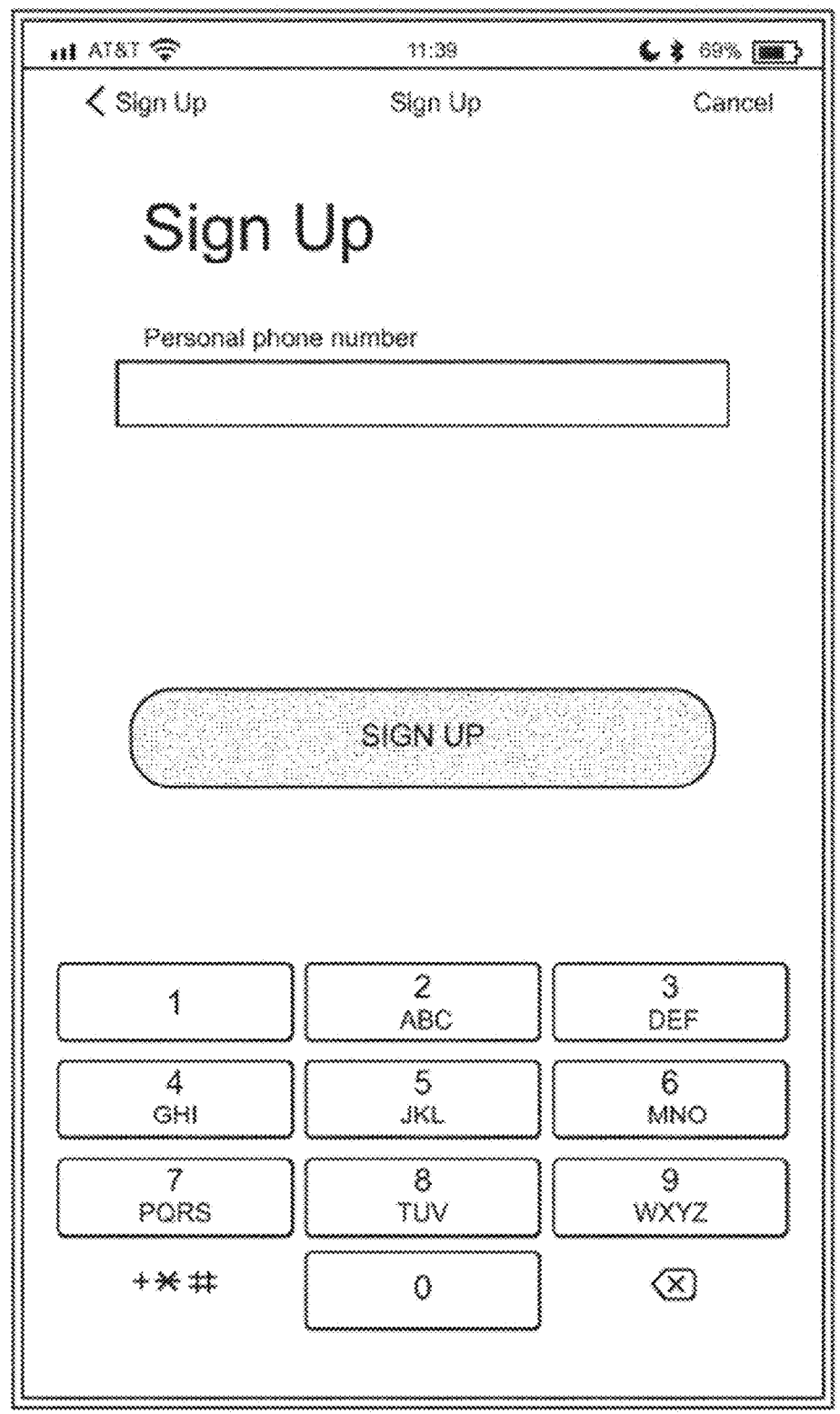
Figure 7A:
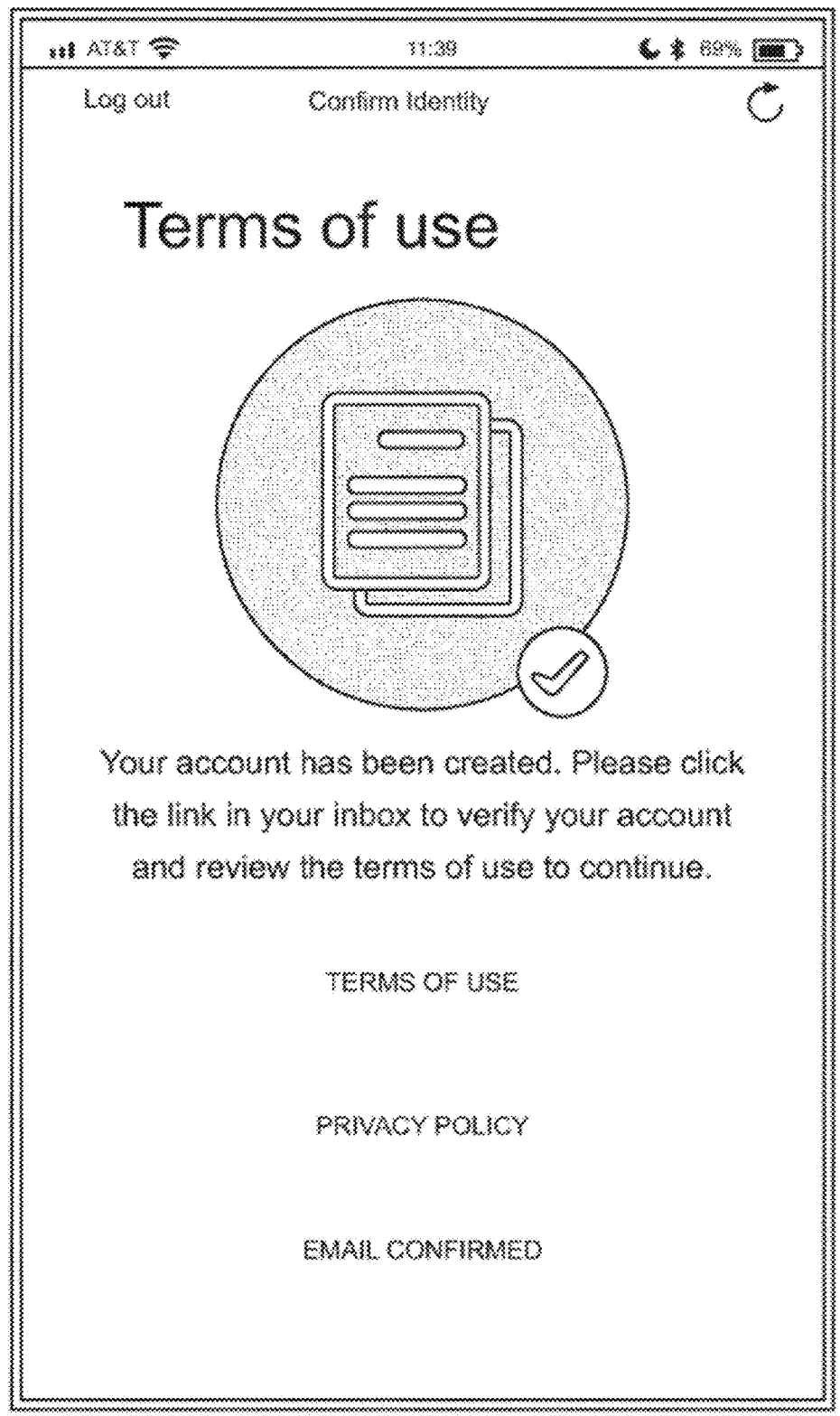
Figure 7B:
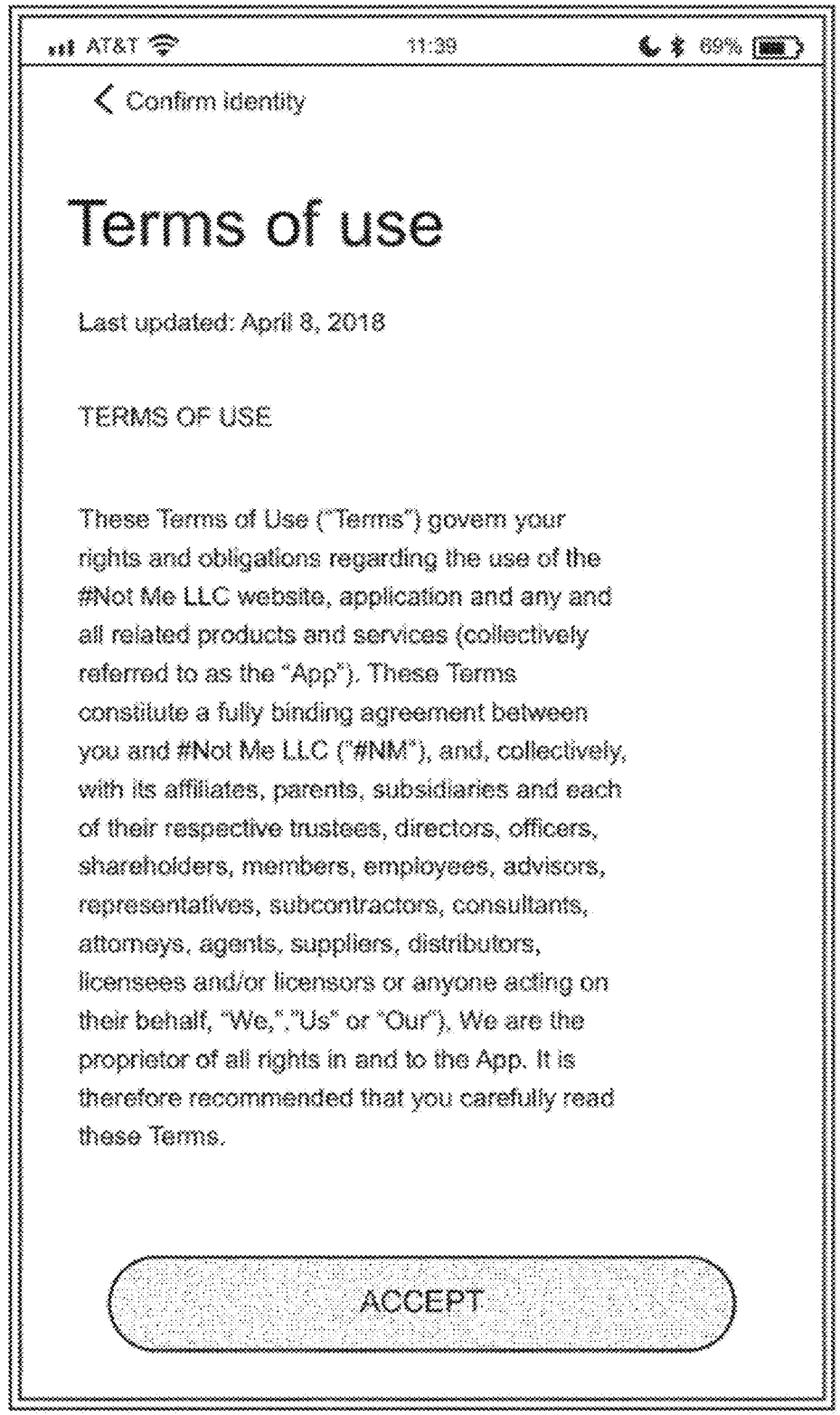
Figure 8:
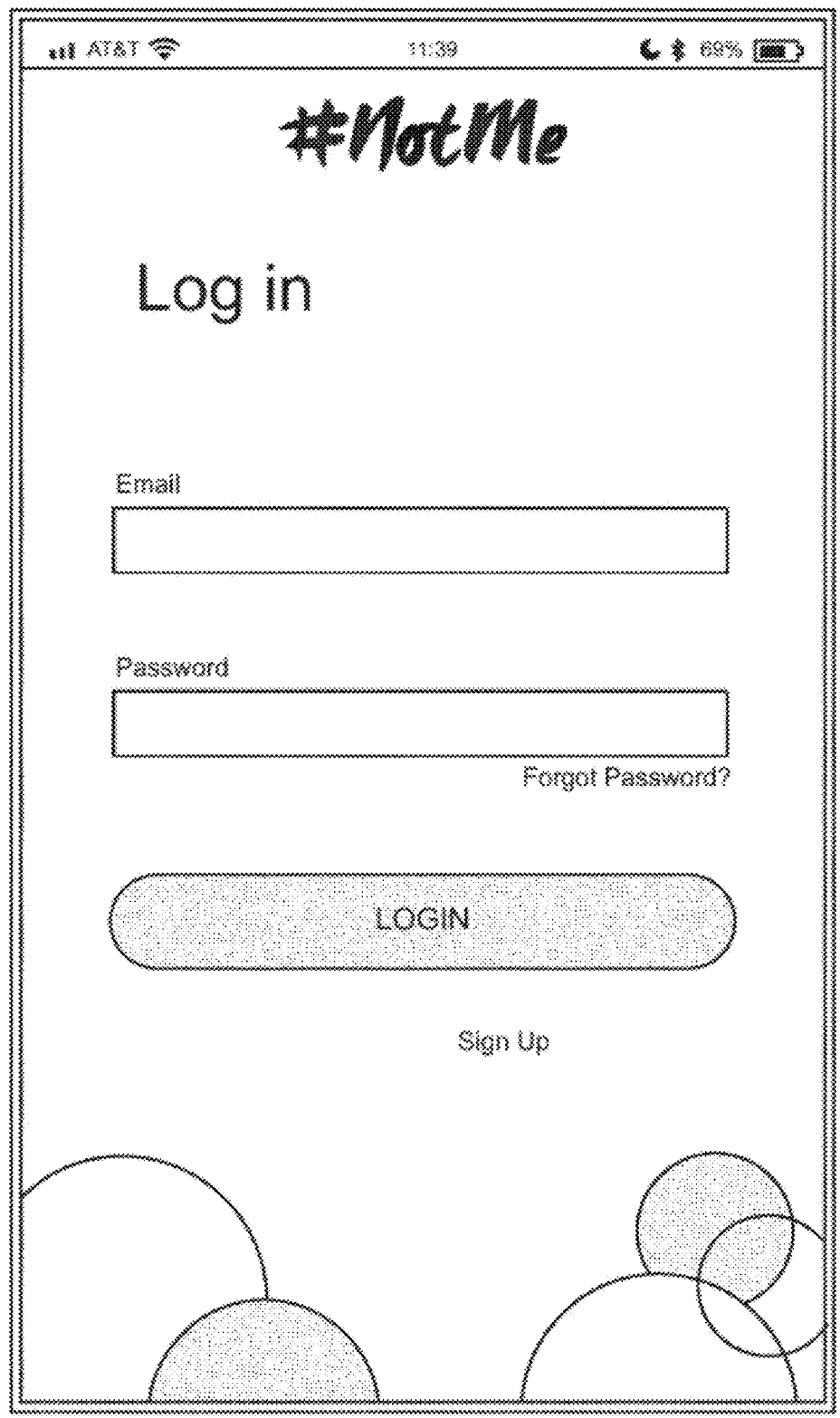

The questions for the various employers or organizations 14 are determined through the use of a Join table 24-3 in a relational database, that is, the central server database 24. As shown in FIG. 1B, one table 24-1 in the central server database 24 contains information of the employer 14, such as, company ID, company name, etc. Another table 24-2 in the central server database 24 contains all of the possible "What" questions, all of the possible "Who" questions, etc., and each question is assigned an ID. The Join table 24-3 is then used to figure out which questions are assigned to each employer or organization 14. That Join table 24-3 is referenced by the API call in order to display the customizable, company-specific inquiries that the employee 12 will see when he/she clicks on the "WHAT" icon 32, for example.

Each employer or organization 14 using the system is assigned the default set of questions (which are described below) to begin. The majority of employers 14 will use the default set of questions. It is not an efficient use of space to store the same default set of questions in full for every single employer 14. The Join table 24-3 allows the default set of questions to be stored only once, and then relate those questions to the appropriate employer or organization 14 with a more space efficient Join table 24-3.

Before discussing the default questions for the "WHAT" icon 32, "WHERE" icon 34, "WHEN" icon 36, and "WHO" icon 38, it should be noted that all of the employee's responses to the Who/What/Where/When questions are stored locally on the user's smartphone 18 until each pillar of questions (i.e., the Who/What/Where/When questions) is completed. Once completed, the central server database 24 is updated with the responses in a manner discussed below in more detail.

Upon clicking upon the "WHAT" icon 32, the employee 12 is provided with the option of identifying the action he or she is reporting (see FIGS. 20A-D, 21, 22). The employee proceeds through the various pages of prompts by clicking on the Next button 35. Referring to FIG. 20A-D, the employee 12 may first pick from various inappropriate actions, for example, including but not limited to, groping, touching, visual, jokes, lewd remarks, inappropriate comments, sexual intercourse, request for dates, inappropriate advances, expression of sexual interest, inappropriate physical contact in public or private places, shared sexually inappropriate images or videos (pornography) with you or coworkers, sent suggestive letters, notes, emails or texts, displayed inappropriate sexual images or posters in the workplace, told inappropriate jokes or shared sexual anecdotes, made inappropriate sexual gestures, stared in a sexually suggestive or offensive manner, made sexual comments about appearance, clothing, or body parts, inappropriately touched, including pinched, padded, rubbed or purposefully brushed against you or another person, asked sexual questions such as questions about someone's sexual history or their sexual orientation, or made offensive comments about you or someone's sexual orientation or gender. If none of these actions properly describe what has taken place, the employee 12 is provided with an "OTHER" input box for indicating other actions that have been taken.

Still further, the reporting app 16 will prompt the employee 12 to provide information as to whether any of the behavior being reported has anything to do with characteristics of the employee 12 including, but not limited to, age, ancestry, color, religious creed, marital status, gender, medical condition, mental condition, national origin, military and veteran status, genetic information, race, sex, family and medical leave, sexual orientation, union activity or workers compensation. If none of these properly describe the characteristics applicable to the behavior, the employee 12 is provided with a box labeled "OTHER" in which the information maybe input. See FIG. 21.

Figure 60:
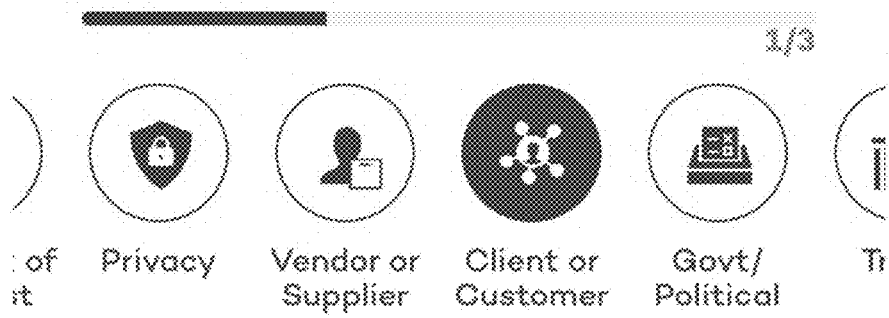
FIG. 60 shows screenshot diagram(s) illustrating examples of misconduct that may be reported using the reporting app in one embodiment of the WMMR.
Figure 61:
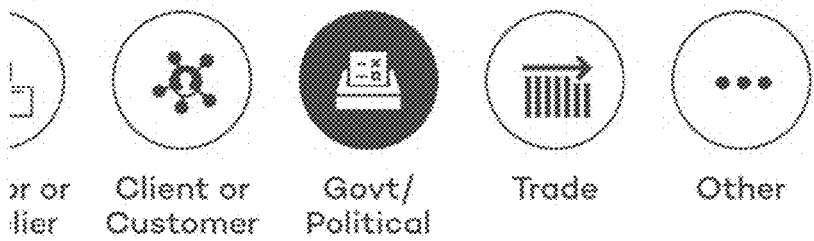
FIG. 61 shows screenshot diagram(s) illustrating examples of misconduct that may be reported using the reporting app in one embodiment of the WMMR.
Figure 62:
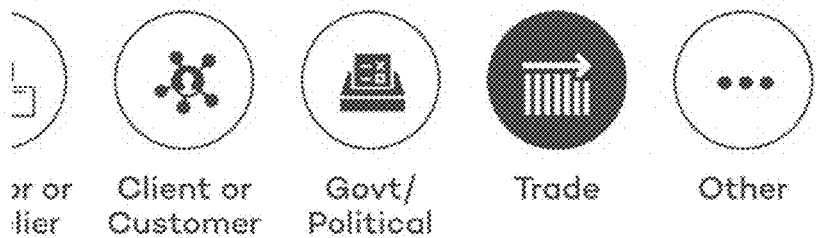
FIG. 62 shows screenshot diagram(s) illustrating examples of misconduct that may be reported using the reporting app in one embodiment of the WMMR.

FIGS. 50-62 show screenshot diagrams illustrating examples of misconduct that may be reported using the reporting app in alternative embodiments of the WMMR. FIG. 50 shows that the employee may report Physical category behaviors, issues, or sentiments such as blocked, followed, forced or undesired sexual intercourse, groping, hugging, inappropriate physical contact, kissing, leering, made inappropriate or obscene sexual gestures, and/or the like. FIG. 51 shows that the employee may report Verbal category behaviors, issues, or sentiments such as belittled, bullying, coercion, comments about appearance, clothing or body parts, encouraged other to behave in a racist way, expressions of sexual interest, inappropriate advances, inappropriate compliments, and/or the like. FIG. 52 shows that the employee may report Visual category behaviors, issues, or sentiments such as displayed and/or shared sexual content or objects, sent suggestive content, shared inappropriate content, shared private content without consent, stared in a sexually suggestive manner, and/or the like. FIG. 53 shows that the employee may report Financial category behaviors, issues, or sentiments such as bribery, corruption, embezzlement, failure to pay meal and/or rest breaks, failure to pay wages and/or benefits, falsifying and/or manipulating financial reporting information, falsifying expense report, and/or the like. FIG. 54 shows that the employee may report Health & Safety category behaviors, issues, or sentiments such as offering unsafe and/or uncertified products or services to the public, potential food or drug hazards, substance abuse (e.g., alcohol, drugs), unsafe working conditions, violation of environmental regulations, violation of safety regulations, and/or the like. FIG. 55 shows that the employee may report COVID-19 (or other illness) category behaviors, issues, or sentiments such as denied meal and/or rest breaks, denied medical attention despite exhibiting symptoms, denied time off to care for a close relative who is at risk, denied vacation and/or paid time off (PTO) time while on furlough, discriminated against for being Asian or of Asian descent (or other race, color, national origin, etc.), and/or the like. FIG. 56 shows that the employee may report Retaliation category behaviors, issues, or sentiments such as decrease in pay, decrease in work hours, demotion, engaged in verbal or physical abuse, excluded from meetings, hindering company investigation, and/or the like. FIG. 57 shows that the employee May report Conflict of Interest category behaviors, issues, or sentiments such as accepting gifts and/or entertainment from vendor and/or supplier, doing business with and/or hiring family and/or close friend, romantic and/or close relationship with co-worker, starting, working for, making significant investments in, or advising a competing business, and/or the like. FIG. 58 shows that the employee may report Privacy category behaviors, issues, or sentiments such as breaching customer or consumer privacy expectations, breaching worker privacy expectations, violation of the company confidentiality expectations, and/or the like. FIG. 59 shows that the employee may report Vendor or Supplier category behaviors, issues, or sentiments such as accepting inappropriate gifts or kickbacks from vendor or supplier, discriminating against vendor or supplier, giving an unfair advantage to a vendor or supplier, violating contract terms with vendor or supplier, and/or the like. FIG. 60 shows that the employee may report Client or Customer category behaviors, issues, or sentiments such as breaching client or customer privacy expectations, discriminating against client or customer, offering something of value to improperly influence a potential and/or existing client or customer, violating contract terms with client or customer, and/or the like. FIG. 61 shows that the employee may report Government and/or Political category behaviors, issues, or sentiments such as improperly interacting with government officials, improper political contributions to officials or organizations, offering something of value to influence a public official, and/or the like. FIG. 62 shows that the employee may report Trade category behaviors, issues, or sentiments such as delivering goods or services to or otherwise dealing with individuals, entities, or countries and/or regions that are subject to trade restrictions or embargoes, moving goods in violation of applicable customs laws, and/or the like.

The reporting app also allows an employee to report whether the same or similar actions had been previously reported. See FIG. 22. Once the employee has answered all of the questions in the "WHAT" questionnaire, the "WHAT" box gets updated with a check mark (FIG. 23) to indicate to the employee that the "WHAT" questionnaire has been duly completed. The employee 12 may then click the "CONTINUE" button 35a and continue inputting information.

Figure 26:
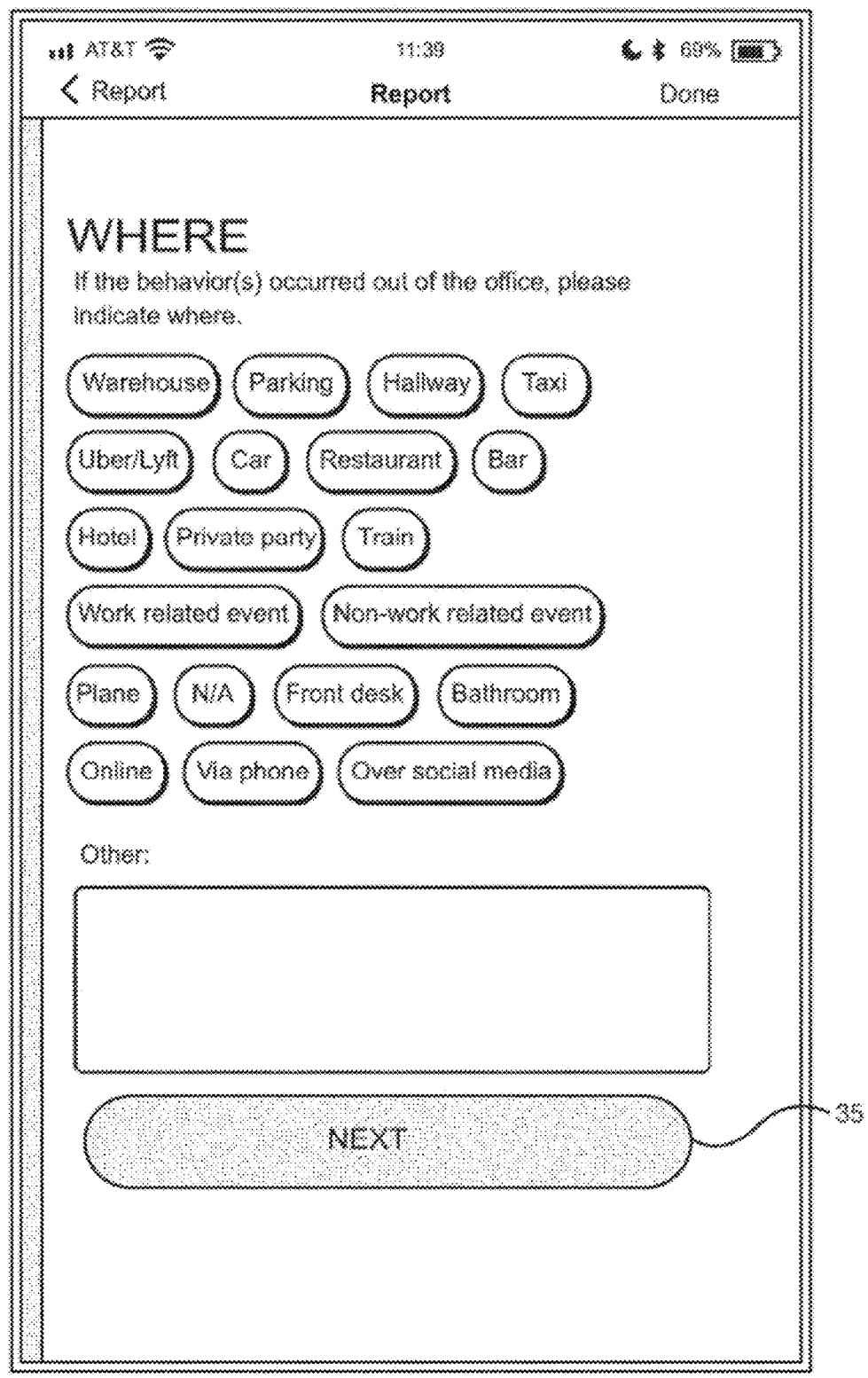
Figure 27:
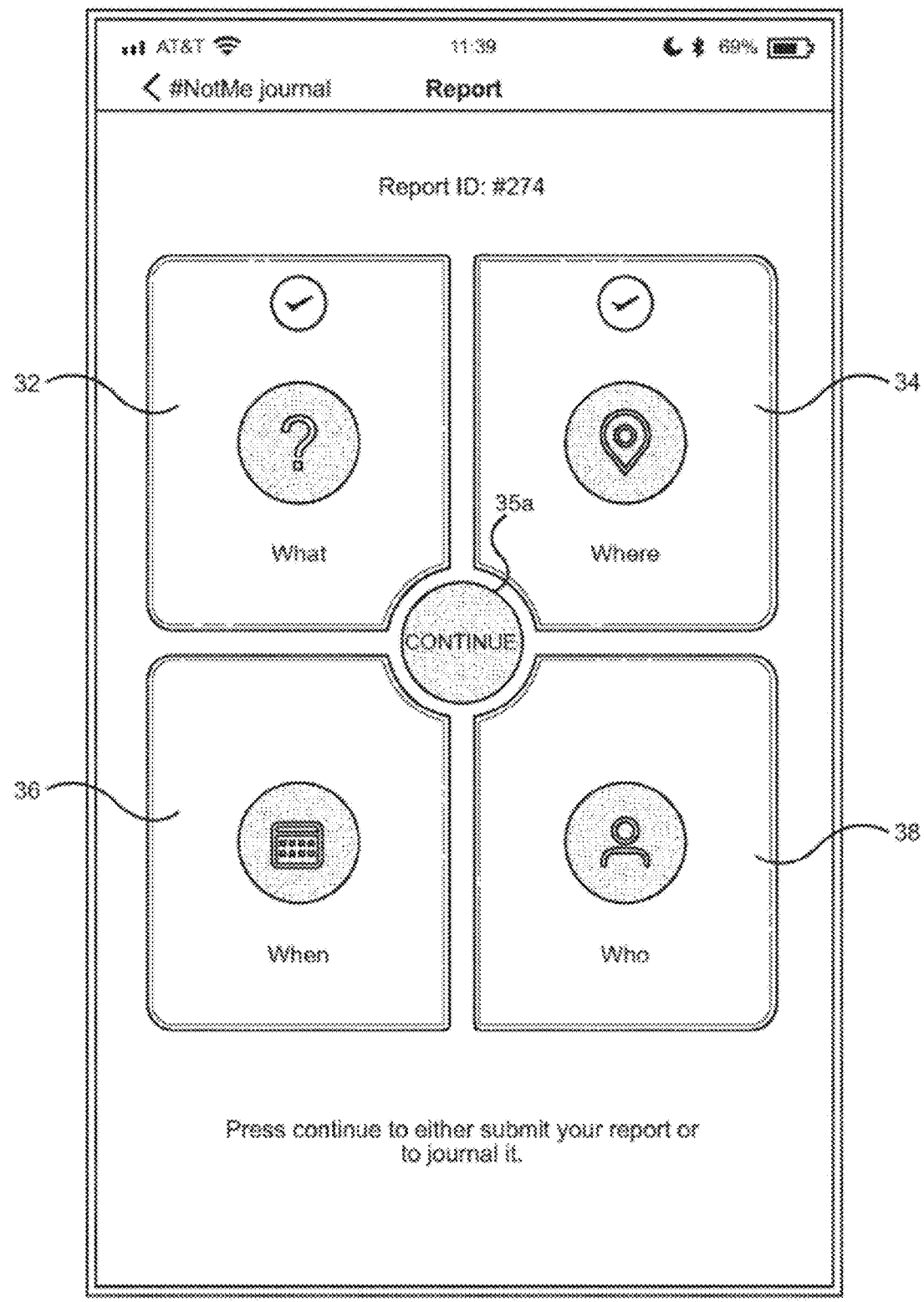

As mentioned above, and with reference to FIGS. 24, 25, and 26, the employee 12 may also provide information as to "WHERE" the action happened or occurred. In conjunction with this, the employee 12 is prompted to describe the location "WHERE" the incident or instances happened. The employee 12 is then asked to indicate where the behavior occurred if in the office or out of the office (See FIG. 24). If the behavior occurred in the office, the employee is asked to select where it happened in the office, for example Bathroom, Break room, Reception, over social media, online, etc. (see FIG. 25). If the behavior occurred out of the office the employee is asked to indicate where it happened, for example, in a Uber/Lyft, online, at a party, etc. (see FIG. 26). When the final NEXT button is clicked as shown in FIG. 26, the employee 12 is returned to the graphical user interface showing four icons that are provided for inputting relevant information. Once the employee has answered all of the questions in the "WHERE" questionnaire, the "WHERE" box gets updated with a check mark (FIG. 27) to indicate to the employee that the "WHERE" questionnaire has been duly completed. The employee 12 may then click the "CONTINUE" button 35a and continue inputting information.

Figure 28:
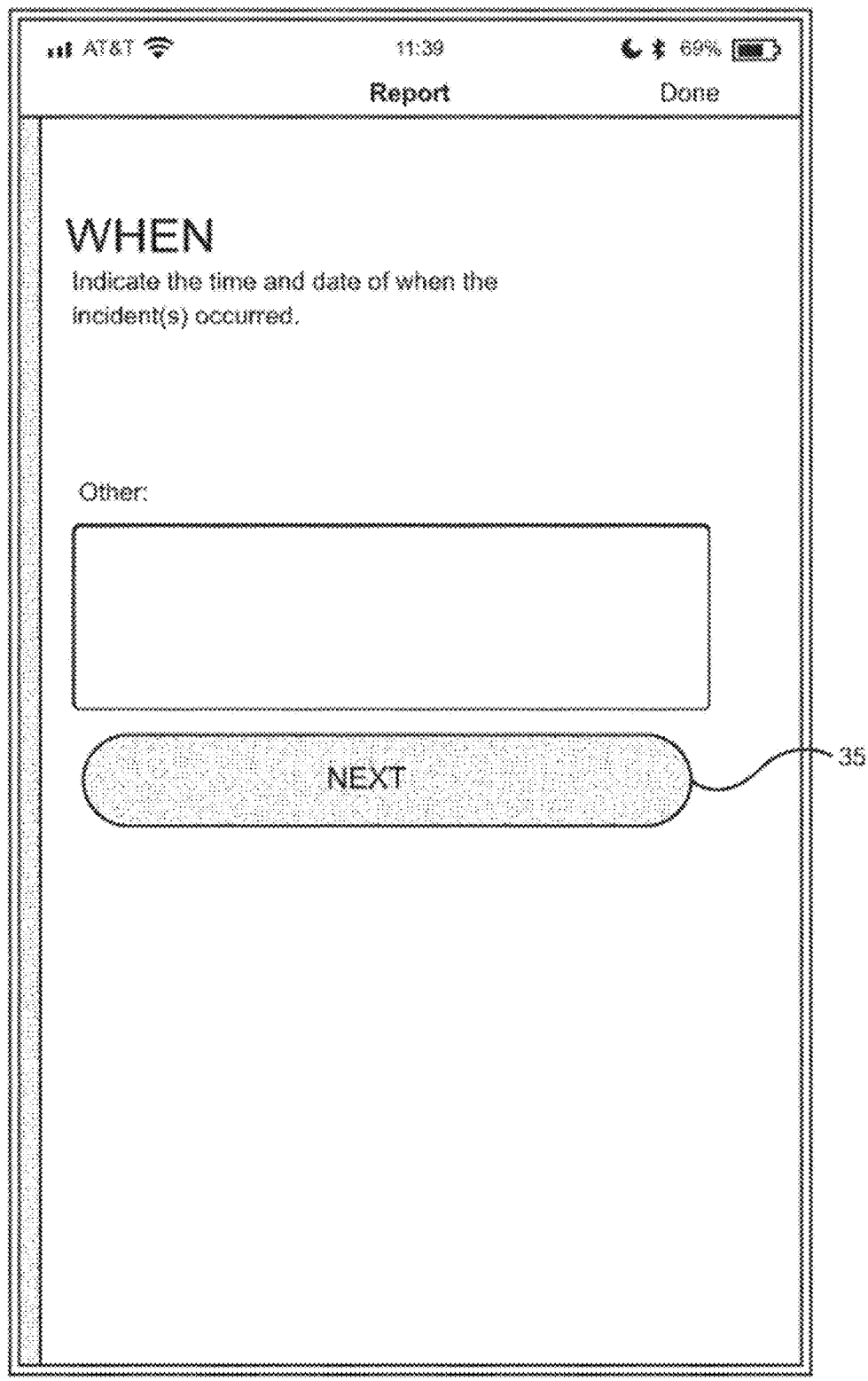
Figure 29:
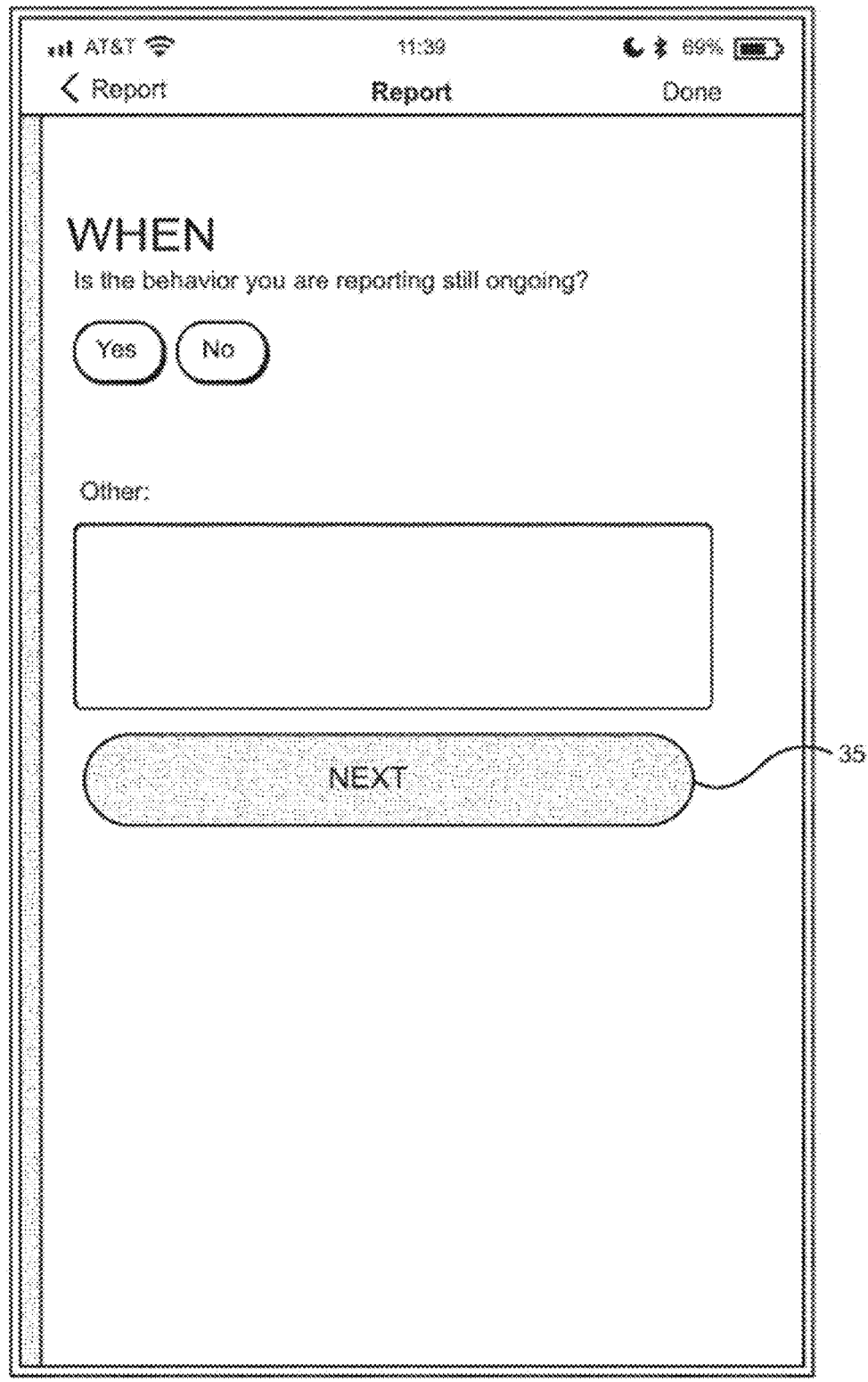
Figure 30:
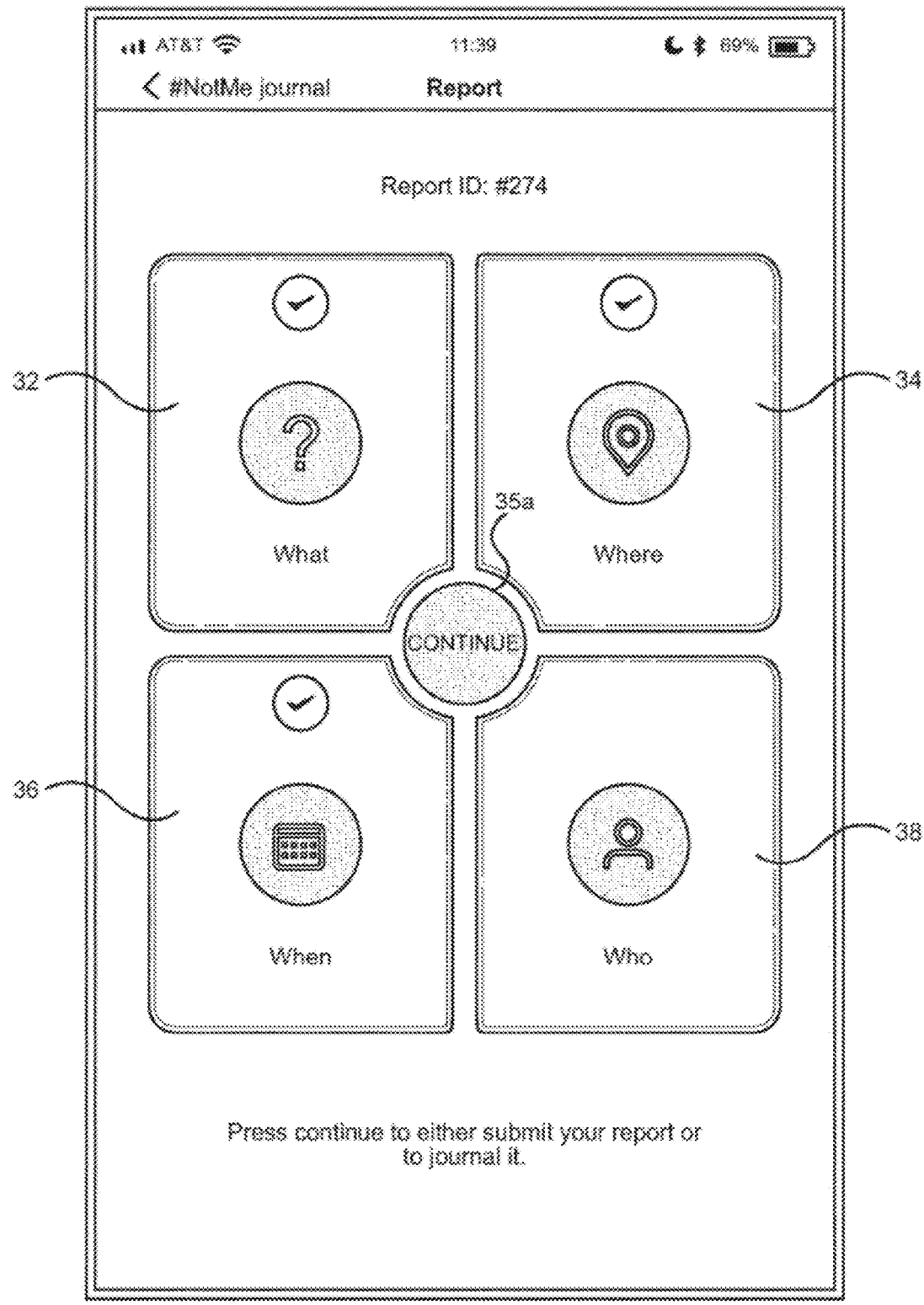
Figure 31:
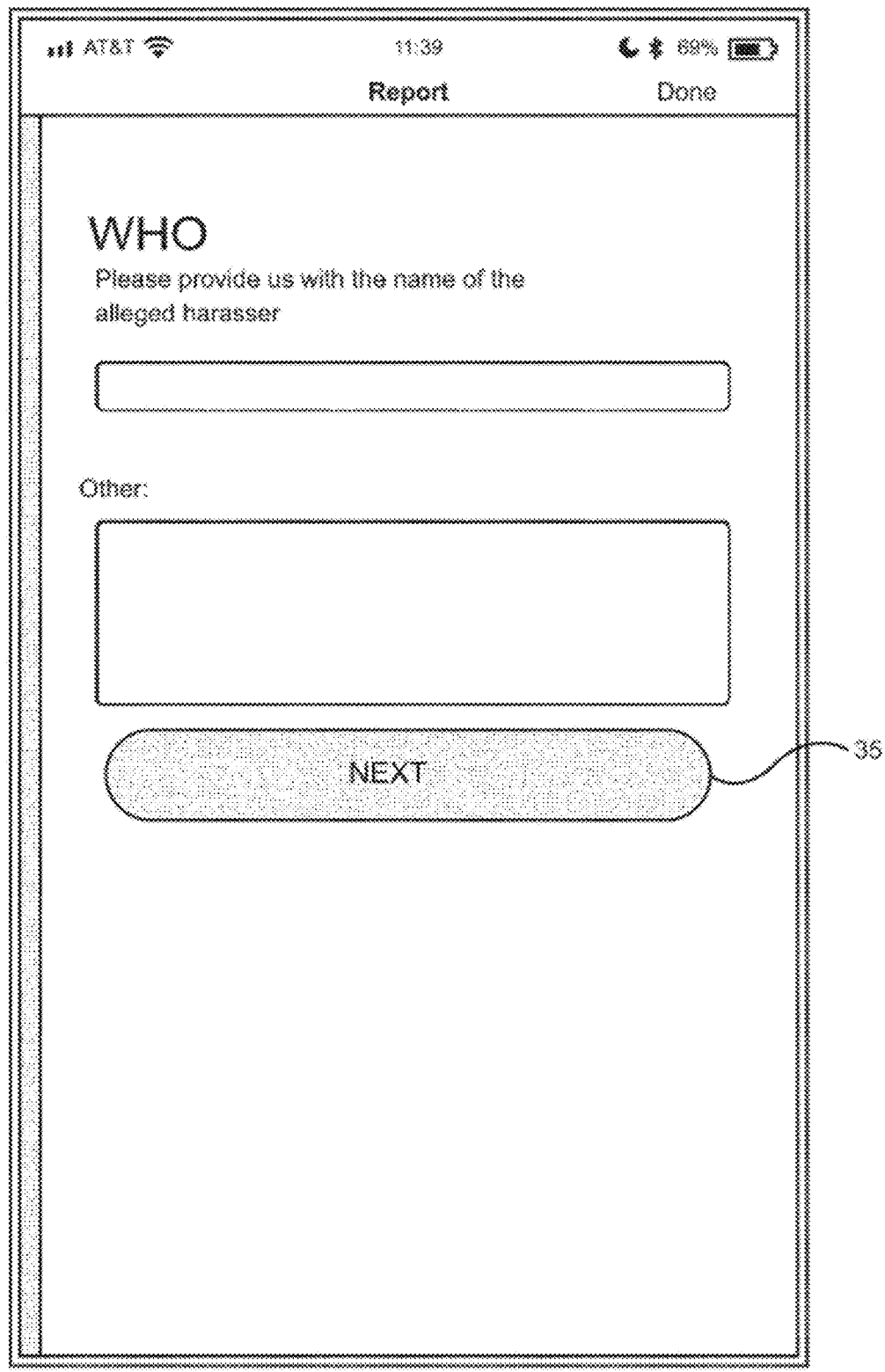
Figure 32:
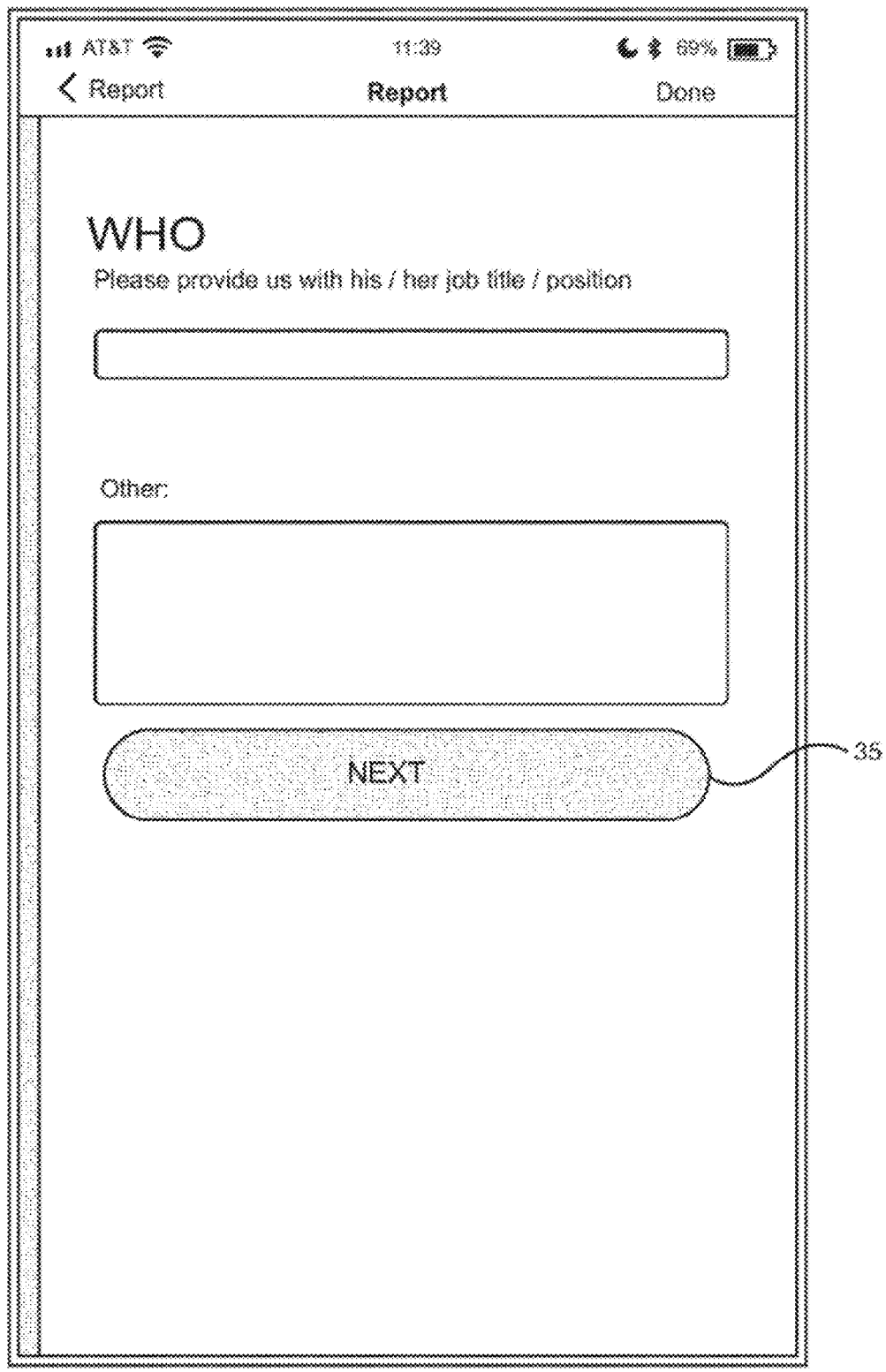
Figure 33:
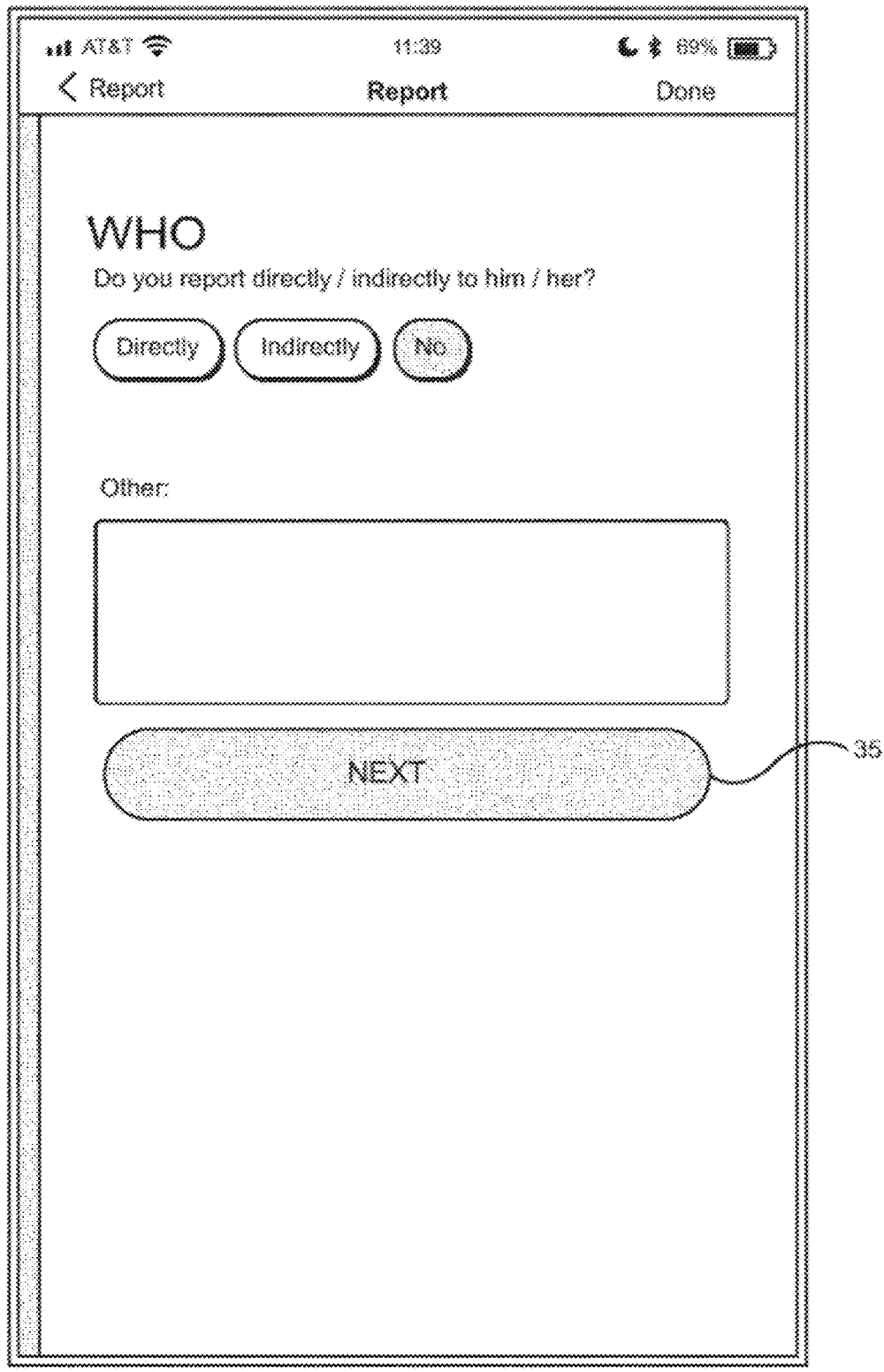
Figure 34:
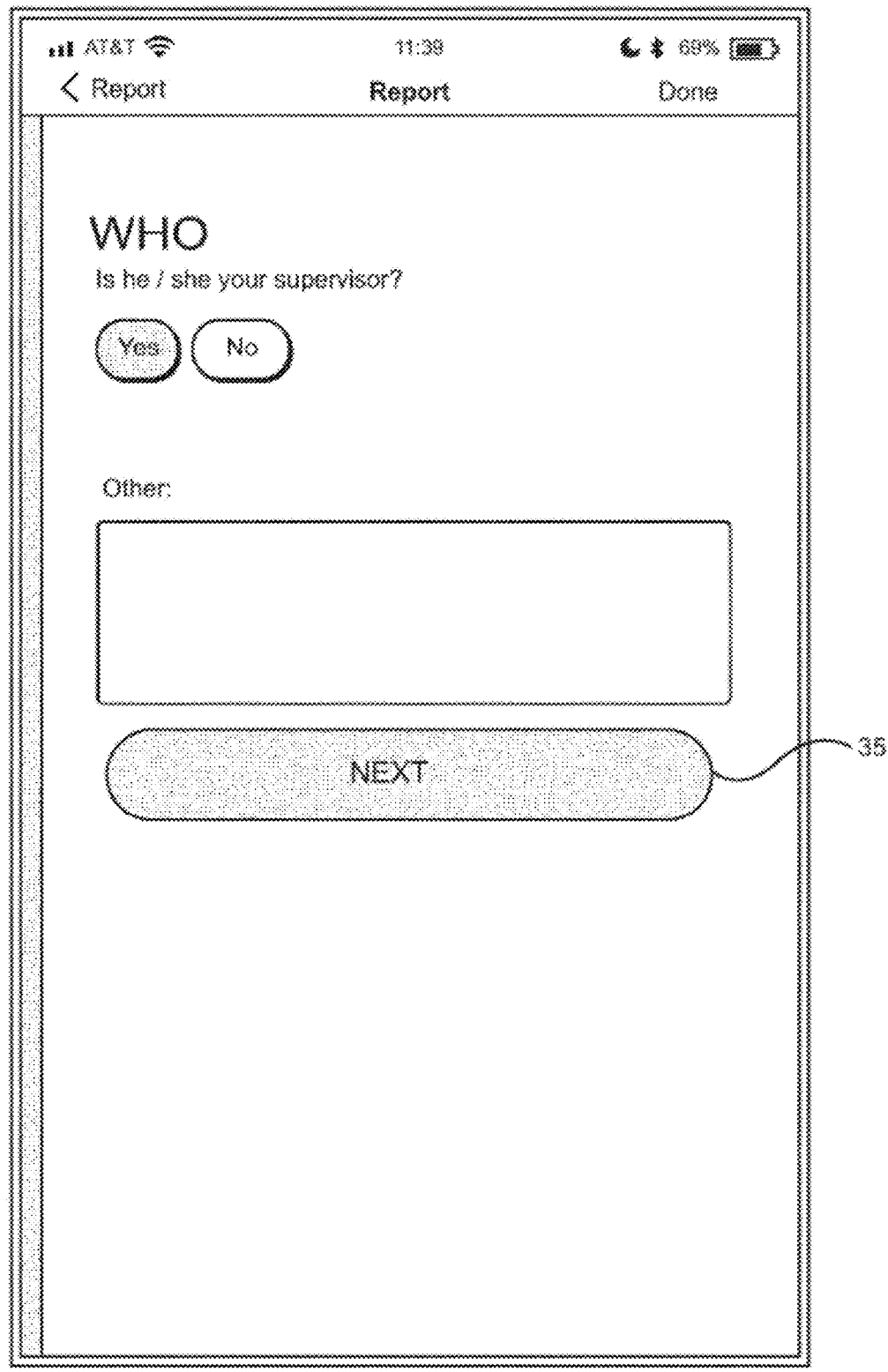
Figure 35:
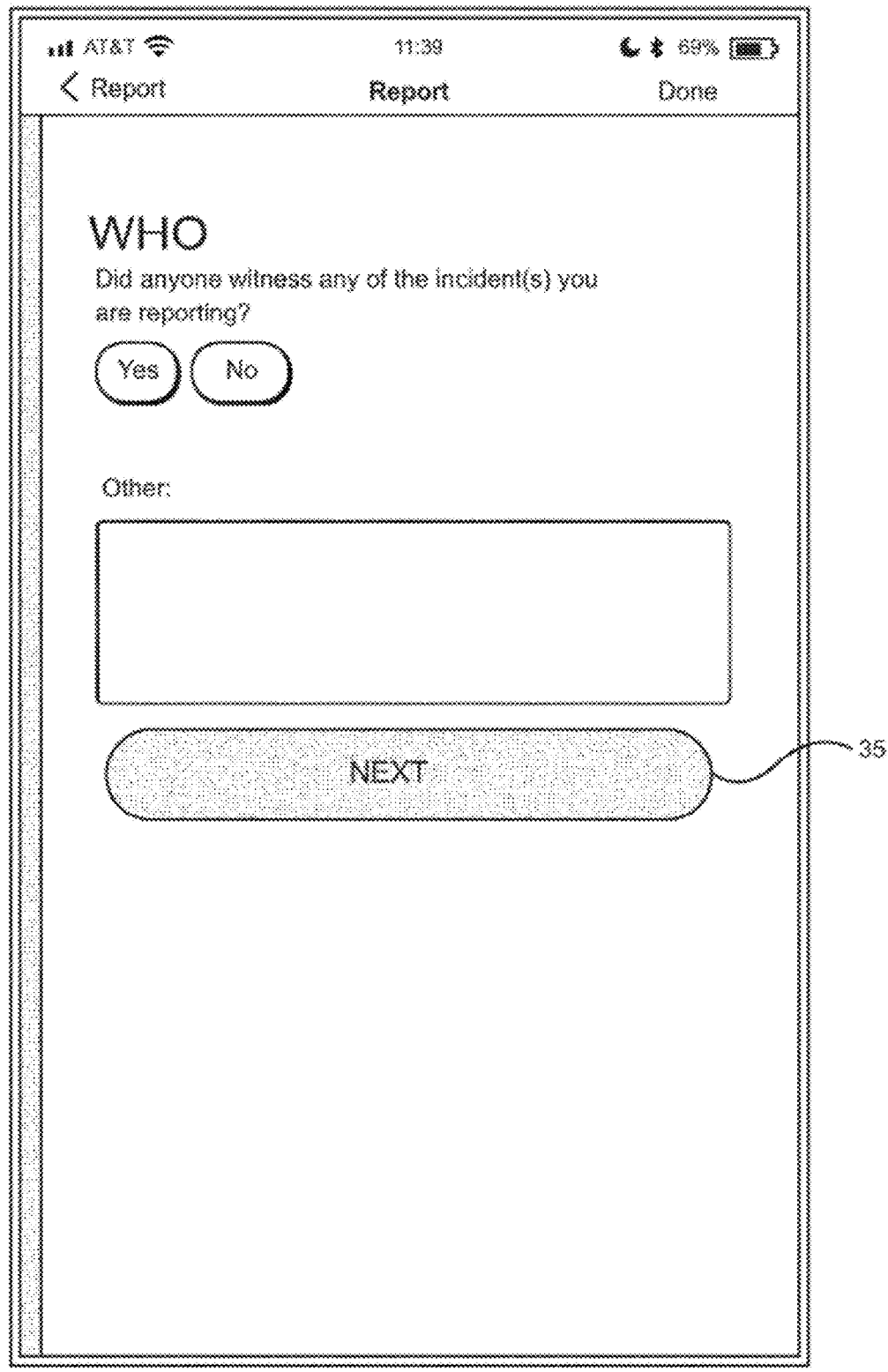
Figure 36:
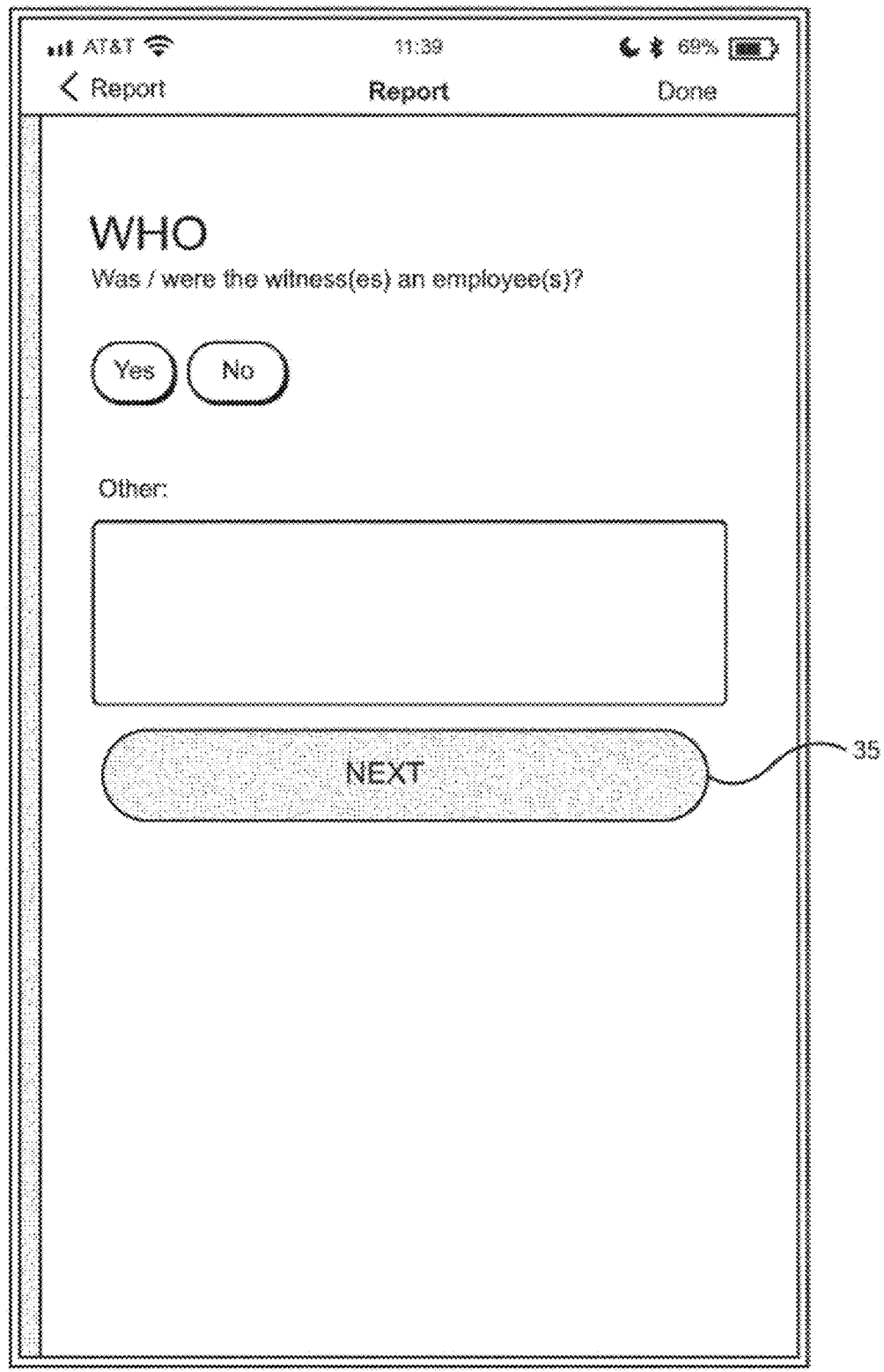
Figure 37:
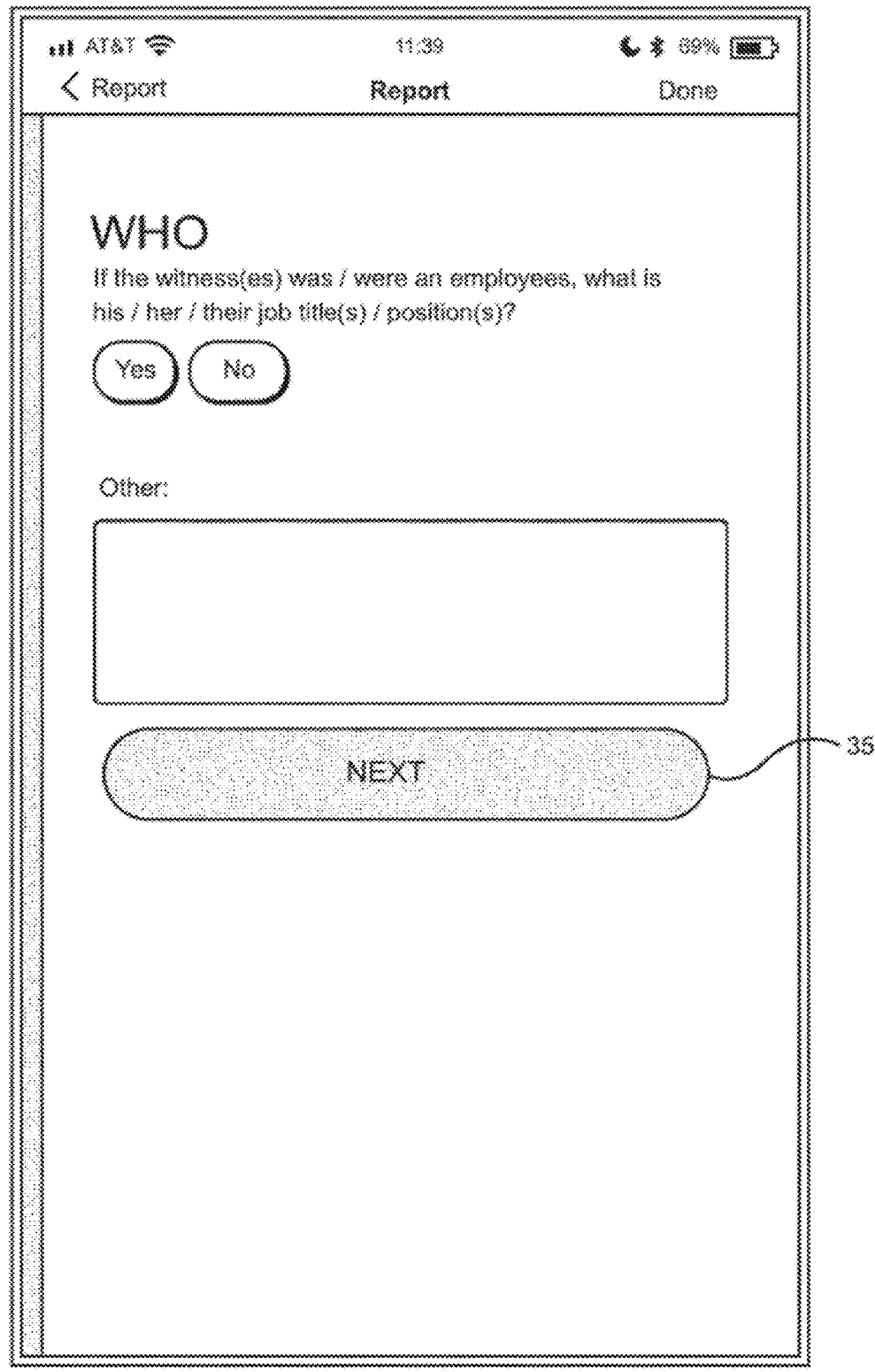
Figure 38:
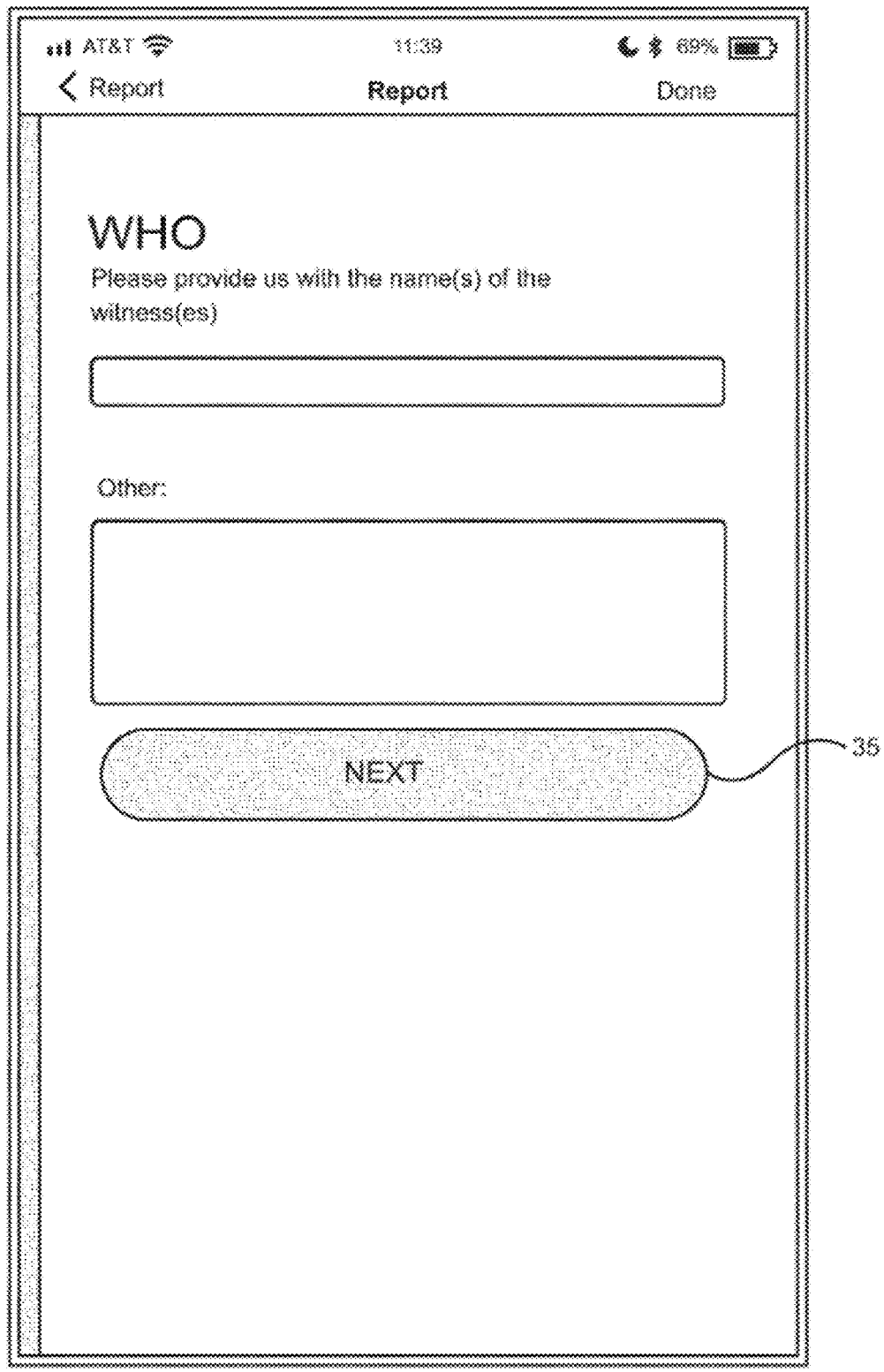

Further still, and with reference to FIGS. 28 and 29, the employee 12 is prompted to explain "WHEN" the incident or instances occurred (see FIG. 28). The employee is then asked if the behavior is still ongoing (see FIG. 29). When the Next button on the screen of FIG. 29 is clicked on this page, the employee 12 is returned to the graphical user interface showing four icons that are provided for inputting relevant information. Once the employee has answered all of the questions in the "WHEN" questionnaire, the "WHEN" box gets updated with a check mark (FIG. 30) to indicate to the employee that the "WHEN" questionnaire has been duly completed. The employee 12 may then click the "CONTINUE" button 35a and continue inputting information.

Figure 39:
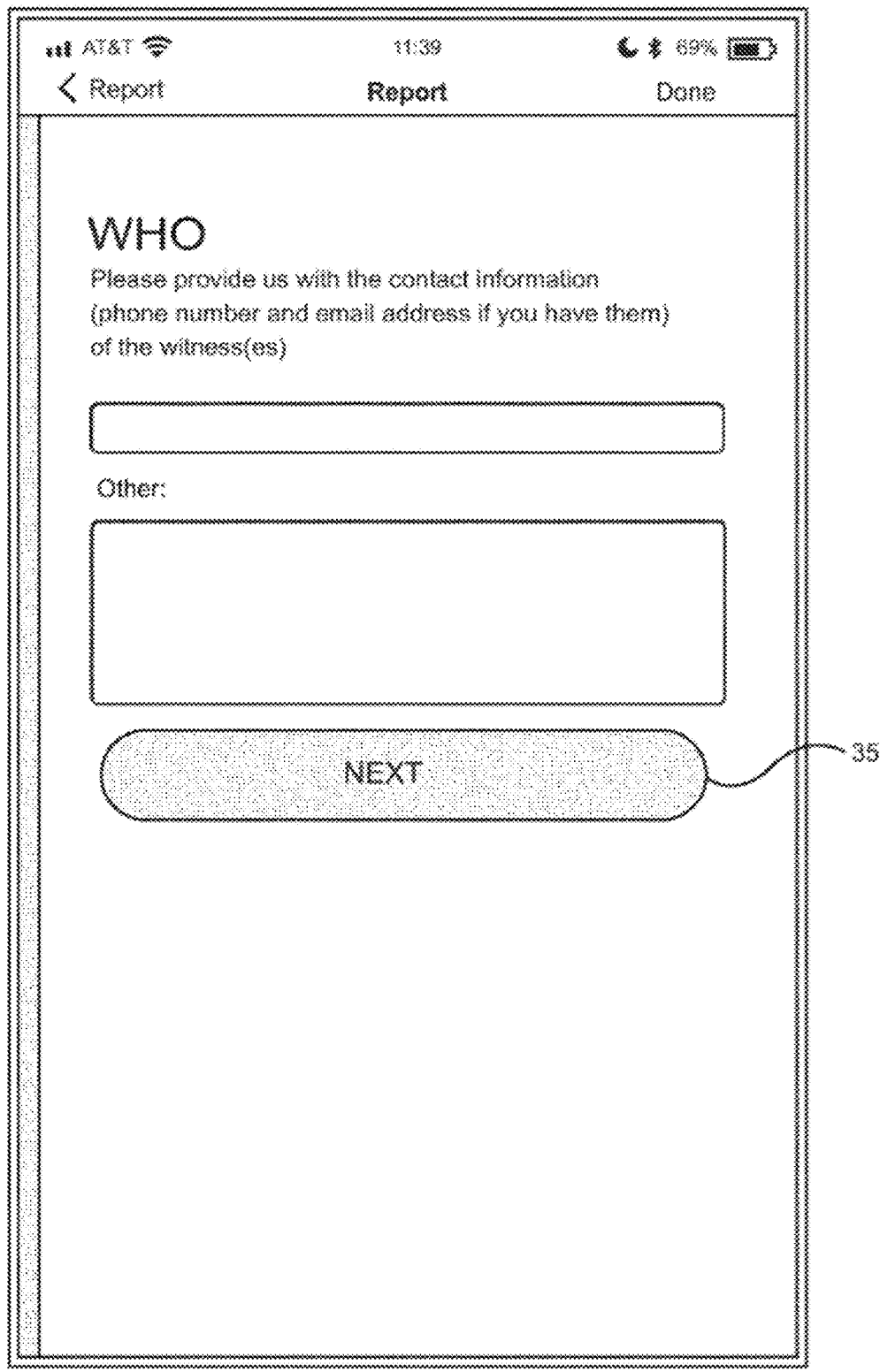
Figure 40:
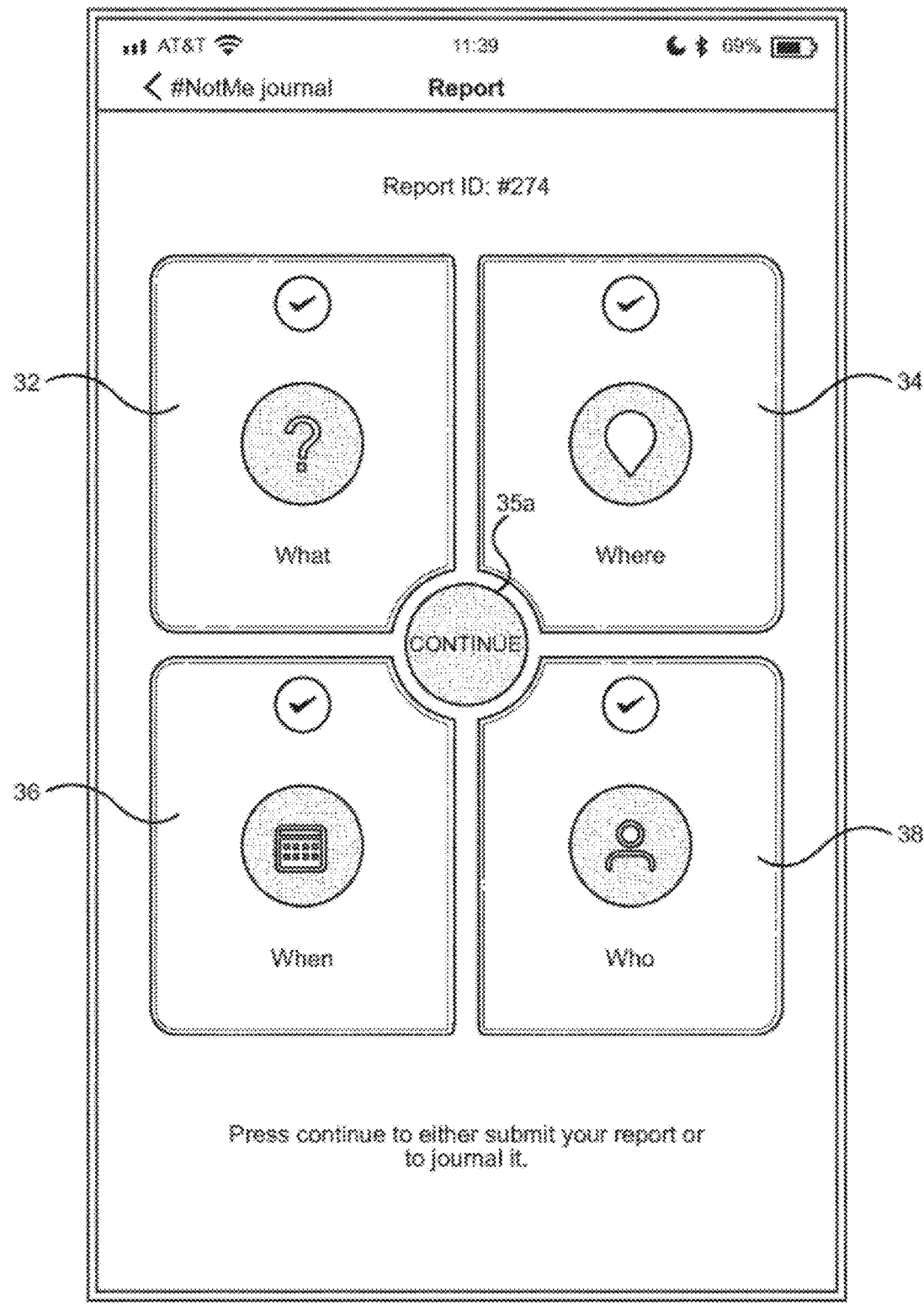
Figure 41:
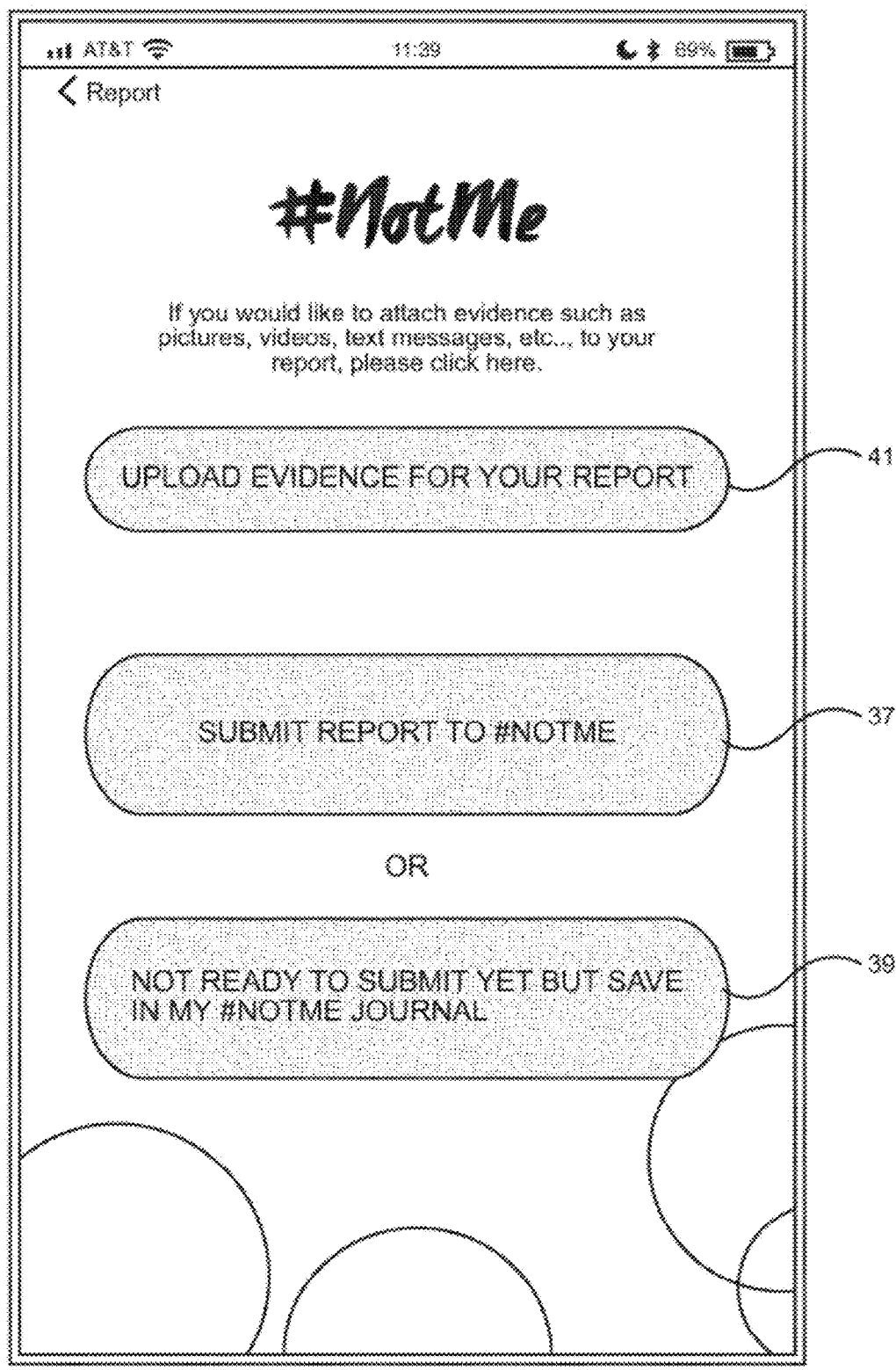
Figure 42:
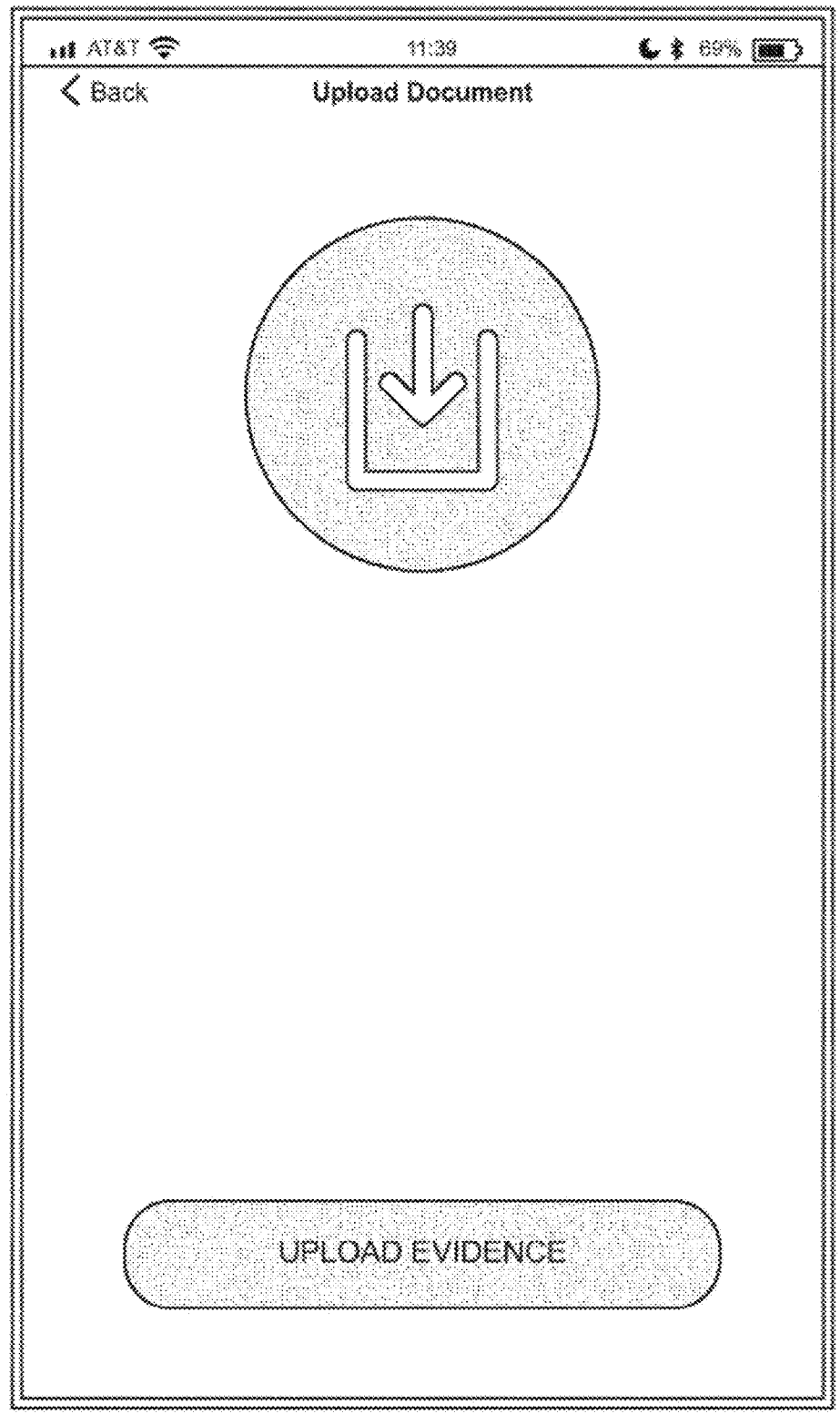
Figure 43:
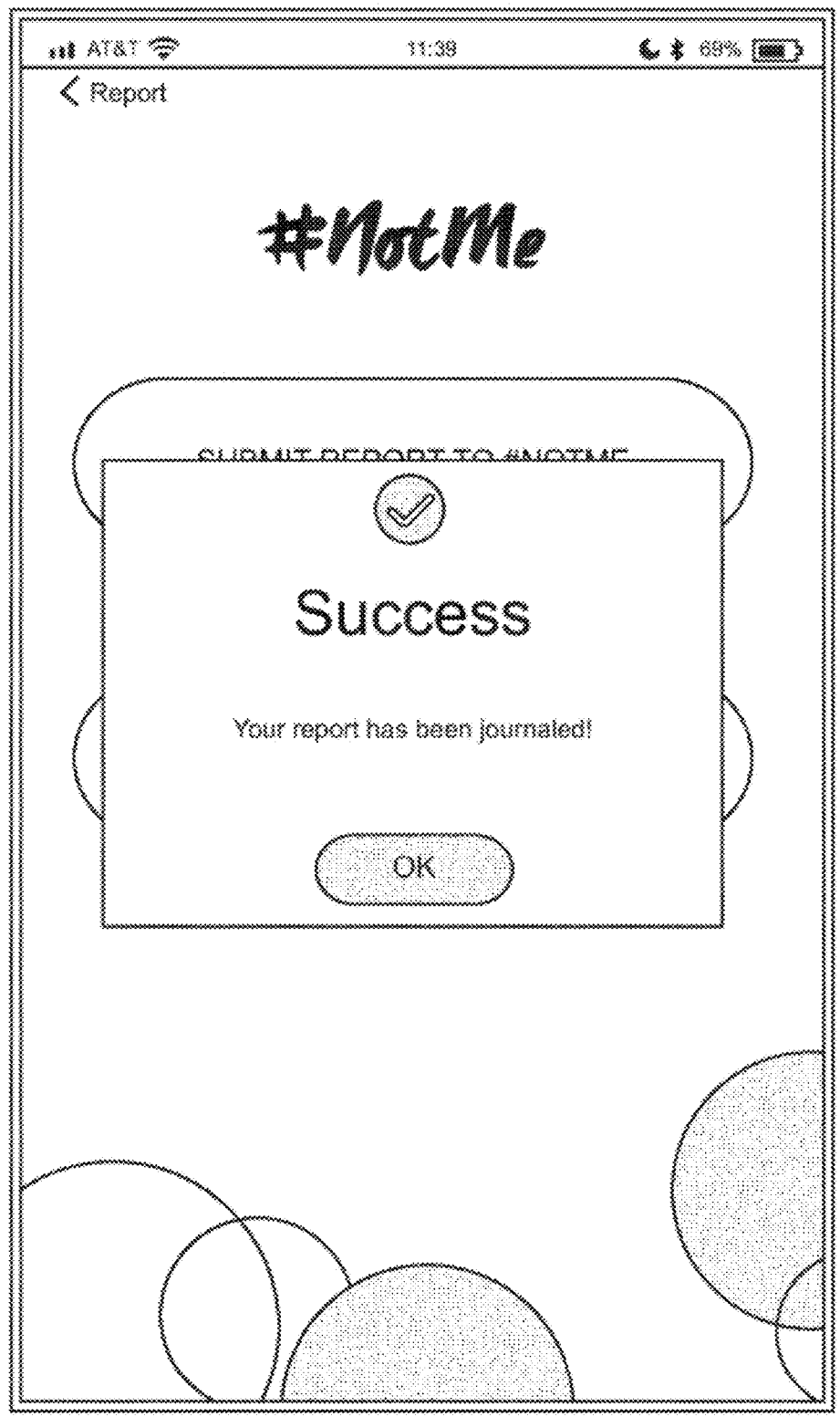
Figure 44B:
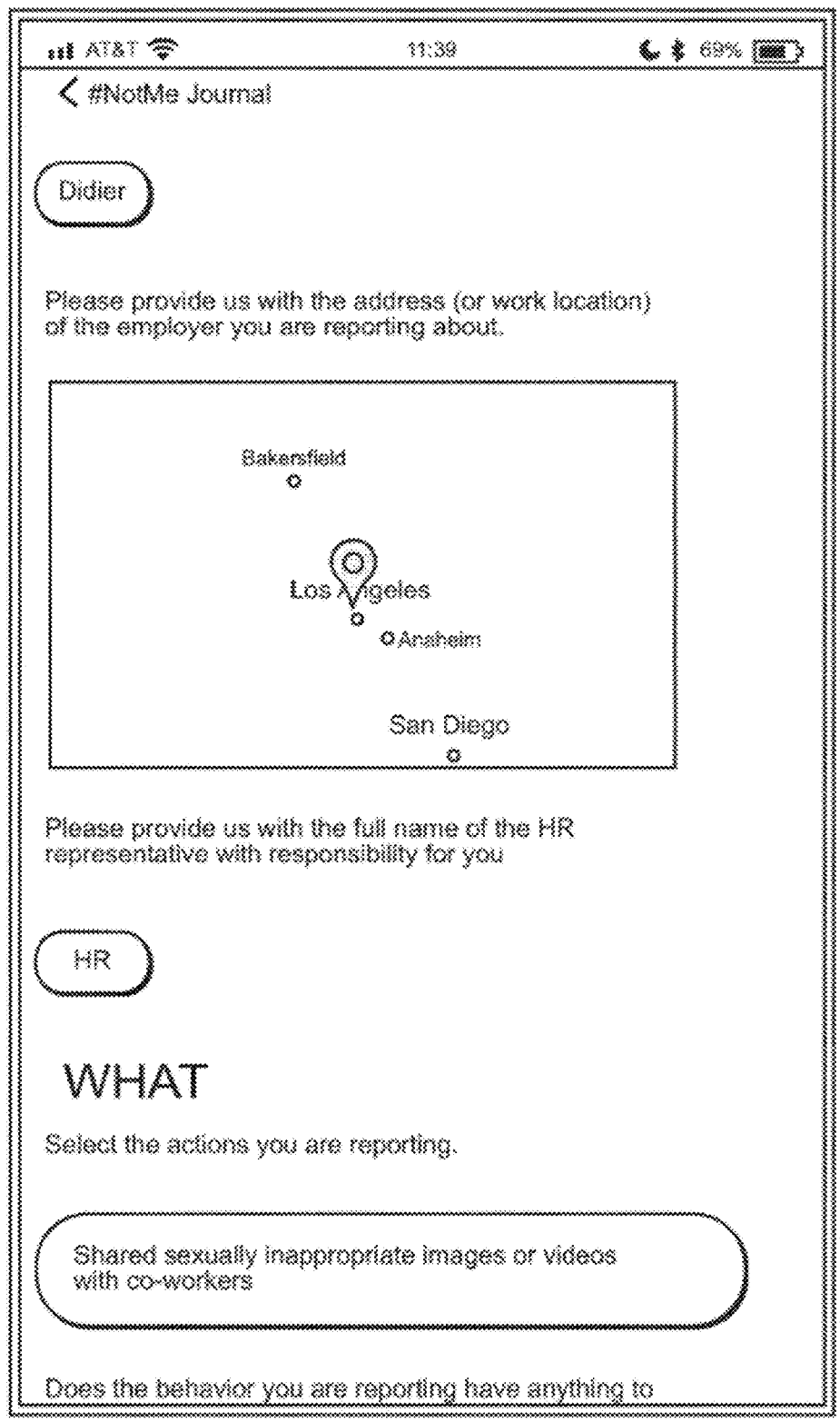
Figure 45:
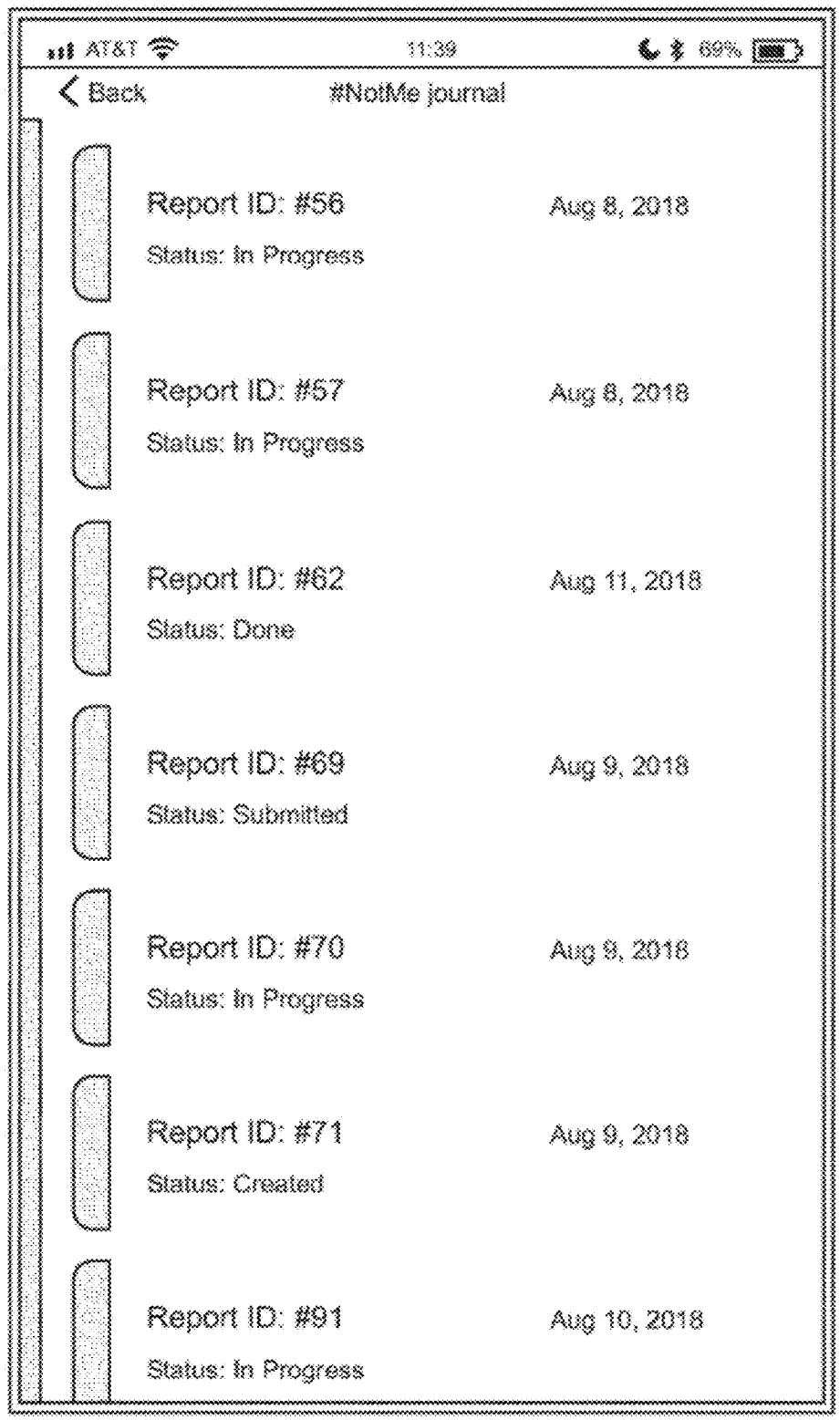

Finally, the employee 12 is prompted to provide information regarding "WHO" is the perpetrator of the actions and if there are any witnesses. In providing information identifying the perpetrator, the employee 12 is asked to name the alleged harasser, provide the alleged harassers job title/position, explain whether the employee reports directly/indirectly to the perpetrator, and identify whether the perpetrator is the employee's supervisor. If more than one perpetrator was involved or if there were witnesses to the incidents that are being reported, the employee 12 is given the opportunity to identify additional perpetrators and/or the witnesses. In addition, and as an evidence gathering mechanism, the employee 12 is provided with the opportunity to identify whether any witnesses are available. In particular, the reporting app 16 asks whether anyone witnessed any of the instances or incidents being reported. The employee 12 may provide the first and last name of the witness(es), the cell phone number of the witness(es), and the email address of the witness(es). See FIG. 31-39. When the Next button 35 on the screen of FIG. 39 is clicked on this page, the employee 12 is returned to the graphical user interface showing four icons that are provided for inputting relevant information. Where all the questions have been answered, the graphical user interface is updated with check marks on the various squares (see FIG. 40). At this point the employee may click the "CONTINUE" button 35*a*.

As mentioned above, while a preferred sequence is disclosed above for the gathering of information in accordance with the victim notification system 10, it is appreciated that the victim notification system 10 allows for the ordering of the data and steps in any which way the employee 12 reporting wishes. That is, the entry of the information and the steps taken in conjunction therewith can be switched as desired by the employee 12. If there are multiple offenders, for example, the employee 12 can have the ability to specify that there are multiple offenders at the beginning of the report so that the employee 12 can clarify that different offenders did different things (i.e., the WHAT might be different for different offenders, even if part of the same incident). Similarly, in the event one reports is intended to cover multiple instances (i.e., the WHEN is more than once), then the employee 12 would need the ability to specify the WHAT/WHERE for each such instance without having to re-specify the WHO each time and filing a distinct report for each instance.

Finally, and once the report is completed, the employee 12 is directed to upload any evidence he or she may have such as pictures, text messages, etc. and send the information to the central server database 24 which may subsequently be accessed by the employer 14, system administrator 22 of the victim notification system 10, or other stakeholders. See FIG. 40 and "REPORT NOW" button 35*b*. However, and as will be discussed below in more detail, the employee 12 is provided with the option of either reporting all of the information to the system administrator 22 for processing and use in accordance with the full scope of the victim reporting and notification system 10 (see SUBMIT REPORT TO #NOTME™ button 37) or the employee 12 may simply transmit the information for recordation and storage by the victim reporting and notification system 10, with no further action taken and access to the information only available to the employee 12 (see NOT READY TO SUBMIT YET . . . button 39). See FIGS. 41 and 43. The transmitted data is ultimately timestamped and provided with a report ID. The information is maintained by the system and may be reviewed by the employee before reporting. See FIGS. 44A-F. By inputting information in this highly structured manner, the resulting data is readily implemented for the purposes of the WMMR. The information reported is maintained in a history page of the reporting app 16 that provides a summary of the report including date, instances, incidents, the person reported, status, etc. (see FIG. 45). The reporting app includes functionality allowing for the ability to send evidence of the inappropriate behavior (for example, text messages, videos, photos, etc.) to the central server via the reporting app.

In practice, and as discussed above, the reporting app 16 collects, and temporarily stores, the list of steps and questions from the central server 21 (that is, "Who," "What," "Where," "When"). As such, the central server 21 provides all the questions to the reporting app 16. This means that changing a step or a question will only consist of changing it in the central server database 24, without the need of updating the reporting app 16. In addition to collecting the list of steps and questions, the reporting app 16 also collects, and temporarily stores, the type of answers required. For example, if the questions can only be answered with pre-defined answers, the reporting app 16 receives these from the central server 21. If it is an open question, the employee will have to input an answer using the keyboard or other input mechanism. The "finished" reports will be shown in the employer dashboard report 40 as discussed below in more detail.

In accordance with one embodiment, and considering the many steps involved in the preparation of a report in accordance with the WMMR, the reporting app 16 transmits the input information to the central server 21. At the end of every step, the input information is temporarily stored on the central server 21. This allows the employee 12 to save the progress made in answering questions and ultimately create the report later. During this step-wise process, the report is maintained in the central server database 24 as "in progress" and is only labeled "finished" upon final submission. This input information, however, is not available to system administrator 22 or other parties associated with the operation of the victim notification system 10, until the employee 12 "presses" the final button (that is, the SUBMIT REPORT TO #NOTME™ button 37) for submission, thereby labelling the report as "finished." By pressing the SUBMIT REPORT TO #NOTME™ button 37, the employee 12 validates the report and the report is stored within the central server database 24 for scoring and further processing as discussed herein. Where the employee merely presses NOT READY TO SUBMIT YET . . . button 39 the information is merely stored on the central server database 24. In accordance with a preferred embodiment, the data exchanged between the reporting app 16 and central server 21 (via the public API) uses the JSON (JavaScript Object Notation) format. It is sent through an HTTPS connection, which prevents security breaches.

As mentioned above, the employee 12 has the choice between journaling the report only (that is, clicking the NOT READY TO SUBMIT YET . . . button 39 and maintaining on the central server database 24 of the victim reporting and notification system 10 for use only by the employee 12) or fully submitting it to the victim notification system 10 (by clicking the SUBMIT REPORT TO #NOTMET™ button 37) for full use by the system administrator 22, the employer 14, and others who might be participating in conjunction with the victim notification system 10. The victim reporting and notification system 10 enables employees 12 to keep a journal and document behaviors and instances of harassment and/or discrimination without reporting them. Where the employee 12 only wishes to "journal" the report, the reporting app 16 will send the information to the central server 21 at the end of every step as discussed above. This information will not be disclosed to the system administrator 22 until the employee affirmatively directs the system 10 accordingly and it's marked as "submitted," although the step-wise save information will be saved to the central server database 24 for access by only the employee (see, for example, the screen shot of saved reports shown in FIG. 45).

In addition to either "journaling" the input information or submitting the report to the victim notification system 10, the employee 12 may attach and upload evidence in conjunction with the report. This is achieved by clicking on the UPLOAD EVIDENCE FOR YOUR REPORT button 41 (see FIG. 41) that leads the user to an interface screen (see FIG. 42) for completing the uploading process.

It is appreciated the steps and questions discussed above, will be maintained on the central server database 24 of the central server 21. As a result, and as briefly discussed above, if it is desired to change a step or a question, the system administrator(s) 22 of the victim notification system 10 just has to make such changes in the central server database 24, and then the specific step or question will be altered accordingly. The system will, however, still be able to compute the scores even with "deleted" steps or questions.

The information gathered as a result of the employee reporting app 16 and maintained in the central server database 24 is thereafter processed and analyzed in a manner optimizing some of the goals of the WMMR, that is, providing victims with a mechanism whereby one can safely, easily and anonymously (under certain circumstances) report conduct that is believed to constitute harassment and/or discrimination, as well as providing individuals and organizations tangentially affected by harassment and/or discrimination ability to effectively monitor and address such conduct.

The gathered information is employed by the data analysis system 25 for data analysis to provide timely information for both employees 12 and employers and organizations 14 that subscribe to the services offered by the operators of the victim reporting and notification system 10. The data analysis system 25 is remote from the central server 21 for both security purposes and so as to avoid bottlenecks in storing information in and querying information from the central server database 24. In practice, and as it will be explained below in greater detail, a data analysis system 25 issues an API call via a private API to the central server 21 to retrieve the next-in-line unscored report. The data analysis system 25 parses the report for the name of the alleged harasser and the user (i.e., victim or witness) and the data analysis system 25 issues an API call via the private API 29 to the central server 21 to query the central server database 24 for past reports about the alleged harasser and by the reporting employee 12 from within a certain time period (e.g., within the last three years, or as may be customized to meet specific needs). The data analysis system 25 performs its analysis and issues an API call to the central server to store its verdict in the central server database 24.

As previously mentioned, the data analysis system 25 includes the scoring system 27 doing the analysis mentioned above. The scoring system 27 provides employers 14 and third-party enforcement agencies, for example, law enforcement, with a mechanism for assessing the harassing and discriminatory behavior by "severity and pervasiveness." The scoring system 27 objectively assesses both the severity and the pervasiveness of the harassing and discriminatory behavior in order to determine the appropriate action to be taken. In arriving at an objective assessment, the scoring system 27 relies on structured data of pre-determined options (see the various prompts and defined answers provided by the reporting app 16 as explained above), making it easier to compare "apples" to "apples," rather than allowing open-ended reports that may not collect all the data required and making it harder to compare one report to another.

The scoring system 27 takes all of the information generated as a result of the collected reports and assigns a "severity score." As explained above, the data analysis system 25, and, therefore, the scoring system 27, is decentralized from the central server 21, as it is a data processing system on to itself. This means that the data analysis system 25 collects all the information generated based upon the reports from a private API 29 opening parts of the central server 21 (including data and functionality) for use by the scoring system. In accordance with some embodiments of the WMMR, the private API 29 is secured with private authentication tokens. As the victim notification system 10 grows, it is anticipated the system will ultimately be composed of a plurality of networked central servers 21 and a plurality of networked scoring systems 27 so as to help in maintaining a high uptime rate; meaning that if one of the servers crash, it will not have a major impact on other servers as these will keep running and collecting data.

The data analysis system 25 collects metrics from the private API 29 for use for the scoring system 27. In some embodiments, when a report is "submitted" in accordance with the WMMR, it is stored in the central server database 24. The data analysis system 25 accesses this information via the private API 29, and the scoring system 27 of the data analysis system 25 calculates and computes the severity and pervasiveness of the conduct, and assigns an objective score regarding both the severity and the pervasiveness of the behaviors or instances that are being reported. The objective scores, as well as intermediate data generated during the scoring processing, are saved in a database table 27db of the scoring system 27. The central server 21 will, then, be able to access to this data, that is, objective scores, as well as intermediate data generated during the scoring processing, when needed.

The scoring system 27, in generating objective scores, as well as intermediate data generated during the scoring processing, analyzes the reports to extract "key points" (for example, behavior, frequency, person involved, relationship between the victim and alleged harasser (reporting/subordination link for example)). Severity factors are applied to these points to calculate a score for each report.

For example, when computing reports of a same person about "Inappropriate jokes":
  the first report will result in a low score because the scoring system will not find any other identical behaviors,
  but the second report will have a higher score than the first one.
Same thing if a person is reported multiple times by different victims for example.

In accordance with a preferred embodiment, actions will be categorized as Category 3 relating to behaviors or instances occurring either on multiple occasions over time OR are on their own serious enough; Category 2 relating to behaviors or instances occurring multiple times (behaviors happen between 1 and 3 times) to the same victim OR more than one victim or witness have complained about the same individual for the same behaviors OR because it involved a link of subordination between the victim and alleged harasser; Category 1 relating to behavior or instance which occurs only on one occasion AND only against the same victim.

It is appreciated that the scoring system 27 is structured to allow for real-time processing of reports. However, it is appreciated that a downtime of the scoring system 27 may be encountered and contingencies have been developed to allow for the collection of reports during the downtime, with subsequent application of the scoring system 27 upon the resumption of the victim notification system 10. This means that when computing a report, the scoring system 27 will only take account of what happened the day of the report or earlier.

As such, the scoring system 27 includes "artificial intelligence" to detect and flag patterns, as well as associate a report from the victim notification system 10 with an intelligent score, for example, multiple reports by the same alleged harasser, victim targeted by multiple alleged harassers, whether the alleged harasser is a supervisor or not. After querying the past reports from the central server database 24, the data analysis system 25 parses it to only keep the information needed; the remaining information is discarded by the data analysis system 25, although it will be retained by the central server database 24 in the event it later becomes relevant. This allows the assignment of scores depending on the past behaviors. With this in mind, the scoring system 27 is enabled to:

Detect "fake" reports using Artificial Intelligence. Stance detection can be performed using the information given by the victim in the report and the evidence documents uploaded. 8

Detect and flag behaviors occurring multiple times. The scoring system 27 considers new reports accessed via the private API 29, keeps the important information (behavior, alleged harasser, victim . . . ), matches this information with the existing records (behavior occurrences, number of reports involving the alleged harasser, number of reports involving the victim), and sets a score depending on a grading given by the programmer.

Constantly update itself with new behaviors so the scoring system 27 is always able to determine what is a red-flag behavior, for example. This score will be sent to the private API 29 for updating of the central server database 24. On the company's side, the subscriber dashboard will have a colored light (yellow, orange or red) on each report that will simply describe the score to the user.

Pull notifications from the central server database 24.

With this in mind, it is apparent, the intelligence of the scoring system 27 lies in its ability to apply predefined rules in a systematic manner based upon previous reported behaviors to have a score that better predicts how important a currently reported behavior is. For example, reports from 6 months ago won't impact the score the same way as a report from 3 days ago will. This is achieved using mathematical functions only. However, it is appreciated Artificial Intelligence techniques could be implemented in conjunction with the WMMR. For example, either a Random Forest (an algorithm that takes decisions based on an automatic voting system, and would perform well in most cases) or an AdaBoost algorithm (an algorithm that will associate each behaviors with a factor, and would perform well in solving hard cases) might be effectively implemented in accordance with the WMMR.

As discussed above, while the generated information is processed by the scoring system 27, the central server database 24 continually maintains all of the input information allowing for the victim notification system 10 to provide a "journaling" functionality allowing the employee 12 to just keep notes of what happened without actually reporting the behavior. In that instance, the report would be cached locally (or potentially on the network) but not analyzed.

As explained above, the information gathered as a result of the employee reporting app 16 is maintained in the central server database 24 that may be accessed by the employer 14. In addition, the information may be forwarded to the system administrator 22 or third-part enforcement agencies, or the employer 28 as required in accordance with the victim notification system or in accordance with the employer's requests 10. Employers wishing to subscribe to the victim notification system 10 simply register with the victim notification system 10 and agree to comply with the underlying rules and requirements. Included with the employer registration may be information regarding geography and business unit information of the employer 14 which allows recommendations to be generated not just for the specific accused but also for the relevant geography/business unit. In this way, if a particular department is receiving a number of other otherwise low-level complaints regarding various different people, there may be no action necessary for a specific accused, but the department might need training, intervention, etc.

As with employee 12 registration, upon registration each employer 14 is provided a unique token that is hashed and stored in the central server database 24. When an employer 14 logs in, the token is sent through the public API 31 so each employer 14 can be differentiated. The public API 31 uses versioning such that each major modification will result into a new API version. This way, employees 12 and employers 14 that haven't downloaded a reporting app update (when updates take place) will still be able to use it, and those who downloaded the update reporting app will also be able to use it. This will also allow the system administrator 22 to provide different user experience and features, but also to give new features only to some people, for example.

In situations where the employer 14 is the subscriber to the victim notification system 10, and as will be discussed below in greater detail, the employer 14 is provided with an immediate alert regarding a report of a possible instance(s) of harassment, bullying or discrimination. Thereafter, in accordance with a protocol developed and put in place between the system administrator 22 and the employer 14, the legal department and/or the human resource department 42 of the company will act in an appropriate manner to remedy the situation. Where the employee 12 does not want to contact the human resource department 42, the employee 12 may indicate that the system administrator 22 of the victim notification system 10 direct a system assistant 45 to conduct an investigation and works with the employer's human resource department 42 to investigate the allegations of the employee 12.

As briefly mentioned above, employers 14 are provided with access to the central operational facility 20, for example, and as will be explained below in more detail, employers 14 are provided with a graphical user interface 47 (displayed on a computer display screen 49 in the form of various interface screens regarding activities (see FIGS. 1A and 46-49). It is contemplated employers 14 will subscribe to the victim notification system 10 and in return are provided various tools based on "data-mining" offered in accordance with the WMMR and discussed below in greater detail.

Figure 46:
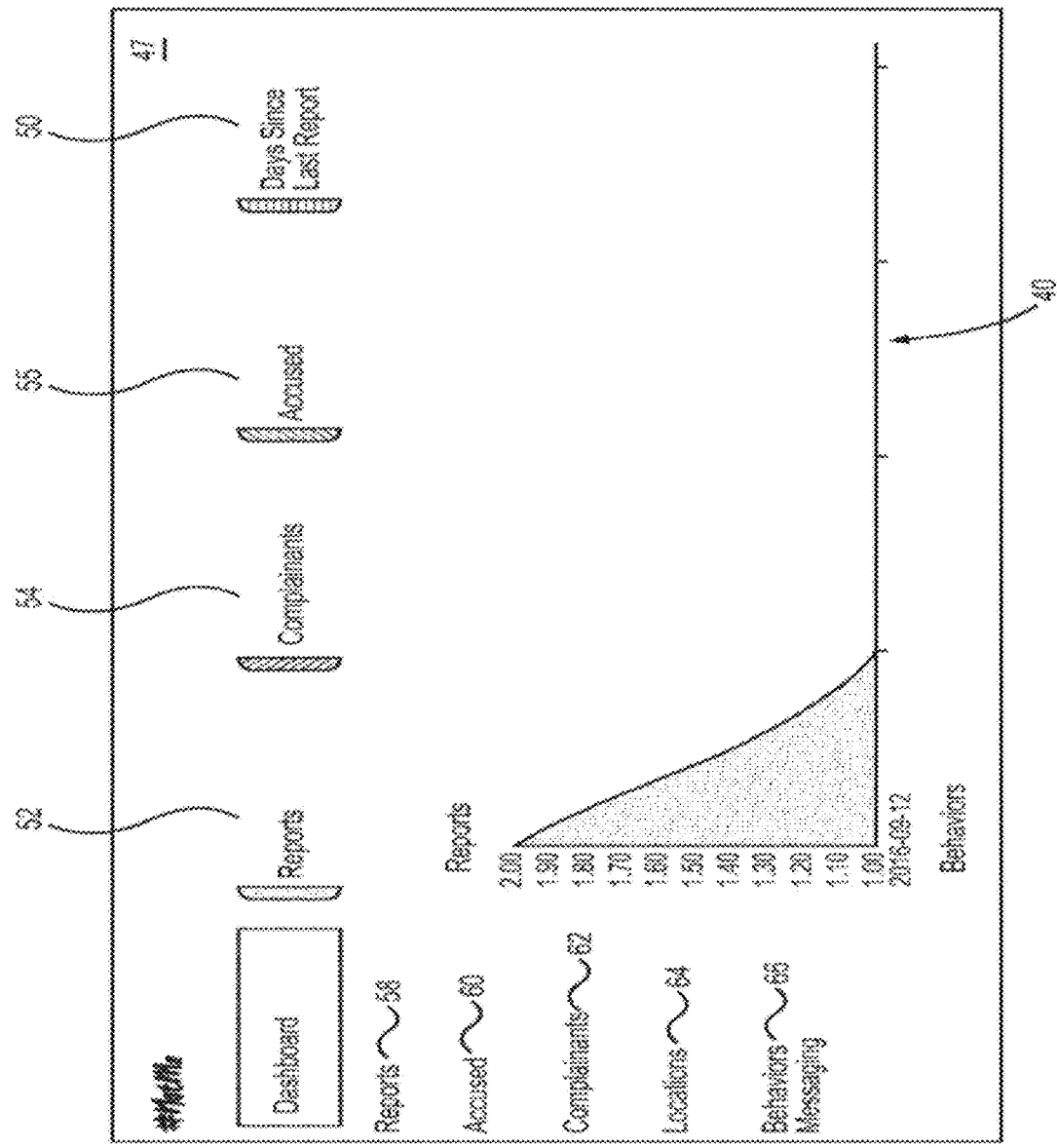

Referring to FIG. 46, the graphical user interface 47 includes a dashboard report 40 that allows the employer 14 to monitor employee registration, identify potential recurrent cases of harassment and/or discrimination, identify problematic employees 12 who may need training or discipline, contact the system administrator 22 of the victim notification system to disclose potential recurrent harassers, and/or allow human resource department 42 and/or supervisor 44 appropriate follow-ups with victims. In accordance with one embodiment, the dashboard report 40 presents an overview of collected data and links to a vast array of information relevant to cases of harassment and/or discrimination within a company. For example, and with reference to FIG. 46, the dashboard report 40 includes a header identifying the days since last report 50, the number of reports 52, the number of complaints 54, and the number of accused 55. The dashboard 40 also provides graphs 58 that may be of interest.

Figure 47:
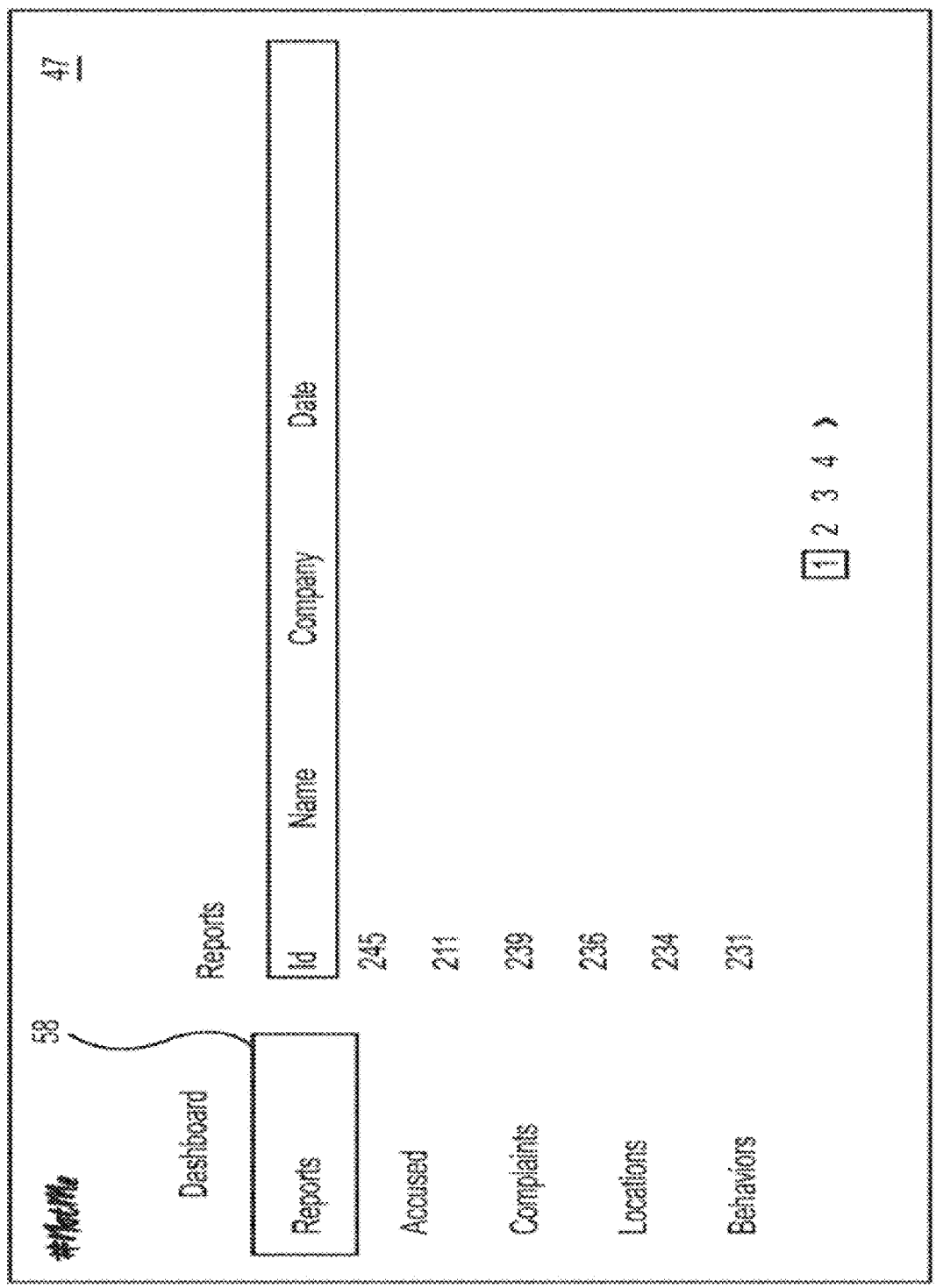
Figure 48:
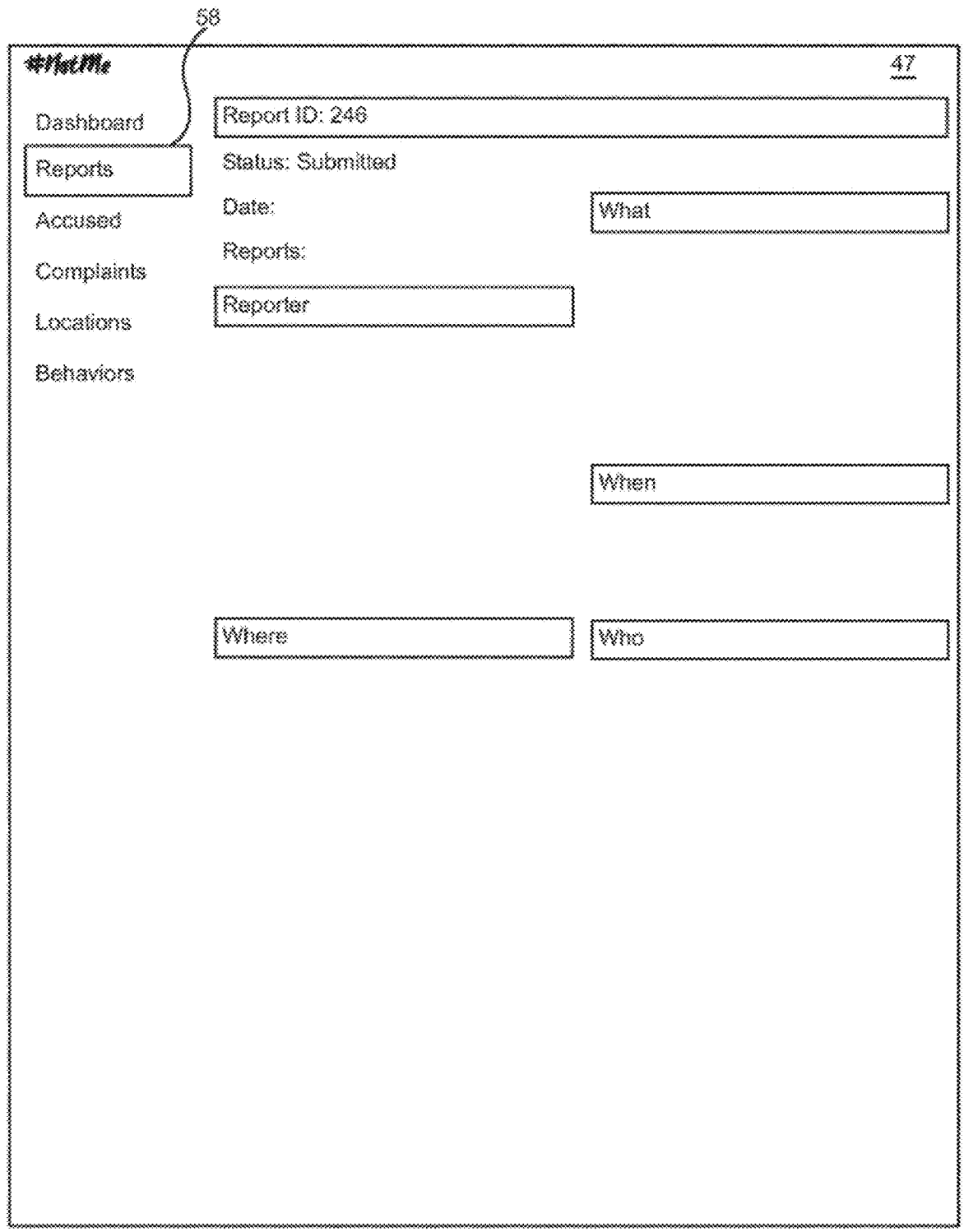
Figure 49:
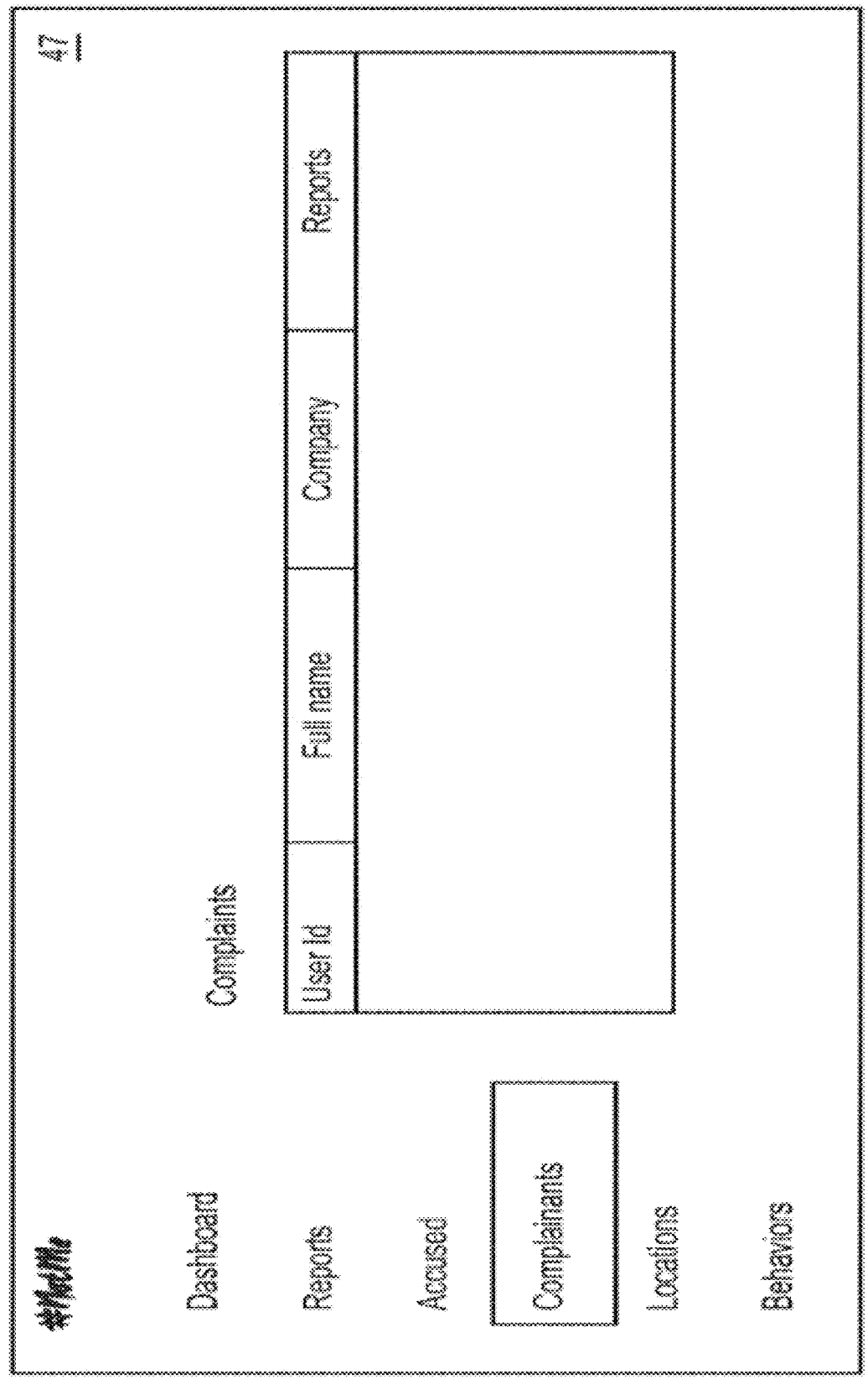

The graphical user interface 47 is further provided with various screens showing a listing of reports accessed via the "Reports" button 58 (see FIGS. 47 and 48, wherein FIG.

shows a listing of reports and FIG. 48 shows the details of individual report), a listing of accused individuals accessed via the "Accused" button 60 (see FIG. 49), a listing of complaints accessed via the "Complaints" button 62, a map identifying the location of the reported activities accessed via the "Locations" button 64, and a cumulative graph of reported activities categorized by the type of behavior being reported accessed via the "Behaviors" button 66. It is well appreciated that various windows with a variety of different information may be presented in the dashboard report 40 depending upon the needs of the employer 14. The various screens discussed above include links to additional information that may be accessed in ways well known to those skilled in the art.

In particular, the dashboard report 40 is linked to all reports filed by employees at a particular employer (subscriber) 14, a listing of all employees 12 who have filed reports through the victim notification system 10, and information regarding specific reports (for example, (a) submitted by _____ on _____ 2018; (b) person being reported about; or (c) type of incident/behavior reported). For each report that is being filed through the victim notification system 10, the dashboard report 40 provides links to: (a) the status of the decision made by company (i.e., to investigate or not); (b) the status of the investigation (access of notes and interview notes, or other documents pertaining to the investigation); (c) the name of witnesses and persons interviewed during investigation; (d) the status of the case (pre-litigation, early resolution, litigation, mediation, arbitration) until resolution (settlement and amount if any, court decision and amount if any paid); (e) the name of in-house people in charge of report in question; (f) the name of plaintiff's lawyer if employee has retained one; (g) the name of counsel and contact information of lawyers/firms representing employer for that specific report; and (h) tracking information regarding open investigations, matters that have been resolved/closed, etc. we will be able to track status of all cases for the employers.

The dashboard report 40 also provides links for accessing reports categorized by those reports filed by same person/employee. Included with such a listing is information regarding all outcomes for all reports filed by same persons and all related data (for example, if lawyers were retained by employees, past resolution/outcome for each reports, etc.). In addition, the dashboard report 40 provides links to access reports categorized by those reports filed about or against same alleged perpetrator, including all related data that can be extracted through data mining. Further, the dashboard report 40 provides links to access reports categorized by those reports filed regarding the same behaviors/instances/incidents that are being reported, including all related data that can be extracted through data mining. Further still, the dashboard report 40 provides links to access reports categorized by reports filed within same business unit/team or reports filed by geographic locations. The dashboard report 40 also provides links to information regarding trends of behaviors/incidents reported, position/job title of alleged perpetrators, position/job title of alleged victims, salary of alleged victims and/or perpetrators, and demographics of victims and/or perpetrators.

In addition to the dashboard report 40, employers are provided with access to an employer alerting system 46 of the victim notification system 10. The employer alerting system provides employers 14 with real-time alerts regarding alleged unlawful and/or inappropriate behavior reported by employees 12 they believe constitutes harassment or discrimination. In accordance with one embodiment, alerts are sent every time a report is filed—if and when—the report necessitates, based on what has been reported, the immediate or not so immediate intervention of the employer so that the employer or other organization can investigate, prevent, correct the behaviors reported, protect the victims, and make sure that the organization complies with its legal obligations. The alerts are sent via push notifications, emails, or phone (calls or text messages), or any other system or means of communication that may exist. This provides employers 14 with a real-time proactive tool to communicate with an employer's workforce, enabling the employer 14 to respond to specific employee questions and situations, and helps the employer 14 better understand, at any given time, the pulse of their organization.

In particular, the employer alerting system 46 provides employers 16 classified alerts based on the severity and pervasiveness of the reported conduct. As such, the employer alerting system 46 of the victim notification system 10 is an employer's data analysis system, or radar, that allows employers 14 to act swiftly and efficiently, either through their human resource department 42 or through other tools provided by the employer alerting system 46 of the victim notification system 10, if and when allegations of harassment and/or discrimination are reported.

With this in mind, the employer alerting system 46 of the victim notification system 10 helps employers 14 with early detection of (i) instances of harassment, discrimination and/or bullying and (ii) patterns of harassment, discrimination and/or bullying and/or cumulative "weak" signals (e.g., individual non-severe instances that are recurrent in an employer's workplace). This provides employers 14 with reporting that can be easily analyzed by experts and the scoring system and used as a critical aid in any subsequent investigation. As such, employer alerting system 46 of the victim notification system 10 provides valuable information, data and analysis early on (before harassment/discrimination charges (claims and lawsuits) are filed) and helps employers 14 proactively comply with corporate values, social responsibilities and legal obligations.

Ultimately, the employer alerting system 46 of the victim notification system 10 provides employers 14 with information creating a safe workplace for employees and a zero-tolerance environment for harassment or discrimination of any sort. As a result, the victim notification system 10 provides a critical early detection tool that restores the missing, but yet so much needed, balance in the workplace by allowing women and men to safely, easily and (if desired) anonymously report conduct that they believe might constitute harassment or discrimination. The victim notification system 10 helps create an effective collaborative system among employees 12 and their employer 14 to protect employees 12 from harassment, discrimination and bullying. Through adoption of the victim notification system 10, employers 14 will be taking an important step towards eradicating harassment, or discrimination or bullying from their workplace.

The victim notification system 10 tracks all of the above information because the information is important and relevant for the employers (or organization) using the victim notification system 10. For example, it is important for the legal or HR department of an employer to, in a centralized manner, keep track of the status of the reports filed and claims made against it or against one of its employees. Employers must know whether claims/reports settled, what resolution/outcome was reached etc., so they can, over time, build data that can help maneuver future reports and perhaps predicts outcomes. Also, it is important for an employer to be able to track and see if an employee has filed multiple reports, to see if there generally is merit in those reports, etc. If an employee has filed several reports that have concluded in high settlements, an employer will want to know that information in its future dealings with the employee. Similarly, employers must and should know if multiple reports have been filed against the same perpetrator. For each perpetrator, the employer should know the number of reports that have been filed, the types of behaviors/incidents that have been reported, and any other pertinent information pertaining to those reports, the perpetrator and victims. This information and data are also relevant because they may impact, influence the scoring system. Finally, the system will also be tracking demographic information such as date of birth and ethnicities of victims, perpetrators or accused perps and witnesses (if and when any).

With the foregoing in mind, the victim reporting and notification system 10 ensures the collection of reported instances of harassment, discrimination and bullying and puts, under certain circumstances, the alleged victim of harassment and/or discrimination in touch with a team of experts, for example, lawyers, psychologists, etc., to help them deal with the situation. Further still, the victim notification system 10 helps the alleged victims of harassment and/or discrimination work with human resources department 20, the system administrator of the victim notification system 10, or third-party enforcement agencies 28 to remedy the situation. Over time, the victim notification system 10 will eliminate sexual harassment, discrimination and bullying from the workplace. The victim notification system enables employers 14 to do a better job in monitoring instances of harassment and discrimination. Through the deployment of the victim notification system 10, an employer can investigate promptly incidences, nip them in the bud, and use the victim notification system 10 as one of its defense mechanisms in the context of litigation.

While the victim notification system 10 provides a service to employees 12, it also provides a service to employer 14 that want to protect their employees as needed by empowering employees and helping them easily and safely report harassment, discrimination, bullying and other unwanted behaviors 12, prevent and diminish instances of harassment and discrimination, improve monitoring of those instances, boost employee morale, and improve their legal and strategic arsenals in dealing with harassment and discrimination related litigation. From a public relations standpoint, subscribing to the victim notification system sends a strong message to a corporation's shareholders, customers, suppliers and employees that the company takes harassment, discrimination and bullying seriously. Ultimately, the victim notification system 10 will help substantially reduce the cost of litigation to an employer. Despite sexual harassment and sensitivity training, etc., employers 14 still are not able to effectively monitor and handle instances of harassment and discrimination. The victim notification system 10 remedies this inability and corrects the problem. Businesses face huge legal and reputational risk if they turn a blind eye to serial perpetrators at any level of the organization, but especially at the top. In today's climate, the wisest business practice is to proactively ferret out inappropriate behaviors and end them swiftly and decisively.

The present system 10 achieves this through the early detection of possible instances of harassment and discrimination and the provision of an early assessment tool. With this in mind, the victim notification system 10 enables employers to address false reporting and helps filter out meritless complaints and false accusations. It also helps employers identify people who have a tendency to report every and all work related interactions. The victim notification system 10 also assists with workplace related investigations, enables employers 14 to monitor situations, encourages and empowers employees 12 to come forward without fear of reprisal and retaliation, enables employers to identify problematic managers and employees 12 that need to be kept on a tight leash, enables employers 14 to identify sexual harassers or perpetrators, and enables employers to nip situations in the bud and terminate employees 12 that need to be disciplined/terminated. Still further, the victim notification system identifies vulnerabilities by harnessing both historical and current complaint data. The victim notification system 10 also helps identify trends by geographic location, business unit or job category, and allows employers 14 to establish and define an employee's approach to investing in responding to harassment and discrimination complaint. Further, the victim reporting and notification system enables the reporter to connect with legal representation to further understand their rights and counselors to deal with the unlawful conduct. Lastly, the system will enable the employer to determine if the reporter is making unlawful claims based on past unsubstantiated similar claims.

While various embodiments have been shown and described, it will be understood that there is no intent to limit the WMMR by such disclosure, but rather, is intended to cover all modifications and alternate constructions falling within the spirit and scope of the WMMR.

Figure 63:
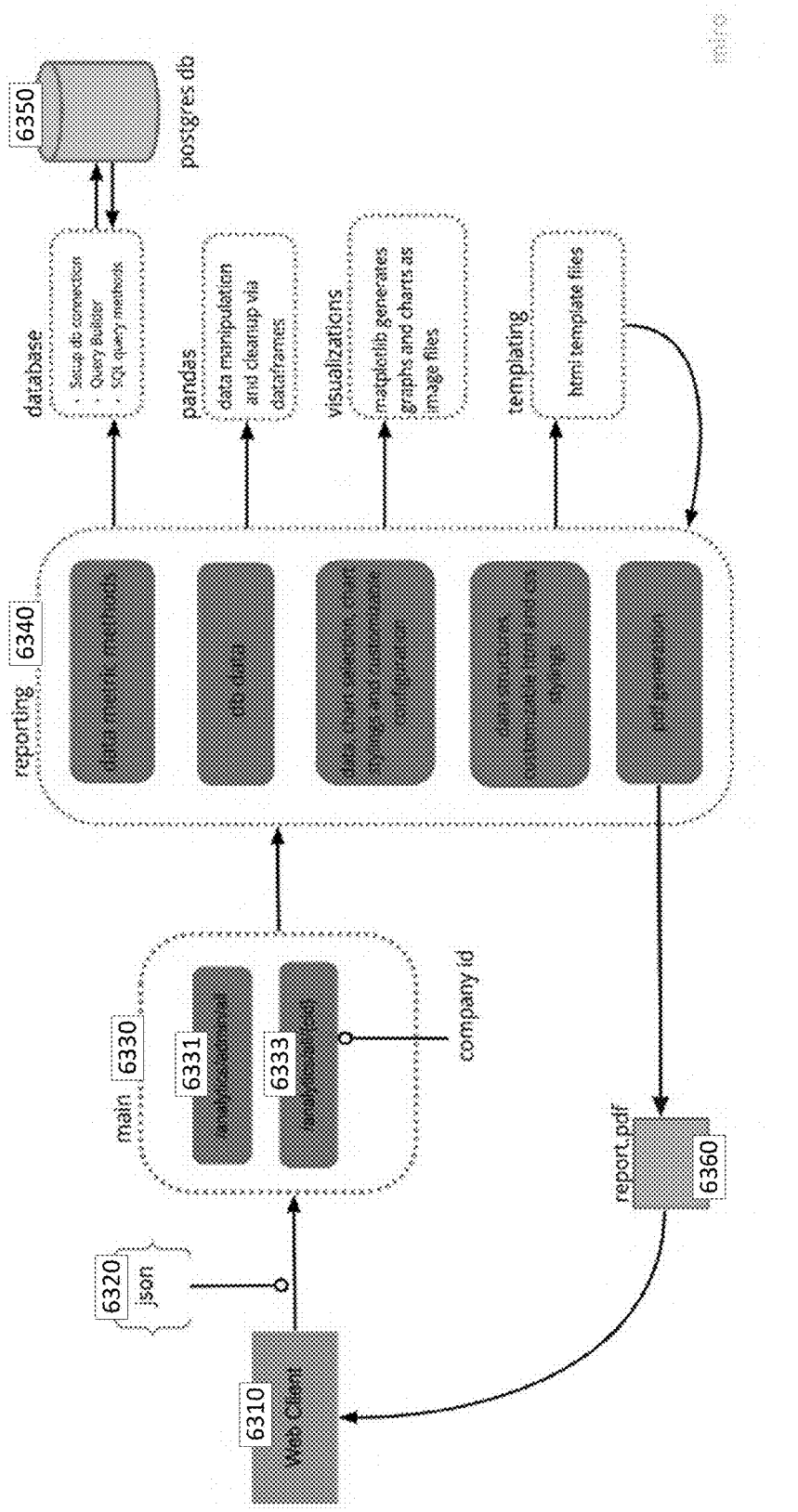
FIG. 63 shows an exemplary architecture of a metrics reporting generation and rendering engine in one embodiment of the WMMR.

FIG. 63 shows an exemplary architecture of a metrics reporting generation and rendering engine in one embodiment of the WMMR. In FIG. 63, an embodiment of how the metrics reporting generation and rendering engine may be utilized to generate a metrics report data structure is illustrated. For example, the metrics reporting generation and rendering engine may be implemented as a microservice written in python that serves data metrics and visualizations by performing SQL queries against a database, generating HTML in-memory and converting it to a PDF file.

As shown in FIG. 63, a user may utilize a web client 6310 to request a metrics report (e.g., from a web server). In one implementation, the user's request may be a request in JSON format 6320. For example, the user's request for a metrics report about available companies (e.g., a summary report) may be as follows:

POST host: 8000/analytics/admin/all
Request:
{
  "date_field": "created_at",
  "date_range": {22
    "start_date": "2019 Jan. 1",
    "end_date": "2021 Jan. 1",
    "operator": "BETWEEN"
  }
}

In another example, the user's request for a metrics report about a particular company (e.g., a company report about the company with company identifier 5) may be as follows:

POST host: 8000/analytics/all/5
Request:
{
  "date_field": "created_at"
  "date_range": {
    "start_date": "2019-01-01",
    "operator": ">="
  }
}

In one implementation, a web API 6330 (e.g., implemented using FastAPI web framework) may be used to create the API. For example, paths 6331 and 6333 may correspond to available API calls that may be utilized by the web client to request different metrics reports. Additional input parameters (e.g., a date range, desired charts, and/or the like) may also be specified in the user's request for a metrics report.

In one embodiment, a reporting component 6340 (e.g., executed by a reporting server) of the metrics reporting generation and rendering engine may comprise a variety of methods that facilitate generating a metrics report data structure (e.g., a report HTML file, a report PDF file) for the metrics report requested by the user. In one implementation, data metric methods may be utilized to retrieve misconduct data (e.g., based on previously submitted (e.g., workplace) misconduct reports) from a datastore, such as a postgres database 6350. For example, a database connection may be set up to the postgres database, and a query builder may be utilized to dynamically generate a set of SQL query strings for the requested metrics report (e.g., to dynamically generate a SQL query string for each chart associated with the requested metrics report) based on the input parameters (e.g., an identifier of a template that is configured to include a set of charts, a date range, and/or the like). Using the query builder to dynamically generate SQL queries improves WMMR efficiency and functionality by allowing for a wide range of dynamically generated charts to be utilized by the WMMR without having to hardcode a SQL query for each chart. Using templates enhances WMMR efficiency and functionality by allowing for a wide range of customization of metrics reports (e.g., report styles, chart types and/or styles) for different users (e.g., different templates for users of different companies, different templates for different report types).

In one implementation, retrieved database data (e.g., a set of result tuples from execution of a SQL query string) may be cleaned up and/or manipulated to convert the retrieved database data into structured chart data (e.g., for a chart associated with the requested metrics report). For example, Pandas may be utilized to implement a conversion function that transforms the retrieved database data into structured chart data (e.g., using DataFrame objects).

In one implementation, structured chart data associated with a chart may be used to generate the chart as an image file (e.g., a PNG file). The chart may be customized using chart styling parameters (e.g., color, size, axis position, label size). For example, Matplotlib may be utilized to implement a chart generator that generates custom charts using structured chart data.

In one implementation, the template and/or CSS stylings may be used to render metrics report HTML for the requested metrics report. The template may use data placeholders (e.g., which may be replaced with Python expressions and/or data structures) to facilitate rendering the metrics report HTML (e.g., using the generated custom charts). For example, Jinja may be utilized to implement a templating engine that facilitates processing the template. In some implementations, the metrics report HTML may be rendered in-memory (e.g., using Jinja loaders to keep the compiled module in memory).

In one implementation, the rendered metrics report HTML may be used to generate a metrics report PDF file 6360 for the requested metrics report. For example, WeasyPrint may be utilized to implement a PDF rendering engine that takes in as a parameter the rendered HTML that Jinja is keeping in memory and renders it to PDF (e.g., along with the images, CSS stylings and formatting). Keeping the metrics report HTML in-memory reduces processing load on the WMMR and improves response time of the WMMR by avoiding a write to disk when responding to user requests (e.g., when rendering metrics report PDF from metrics report HTML and providing the rendered metrics report PDF to the web client, when providing the rendered metrics report HTML to the web client).

The metrics report PDF file may be provided to the web client. For example, the user's request for the metrics report about available companies may receive a response as follows:

Response:
{
  "id": 1,
  "file": "path/to/not-me_<timestamp>.pdf"
}

In another example, the user's request for the metrics report about a particular company (e.g., Baldwin) may receive a response as follows:

Response:
{
  "id": 2,
  "file": "path/to/baldwin_<timestamp>.pdf"
}

Figure 64:
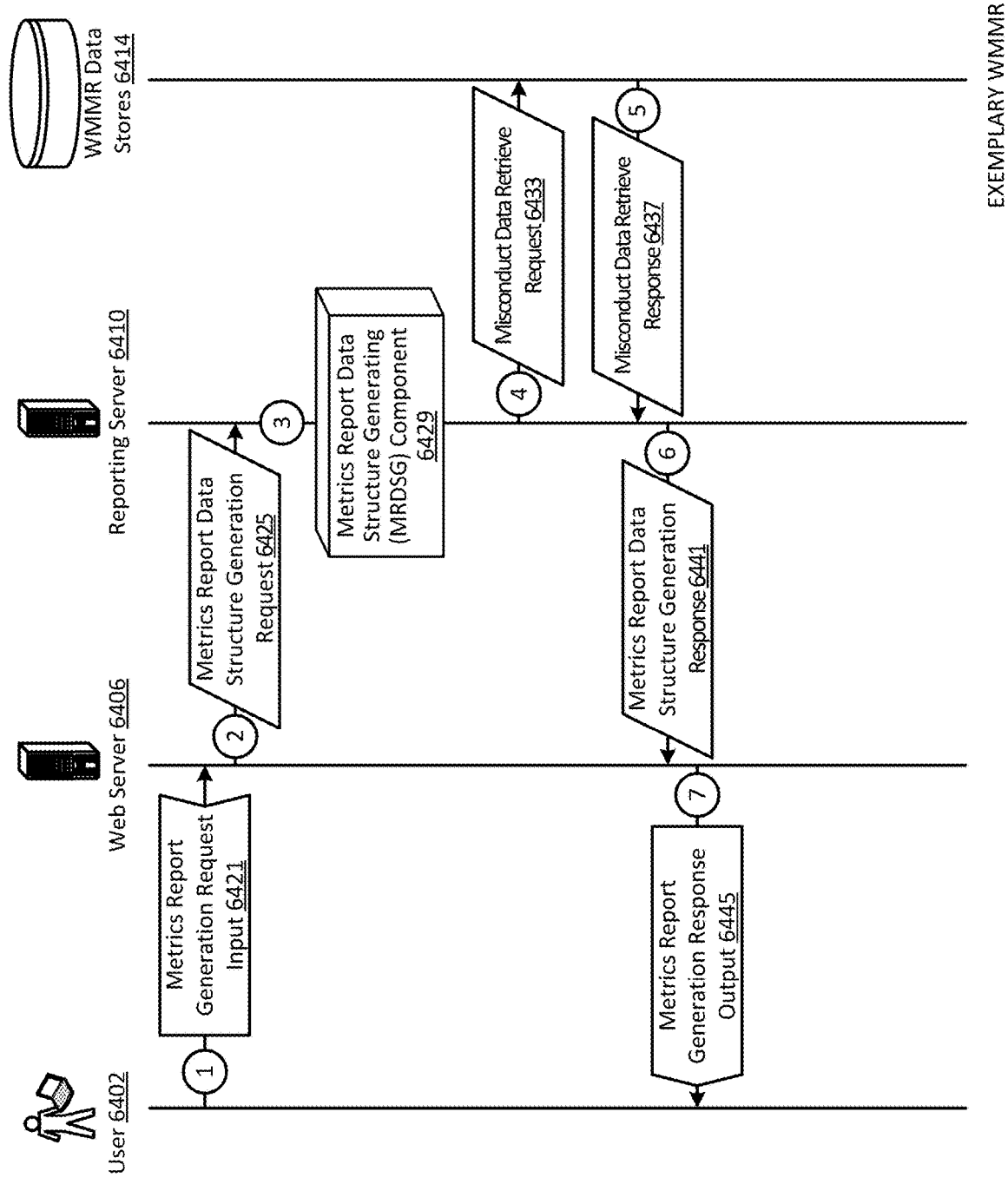
FIG. 64 shows a data flow diagram in one embodiment of the WMMR.

FIG. 64 shows a data flow diagram in one embodiment of the WMMR. FIG. 64 provides an example of how data may flow to, through, and/or from the WMMR. In FIG. 64, a user 6402 may send a metrics report generation request input 6421 to a web server 6406 to request a metrics report. In one embodiment, the user may use a client (e.g., a desktop, a laptop, a tablet, a smartphone, a smartwatch) to access a WMMR website, application (e.g., a desktop application, a mobile app), and/or the like to facilitate generating the metrics report generation request input. See FIG. 66 for an example of a user interface that may be utilize by the user to request the metrics report. See FIG. 73A for examples of metrics reports that may be requested by the user. See FIG. 73B for examples of metrics report input parameters that may be specified by the user to configure the requested metrics report. In one implementation, the metrics report generation request input may include data such as a request identifier, a user identifier, a credential token, a company identifier, filters data (e.g., a date range filter, a reporter type filter, a where it occurred filter, a direct report filter), a template identifier, desired charts, and/or the like. For example, the metrics report generation request input may be sent via a network in XML format substantially in the following form:

<? XML version="1.0" encoding="UTF-8"?>
<metrics_report_generation_request_input>
  <request_identifier>ID_request_1</request_identifier>
  <user_identifier>ID_user_1</user_identifier>
  <credential_token>user's credential token for authentication</credential_token>
  <company_identifier>ID_company_1</company_identifier>
  <filters_data>
    <date_range>
      <date_field>created_at </date_field>
      <start_date>2019 Jan. 1</start_date>
      <end_date>2021 Jan. 1</end_date>
      <operator>BETWEEN</operator>
    </date_range>
    <reporter_type_filter>Self</reporter_type_filter>
    <direct_report>Yes</direct_report>
  </filters_data>

```
    <template_identifier>ID_template_1</template_iden-
        tifier>
</metrics_report_generation_request_input>
```
The web server 6406 may send a metrics report data structure generation request 6425 to a reporting server 6410 to facilitate generating the requested metrics report. In one implementation, the metrics report data structure generation request may include data such as a request identifier, a company identifier, filters data (e.g., a date range filter, a reporter type filter, a where it occurred filter, a direct report filter), a template identifier, desired charts, and/or the like. For example, the metrics report data structure generation request may be sent via a network in XML format substantially in the following form:

```
<? XML version="1.0" encoding="UTF-8"?>
<metrics_report_data_structure_generation_request>
    <request_identifier>ID_request_2</request_identifier>
    <company_identifier>ID_company_1</compa-
        ny_identifier>
    <filters_data>
        <date_range>
            <date_field>created_at </date_field>
            <start_date>2019 Jan. 1</start_date>11
            <end_date>2021 Jan. 1</end_date>12
            <operator>BETWEEN</operator>
        </date_range>
        <reporter_type_filter>Self</reporter_type_filter>
        <direct_report>Yes</direct_report>
    </filters_data>
    <template_identifier>ID_template_1</template_iden-
        tifier>
</metrics_report_data_structure_generation_request>
```

A metrics report data structure generating (MRDSG) component 6429 may utilize data provided in the metrics report data structure generation request to generate a metrics report data structure (e.g., a report HTML file, a report PDF file) for the requested metrics report. See FIG. 65 for additional details regarding the MRDSG component.

The reporting server 6410 may send a misconduct data retrieve request 6433 to WMMR data stores 6414 to retrieve misconduct data (e.g., based on previously submitted (e.g., workplace) misconduct reports) for the requested metrics report. For example, a misconduct data retrieve request may be sent for each chart associated with the requested metrics report. In one implementation, the misconduct data retrieve request may include data such as a request identifier, a SQL query string, and/or the like. For example, the misconduct data retrieve request may be sent via a network in XML format substantially in the following form:

```
<? XML version="1.0" encoding="UTF-8"?>
<misconduct_data_retrieve_request>
    <request_identifier>ID_request_3</request_identifier>
    <SQL_query_string>A dynamically generated SQL
        query for a chart</SQL_query_string>
</misconduct_data_retrieve_request>
```

The WMMR data stores 6414 may send a misconduct data retrieve response 6437 to the reporting server 6410 with the requested misconduct data. In one implementation, the misconduct data retrieve response may include data such as a response identifier, the requested misconduct data, and/or the like. For example, the misconduct data retrieve response may be sent via a network in XML format substantially in the following form:

```
<? XML version="1.0" encoding="UTF-8"?>
<misconduct_data_retrieve_response>
    <response_identifier>ID_response_3</response_iden-
        tifier>
    <requested_data>Result tuples from execution of the
        SQL query</requested_data>
</misconduct_data_retrieve_response>
```

The reporting server 6410 may send a metrics report data structure generation response 6441 to the web server 6406 with the metrics report data structure (e.g., a report HTML file, a report PDF file) for the requested metrics report. In one implementation, the metrics report data structure generation response may include data such as a response identifier, the metrics report data structure, and/or the like. For example, the metrics report data structure generation response may be sent via a network in XML format substantially in the following form:

```
<? XML version="1.0" encoding="UTF-8"?>
<metrics_report_data_structure_generation_response>
    <response_identifier>ID_response_2</response_iden-
        tifier>
    <metrics_report_data_structure>report.pdf</metrics_
        report_data_structure>
</metrics_report_data_structure_generation_response>
```

The web server 6406 may send a metrics report generation response output 6445 to the user 6402 to provide the user with the requested metrics report. In one implementation, the metrics report generation response output may include data such as a response identifier, a link to the metrics report data structure for the requested metrics report, and/or the like. For example, the metrics report generation response output may be sent via a network in XML format substantially in the following form:

```
<? XML version="1.0" encoding="UTF-8"?>
<metrics_report_generation_response_output>
    <response_identifier>ID_response_1</response_iden-
        tifier>
    <metrics_report_link>path/to/report.pdf</metrics_re-
        port_link>
</metrics_report_generation_response_output>
```

Figure 65:
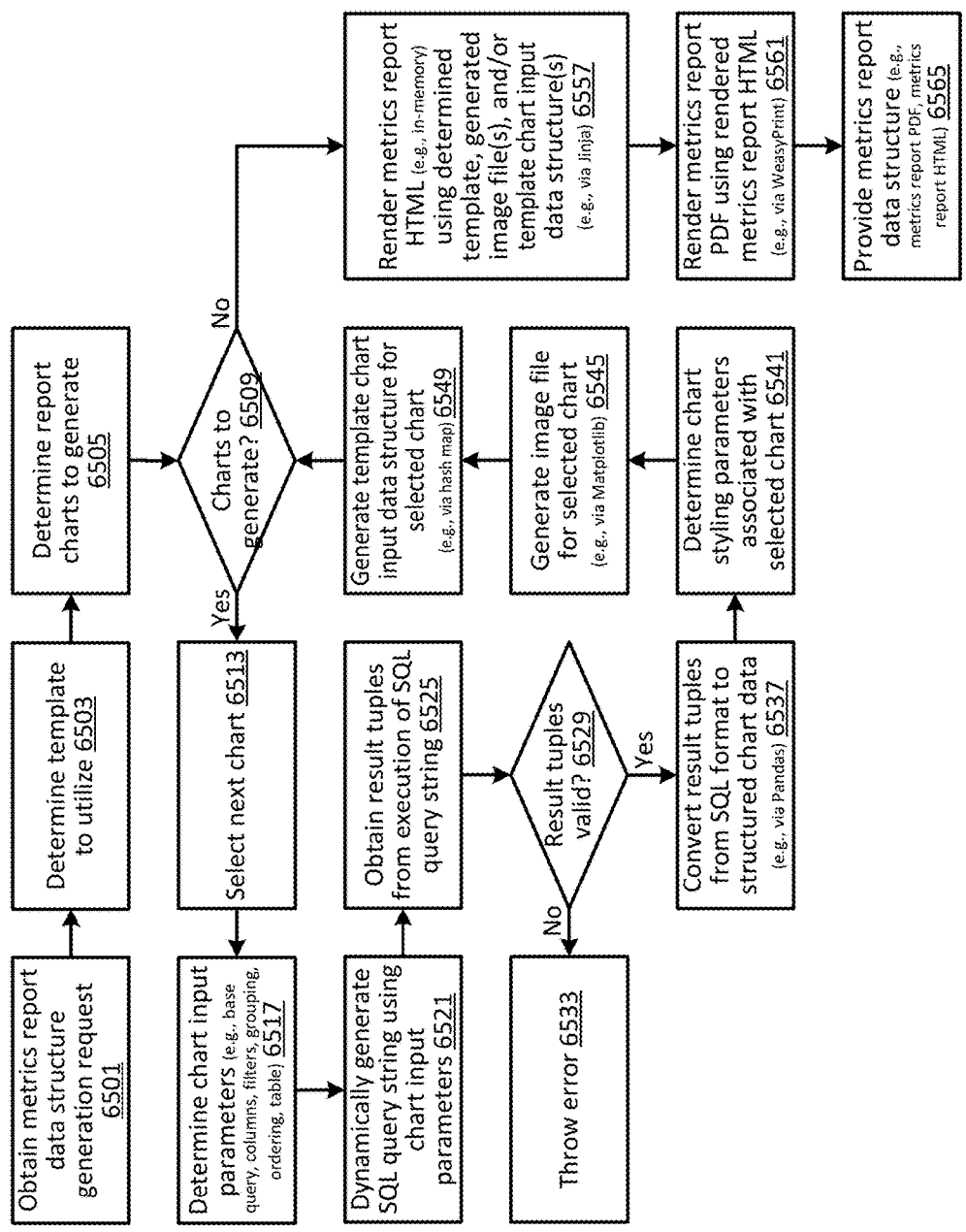
FIG. 65 shows a logic flow diagram illustrating a metrics report data structure generating (MRDSG) component in one embodiment of the WMMR.

FIG. 65 shows a logic flow diagram illustrating a metrics report data structure generating (MRDSG) component in one embodiment of the WMMR. In FIG. 65, a metrics report data structure generation request may be obtained at 6501. For example, the metrics report data structure generation request may be obtained as a result of a user request for a metrics report. In one implementation, the user may use a client to send a JSON request substantially in the following form:

```
Example request body in JSON: {
    "request_id":
    "date_field": "submitted_at",
    "date_range": {8
        "start_date": "2020 Jan. 1",
        "operator": "<="
    }
}
```

In one implementation, the JSON request may be parsed using the FastAPI web framework to convert the JSON data into Python data.

A template to utilize for the requested metrics report may be determined at 6503. For example, the template may be a Jinja powered template that can process Python expressions and data structures, so that data and/or changes to the data may be passed in to create a custom metrics report without changing the template file directly. In one embodiment, multiple templates may be available and/or may be chosen by the user (e.g., some templates may be restricted to users associated with a specific company, some templates may be restricted to WMMR administrators). It is to be understood that templates may differ in visual aspects (e.g., style) and/or in content (e.g., number of charts, types of charts) as each organization may have different needs and may wish to utilize different data and/or charts to identify misconduct patterns. See FIGS. 73C-F for examples of templates (e.g., specifying charts and example values for those charts) that may be utilized by the WMMR. In one implementation, the metrics report data structure generation request May be parsed (e.g., using Python commands) to determine the identifier of the specified template (e.g., based on the value of the template_identifier field). In various alternative implementations, the template identifier may be determined based on a metric report specified by the user (e.g., based on the web framework API call generated as a result of the utilized website path), determined based on a set of charts selected by the user for a metrics report, selected based on a company identifier associated with the metrics report data structure generation request, and/or the like.

Report charts to generate for the requested metrics report may be determined at 6505. For example, a chart may show a particular aspect of misconduct patterns in a workplace. In one embodiment, the template may specify what charts to generate. In one implementation, the template may include Python expressions and/or data structures, for each chart that should be generated, that specify the respective chart's name, chart type (e.g., vertical bar, pie chart), chart styling parameters (e.g., color, size, axis position, label size), chart input parameters (e.g., to provide to a query builder based on metrics report input parameters specified by the user), and/or the like.

A determination may be made at 6509 whether there remain charts to generate. In one implementation, each of the charts that should be generated may be processed. For example, a Python code block for each of the charts may be executed. If there remain charts to generate, the next chart may be selected for processing at 6513. For example, the Python code block for the selected chart may be executed.

Chart input parameters (e.g., base query, columns, filters, grouping, ordering, table) for the selected chart may be determined at 6517. In one embodiment, the chart input parameters for the selected chart may be provided to a query builder to facilitate dynamically generating a SQL query string to obtain data for the selected chart. In one implementation, the query builder may have the following function declaration and parameters:

Function Declaration
def query_builder (base_query, columns=None, filters=None, grouping=None, ordering=None, table=FALSE)
Parameters
base_query (string): base SQL query string (e.g., whether it is a SELECT, INSERT, UPDATE, DELETE or other)
columns (obj): list of columns or fields
filters (obj): hash map of column, operator values for WHERE clause
grouping (obj): list of db fields for grouping
ordering (obj): list of db fields for ordering, default ASC
table (boolean): Whether or not to add the FROM TABLE syntax in query
string: Returns SQL query string In one implementation, the values of chart input parameters provided to the query builder may be determined based on the chart input parameters specified in the template and/or the metrics report input parameters specified by the user (e.g., filters data). For example, the template may specify that a date range filter should be utilized for the SQL query string using the chart input parameters, and the particular values of the start date and/or of the end date for the date range filter may be determined from the metrics report input parameters specified by the user. For example, the following values of chart input parameters may be provided to the query builder:

Values
base_query (string):
value: "SELECT count (*) as count"
explanation: This is the base string of our query
columns (array):
value: array C {table}.company_id', '{table}.id')
explanation: In addition to the base query above, we select additional columns
filters (map):
value: map ("submitted_at"=> "IS NOT NULL", "status_id"=> "={status}")
explanation: Keep records that have a submitted date and the requested status
grouping (array):
value: array C {table}.id')
explanation: Group records by ID
ordering (array):
value: array C {table}.submitted_at')
explanation: Sort records by submitted date
table (boolean):
value: True
explanation: Set this value to "true" to make the query builder add a "FROM" statement to the query A SQL query string for the selected chart may be dynamically generated using the chart input parameters at 6521. In one embodiment, the query builder may be a mechanism that generates SQL statements based on chart input parameters, and may be utilized to dynamically generate SQL queries without having to hard code each SQL query. In one implementation, the query builder may implement the following query building process:

Action input: Add the requested action to perform, whether it's a SELECT, UPDATE, etc.
Columns selectors: Split the list of columns and concatenate to the query with a comma separator
Table selector: If requested, add "FROM {table}" to the query. An input boolean controls this behavior.
Filtering: Iterate through the filters as single items, add separators and conditions. These separators may consist of operators or strings such as "IS", "BETWEEN", ">=", "<=", etc. The conditions may be "AND" or "OR". The parameters from the JSON request may be used. For example, the date range and date filter input parameters are passed to the query builder to output a filtering statement such as "WHERE {date_filter}<OPERATOR> {date1} [AND {date2}]". Note that the second part of the string is optional depending on the parameters sent in the JSON request.
Grouping/Ordering: Join together each parameter and concatenate to the query For example, the query builder may dynamically generate a SQL query string substantially in the following form:
SQL Query
SELECT count (*) as count, {table}.status_id FROM {table}
INNER JOIN {jtable} ON {table}.company_id={jtable}.id
WHERE company_id=% s
AND {table}.created_at
BETWEEN % s AND % s AND {jtable}.status_id=% s
GROUP BY {table}. status_id ORDER BY {table}.status_id where % s are corresponding metrics report input parameters specified by the user (e.g., company identifier, created at start date and created at end date (for misconduct reports))

Result tuples from execution of the SQL query string may be obtained at 6525. For example, the result tuples for the SQL query string above may be a set of tuples with each tuple specifying the number of reports for each report status (e.g., Created, In Progress, Saved, Submitted, In Review, Under Investigation, Resolved). In one implementation, the result tuples may be obtained from WMMR data stores as a Python List of Tuples. For example, the following result tuples may be obtained:

[(5, Created), (3, In Progress), (1, Saved), (12, Submitted), (5, In Review),
(2, Under Investigation), (2, Resolved)]

A determination may be made at 6529 whether the result tuples are valid (e.g., non-empty). If the result tuples are not valid, an error may be thrown at 6533. For example, the user may be informed that an error occurred and/or a WMMR administrator may be notified regarding the error.

If the result tuples are valid, the result tuples may be converted from SQL results format to structured chart data at 6537. For example, Pandas may be utilized to implement a conversion function that transforms the retrieved database data into structured chart data (e.g., using DataFrame objects). In one embodiment, transforming the retrieved database data into structured chart data facilitates the use of result tuples to generate the selected chart. In one implementation, a conversion function may be implemented via Pandas substantially in the following form:

data_frame is a conversion function that takes in an array of tuples from the SQL query results and transform the shape of the data to table format. It also takes in a columns parameter, which is list of column labels and an optional field parameter.
if behavior:
 cdata=pd.data_frame (behavior, columns)
Function Definition
def data_frame (data, columns, cfield=None):
 """Converts list of tuples from SQL to table format in preparation for plotting as well as perform data cleaning responsibilities
 Parameters:
 data (obj): data from SQL
 columns (obj): list of labels
 cfield (string): specific field that should be cleaned
 """
 data=pd.DataFrame (data, columns=columns)
 if len (data)==0:
  return
 if cfield is not None:
  data=clean (data, cfield)
 data=data.dropna ( )
 if data.empty:
  return None
 return data The returned object has attributes and methods for plotting charts and adding chart styling.

Chart styling parameters associated with the selected chart may be determined at 6541. For example, the chart styling parameters may include color, size, axis position, label size, and/or the like. In one embodiment, the chart styling parameters associated with the selected chart may be specified in the template. In one implementation, the template May include Python expressions and/or data structures that specify the chart styling parameters associated with the selected chart. In another embodiment, the chart styling parameters associated with the selected chart may be specified as default parameters for the chart type (e.g., vertical bar, pie chart) of the selected chart. In one implementation, a plotting function associated with the chart type may include Python expressions and/or data structures that specify the default chart styling parameters for the chart type.

An image file for the selected chart may be generated at 6545. For example, Matplotlib may be utilized to implement a chart generator that generates the selected chart as an image file (e.g., a PNG file) using the structured chart data and/or the chart styling parameters associated with the selected chart. In one implementation, a chart generator May be implemented via Matplotlib substantially in the following form:

Call to generate a vertical bar chart, with a specific color:
if cdata is not None: #cleaned data
 vbar_options={"color": "#1e5687"}←chart color option
 behavior_chart=vz.vbar_graph (cdata, columns, vbar_options)←behavior chart
 report_charts ["What is being reported"]=[
  behavior_chart, const.CHART_SIZE]←add the chart title, chart filename and chart styling (e.g., chart size)
Plotting function to generate vertical graph:
def vbar_graph (data, column_names, properties=None, labels=None):
 """Generates a vertical graph"""
 color="#95c3da"←default color
 if properties:
  if "color" in properties:
   color=properties ["color"]
 ←This is where the plotting happens←
 data.plot (kind='bar', x=column_names [1], y='count', zorder=2.5,
  xlabel=" ", figsize=(7.6, 5.5), legend=None, color=color)
 →Stylings←
 plt.rcParams ['font.family']="Campton"
 plt.grid (axis='y', color="#d3d3d3", linewidth=0.5)
 plt.xticks (rotation=30, horizontalalignment="center")
 plt.tick_params(
  labelsize=10,
  axis=('both'),
  which='both',
  bottom=True,
  top=False,
  left=False)
 for pos in ['right', 'top', 'left']:
  plt.gca ( ) spines [pos].set_visible (False)
 vbar_filename=static_path+ "v"+str (uuid.uuid4 ( ) hex)+ ".png"
 plt.savefig (vbar_filename, bbox_inches='tight')
 return vbar_filename For example, the generated chart image file may be stored and deleted after the metrics report PDF is generated. In another example, the generated chart image file may be stored and used to provide the metrics report HTML.

A template chart input data structure for the selected chart may be generated at 6549. In one embodiment, the template chart input data structure for the selected chart specifies information regarding the selected chart, for the template, that facilitates rendering of the metrics report HTML. In one implementation, the template chart input data structure for the selected chart may be generated by adding an entry to a hash map of string to list, where the hash map key of the entry is a string that represents the chart name of the selected chart and the hash map value of the entry is a list that represents [filename, image stylings . . . ] of the selected chart. For example, the hash map entry may be added as follows:

report_charts ["Report Status Breakdown"]=
        [all_status_chart, "style=\" width: 500 px;height: 400 px;\" "]

In another example, the hash map entry may be added as follows:

←passing in css/html strings as hash map keys to image chart and image style values→overview ["<i class='fas fa-building' aria-hidden='true'></i>"]=
    ["New Companies", all_companies, "style="background-color: #1F5688"]

Metrics report HTML for the requested metrics report may be rendered using the determined template, the generated chart image file(s), and/or the generated template chart input data structure(s) at 6557. For example, Jinja may be utilized to implement a templating engine that facilitates rendering the metrics report HTML for the requested metrics report. In one implementation, the template may use data placeholders (e.g., which may be replaced with Python expressions and/or data structures) to facilitate rendering the metrics report HTML (e.g., using the generated chart image files and the associated template chart input data structures). For example, the templating engine may be utilized to render a template substantially in the following form:

In this example, {{ }} represents a passed in value
    <div class=" header ">
        <div class=" header-logos ">
            <img src="./static/not-me.png" class="logo"/>
        </div>
        <h1>Analytics Report-{{company_name}}<span class="subtitle">
            <b> {{subtitle}}</b></span></h1>
    </div>

In this example, {% %} Represents a hash map of string/image values, where key is the chart name and attrib is a list that represents [filename, image stylings . . . ]
    h3>Reports</h3>
    {% for key, attrib in report_chart_main.items ( ) %}
    <section>
        <h4> {{key}}</h4>
        <img src="{{attrib [0]}}" {{attrib [1]}} class="center"/>
    </section>
    {% endfor %}

In this example, no actual HTML files are written to disk. Jinja loaders are utilized to keep the compiled module in memory.
    def render_html (template_name, template_vars):
        env=Environment (loader=FileSystemLoader ('./templates'))
        template=env.get_template (template_name)
        return template.render (template_vars)

In some implementations, the metrics report HTML may be rendered in-memory (e.g., using Jinja loaders to keep the compiled module in memory).

A metrics report PDF for the requested metrics report may be rendered using the rendered metrics report HTML at 6561. For example, WeasyPrint may be utilized to implement a PDF rendering engine that facilitates rendering the metrics report PDF using the rendered metrics report HTML (e.g., along with the chart images, CSS stylings and formatting). In one implementation, the PDF rendering engine may take in as a parameter the rendered metrics report HTML that Jinja is keeping in memory and may render it to a PDF file. For example, the PDF rendering engine may be utilized to render the metrics report PDF as follows:

def generate_pdf (html_template, filename):
        HTML (string=html_template, base_url=".").write_pdf (filename)
        return path.abspath (filename)

A metrics report data structure for the requested metrics report may be provided at 6565. For example, the metrics report data structure for the requested metrics report May be provided via a metrics report data structure generation response. In one implementation, the metrics report data structure for the requested metrics report may comprise the metrics report PDF. For example, the metrics report PDF may be displayed to the user via the user's client (e.g., a browser PDF plugin). In another example, a link to download the metrics report PDF may be displayed to the user via the user's client (e.g., via a web page). In another implementation, the metrics report data structure for the requested metrics report may comprise the metrics report HTML. For example, the metrics report HTML may be displayed to the user via the user's client (e.g., via a web page). See FIGS. 67-72 for examples of metrics reports that may be provided.

Figure 66:
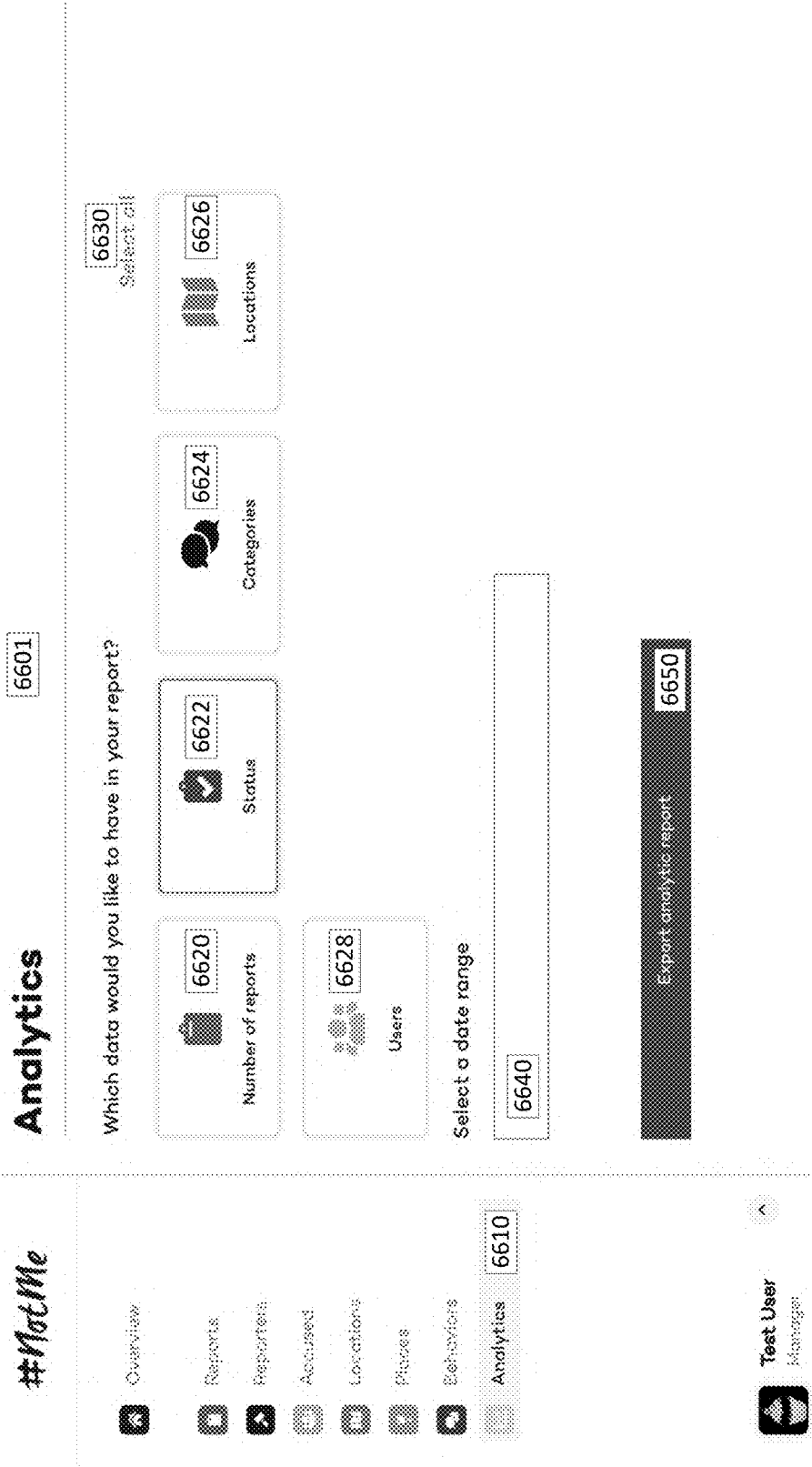
FIG. 66 shows screenshot diagram(s) illustrating a metrics reporting dashboard in one embodiment of the WMMR.

FIG. 66 shows screenshot diagram(s) illustrating a metrics reporting dashboard in one embodiment of the WMMR. In FIG. 66, an exemplary user interface (e.g., for a mobile device, for a website) that may be utilize by a user to request a metrics report is illustrated. The user may utilize an "Analytics" widget 6610 to specify that the user wishes to configure and/or obtain a metrics report. The user may utilize a "Number of reports" widget 6620 to specify that a "Number of Reports Year over Year" chart should be included in the requested metrics report. The user may utilize a "Status" widget 6622 to specify that a "Report Status Breakdown" chart should be included in the requested metrics report. The user may utilize a "Categories" widget 6624 to specify that a "What is being reported" chart should be included in the requested metrics report. The user may utilize a "Locations" widget 6626 to specify that a "Where it is happening" chart should be included in the requested metrics report. The user may utilize a "Users" widget 6628 to specify that a "Number of Users over time" chart should be included in the requested metrics report. The user may utilize a "Select all" widget 6630 to specify that all available charts should be included in the requested metrics report. It is to be understood that different widget may be available to different users (e.g., a WMMR administrator may be shown an additional widget that allows selection of a "Reports Created Per Company" chart, which may be unavailable to users associated with companies that utilize the WMMR; some companies that utilize the WMMR may subscribe to more features than some other companies, and therefore may be provided with access to more charts). The user may utilize a "Select a date range" widget 6640 to specify a date range for the requested metrics report. The user may utilize an "Export analytics report" widget 6650 to request generation of the metrics report.

Figure 67A:
FIGS. 67A-C show screenshot diagram(s) illustrating an exemplary metrics report in one embodiment of the WMMR.
Figure 67:
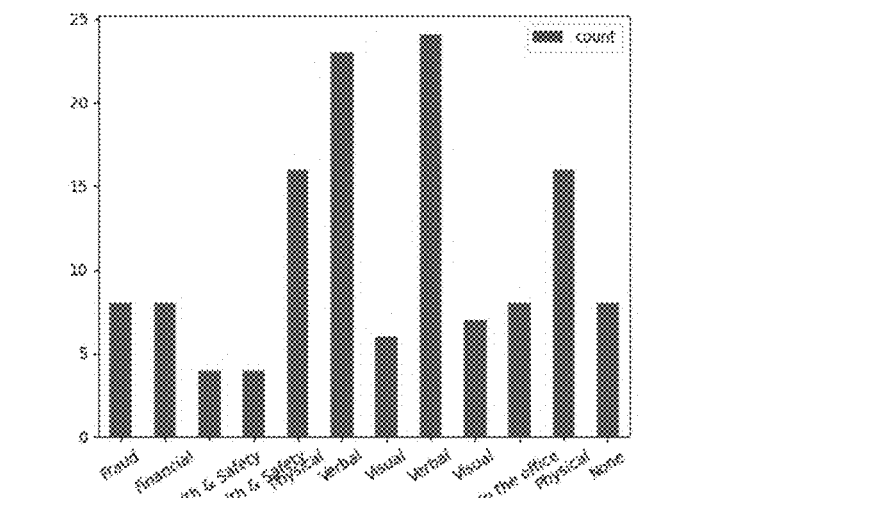
Figure 68:
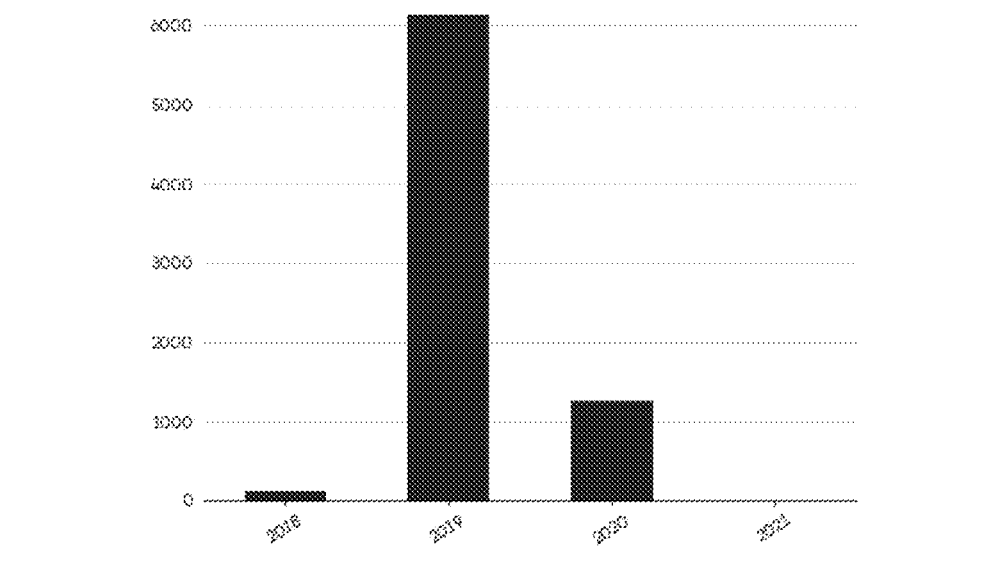
FIGS. 68A-D show screenshot diagram(s) illustrating an exemplary metrics report in one embodiment of the WMMR.

FIGS. 67A-C show screenshot diagram(s) illustrating an exemplary metrics report in one embodiment of the WMMR. For example, this metrics report may be utilized by a WMMR administrator to view a summary report about misconduct reported across companies that utilize the WMMR in aggregate. In FIGS. 67A-C, the metrics report is configured to utilize data in a date range before Jan. 1, 2020, and includes an overview section with report information and a set of report charts.

FIGS. 68A-D show screenshot diagram(s) illustrating an exemplary metrics report in one embodiment of the WMMR. For example, this metrics report may be utilized by a WMMR administrator to view a summary report about misconduct reported across companies that utilize the WMMR in aggregate. In FIGS. 68A-D, the metrics report is configured to utilize data in a date range on or after Jan. 1, 2018, and includes an overview section with report information and a set of report charts.

Figure 69A:
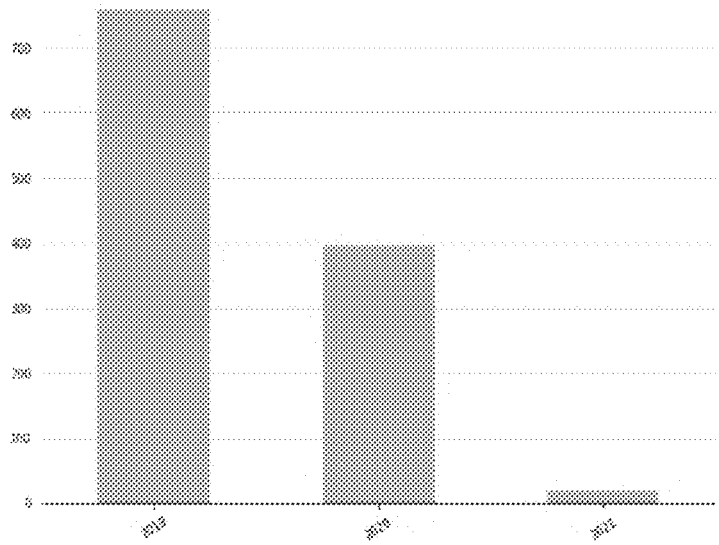
FIGS. 69A-C show screenshot diagram(s) illustrating an exemplary metrics report in one embodiment of the WMMR.
Figure 69:
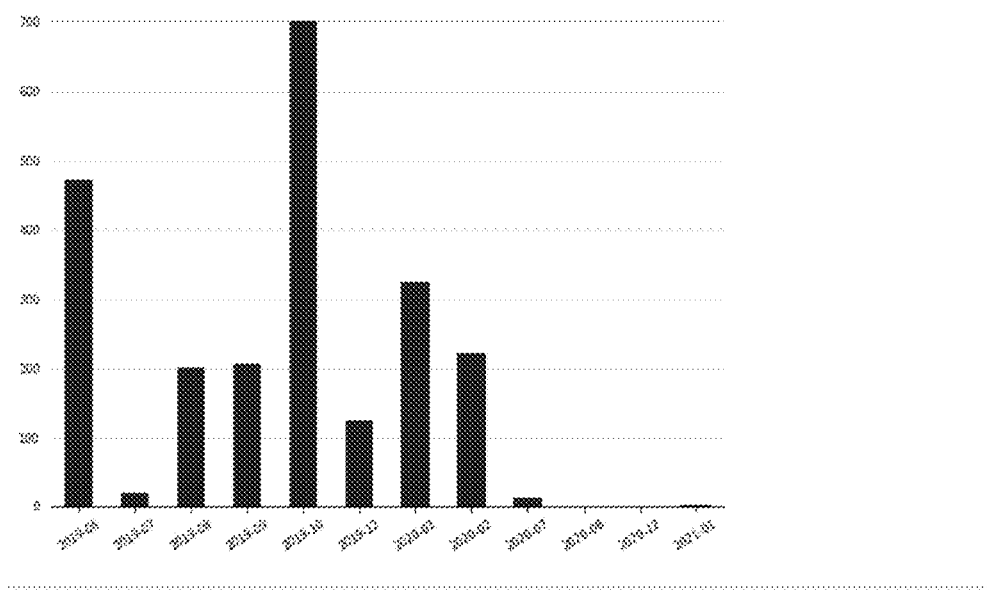

FIGS. 69A-C show screenshot diagram(s) illustrating an exemplary metrics report in one embodiment of the WMMR. For example, this metrics report may be utilized by a user of a company that utilizes the WMMR to analyze misconduct reported by employees of the company. In FIGS. 69A-C, the metrics report is configured to utilize data for Baldwin company in a date range on or after Jan. 1, 2019, and includes an overview section with report information and a set of report charts.

Figure 70A:
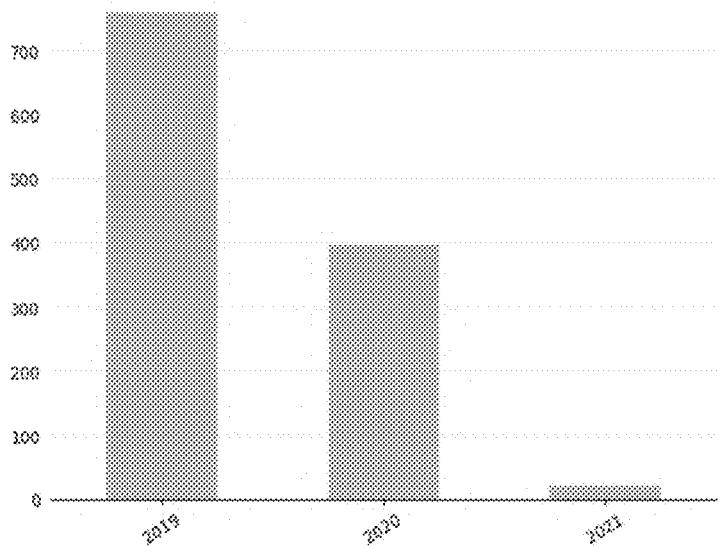
FIGS. 70A-C show screenshot diagram(s) illustrating an exemplary metrics report in one embodiment of the WMMR.
Figure 70:
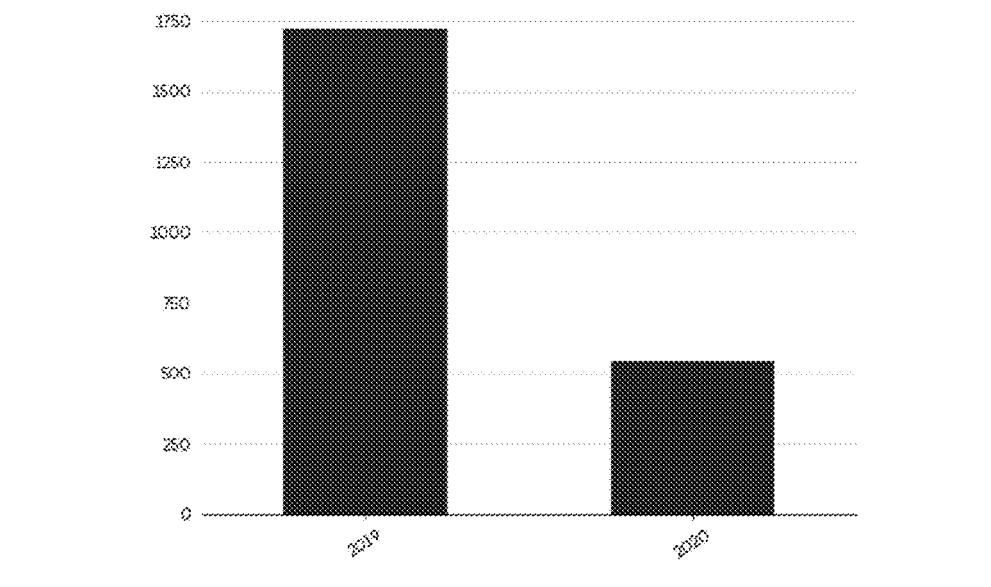

FIGS. 70A-C show screenshot diagram(s) illustrating an exemplary metrics report in one embodiment of the WMMR. For example, this metrics report may be utilized by a user of a company that utilizes the WMMR to analyze misconduct reported by employees of the company. In FIGS. 70A-C, the metrics report is configured to utilize data for Baldwin company in a date range from Jan. 1, 2019 to Mar. 1, 2020, and includes an overview section with report information and a set of report charts.

FIGS. 71A-C shows screenshot diagram(s) illustrating an exemplary metrics report in one embodiment of the WMMR. For example, this metrics report may be utilized by a user of a company that utilizes the WMMR to analyze misconduct reported by employees of the company. In FIGS. 71A-C, the metrics report is configured to utilize data for Clements company in a date range from Jan. 1, 2019 to Mar. 1, 2020, and includes an overview section with report information and a set of report charts.

Figure 72A:
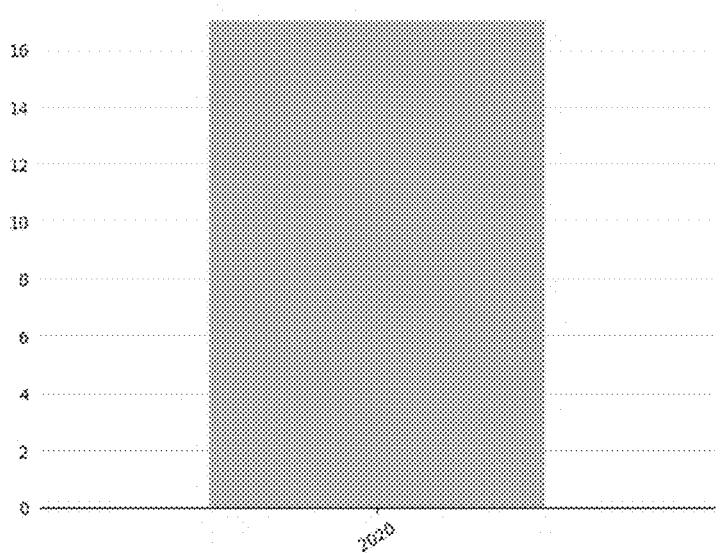

FIGS. 72A-B show screenshot diagram(s) illustrating an exemplary metrics report in one embodiment of the WMMR. For example, this metrics report may be utilized by a user of a company that utilizes the WMMR to analyze misconduct reported by employees of the company. In FIGS. 72A-B, the metrics report is configured to utilize data for Rees company in a date range from Jan. 1, 2019 to Mar. 1, 2020, and includes an overview section with report information and a set of report charts.

FIG. 73A-F show implementation case(s) in one embodiment of the WMMR. In FIG. 73A, examples of metrics reports that may be requested by a user are illustrated. In FIG. 73B, examples of metrics report input parameters that may be specified by a user to configure a metrics report are illustrated. In FIGS. 73C-F, four examples of templates (e.g., specifying charts and example values for those charts) that may be utilized by the WMMR to facilitate generating metrics reports are illustrated.

DETAILED DESCRIPTION OF THE WMMR COORDINATOR

Figure 74:
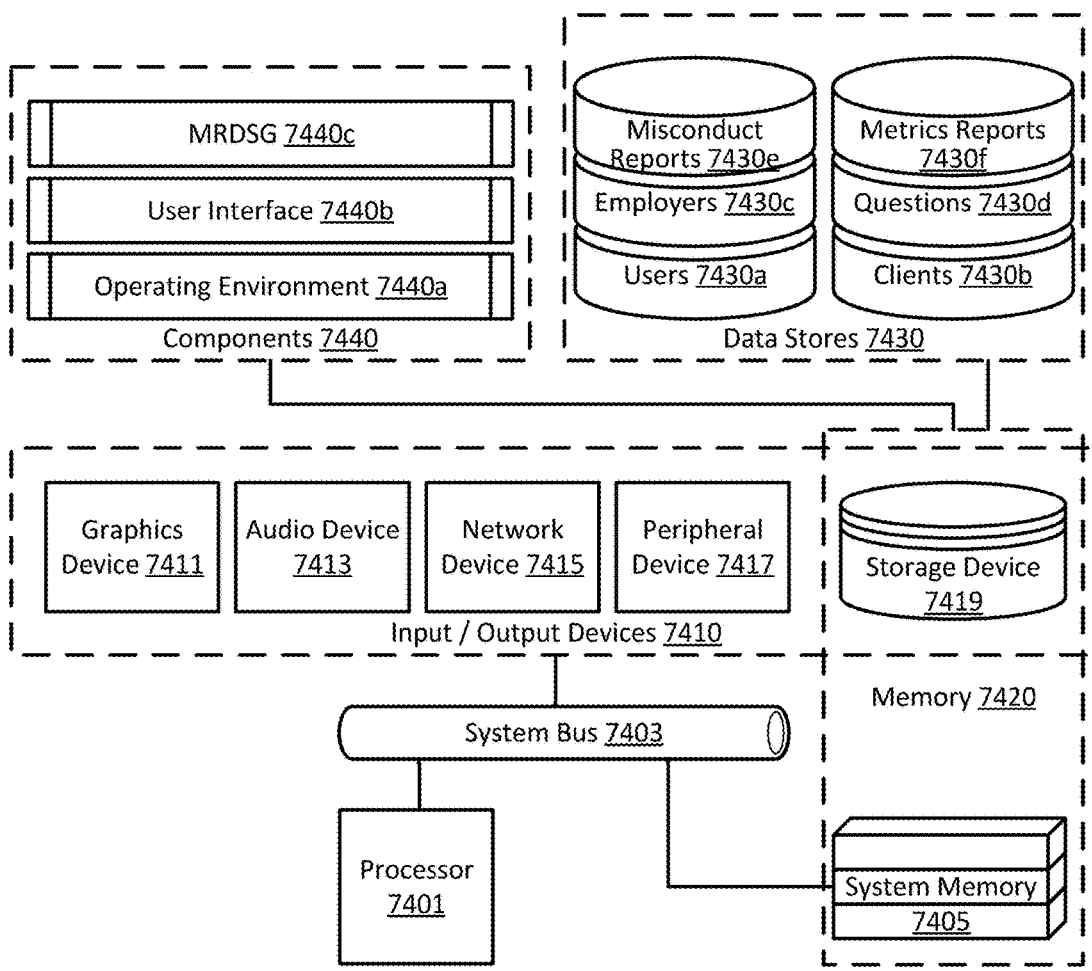
FIG. 74 shows a block diagram illustrating an exemplary WMMR coordinator in one embodiment of the WMMR.

FIG. 74 shows a block diagram illustrating an exemplary WMMR coordinator in one embodiment of the WMMR. The WMMR coordinator facilitates the operation of the WMMR via a computer system (e.g., one or more cloud computing systems (e.g., Microsoft Azure, Amazon Web Services, Google Cloud Platform), grid computing systems, virtualized computer systems, mainframe computers, servers, clients, nodes, desktops, mobile devices (e.g., such as smart phones, cellular phones, tablets, personal digital assistants (PDAs), smart watches, and/or the like), embedded computers, dedicated computers, system on a chip (SOC) devices, and/or the like). For example, the WMMR coordinator may receive, obtain, aggregate, process, generate, store, retrieve, send, delete, input, output, and/or the like data (including program data and program instructions); may execute program instructions; May communicate with computer systems, with nodes, with users, and/or the like. In various embodiments, the WMMR coordinator may comprise a standalone computer system, a distributed computer system, a node in a computer network (i.e., a network of computer systems organized in a topology), a network of WMMR coordinators, and/or the like. It is to be understood that the WMMR coordinator and/or the various WMMR coordinator elements (e.g., processor, system bus, memory, input/output devices) may be organized in any number of ways (i.e., using any number and configuration of computer systems, computer networks, nodes, WMMR coordinator elements, and/or the like) to facilitate WMMR operation. Furthermore, it is to be understood that the various WMMR coordinator computer systems, WMMR coordinator computer networks, WMMR coordinator nodes, WMMR coordinator elements, and/or the like may communicate among each other in any number of ways to facilitate WMMR operation. As used in this disclosure, the term "user" refers generally to people and/or computer systems that interact with the WMMR; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The WMMR coordinator includes a processor 7401 that executes program instructions (e.g., WMMR program instructions). In various embodiments, the processor May be a general purpose microprocessor (e.g., a central processing unit (CPU), an accelerated processing unit (APU)), a dedicated microprocessor (e.g., a graphics processing unit (GPU), a physics processing unit (PPU), a digital signal processor (DSP), a network processor, a tensor processing unit (TPU), a cryptographic processor, a biometrics processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, an embedded dedicated microprocessor utilized as a coprocessor, registers, cache memory, software), may be synchronous (e.g., using a clock signal) or asynchronous (e.g., without a central clock), and/or the like. For example, the processor may be an AMD Ryzen processor, an AMD Epyc processor, an Intel Core processor, an Intel Xeon processor, an ARM Cortex processor, an Apple A processor, an Apple S processor, a Qualcomm Snapdragon processor, an IBM PowerPC processor, and/or the like.

The processor may be connected to system memory 7405 via a system bus 7403. The system bus may interconnect these and/or other elements of the WMMR coordinator via electrical, electronic, optical, wireless, and/or the like communication links (e.g., the system bus may be integrated into a motherboard that interconnects WMMR coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's Infinity Fabric, Intel's QuickPath Interconnect (QPI), a peripheral component interconnect (PCI) bus, a PCI Express bus, a low pin count (LPC) bus, a universal serial bus (USB), and/or the like. The system memory, in various embodiments, may comprise registers, cache memory (e.g., level one, level two, level three), volatile memory (e.g., random access memory (RAM) (e.g., static RAM (SRAM), dynamic RAM (DRAM)), non-volatile memory (e.g., read only memory (ROM), non-volatile random-access memory (NVRAM) (e.g., resistive random access memory (ReRAM), magnetoresistive random access memory (MRAM)), flash memory (e.g., NAND-type)), and/or the like. The system memory may utilize error-correcting code (ECC) technology to detect and/or correct internal data corruption. The system memory may be discreet, external, embedded, integrated into a CPU, and/or the like. The processor may access, read from, write to, store in, erase, modify, and/or the like, the system memory in accordance with program instructions (e.g., WMMR program instructions) executed by the processor. The system memory may facilitate accessing, storing, retrieving, modifying, deleting, and/or the like data (e.g., WMMR data) by the processor.

In various embodiments, input/output devices 7410 may be connected to the processor and/or to the system memory, and/or to one another via the system bus.

In some embodiments, the input/output devices may include one or more graphics devices 7411. The processor may make use of the one or more graphic devices in accordance with program instructions (e.g., WMMR program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., WMMR data). A video card may be connected to the system bus via an interface such as PCI, PCI Express, USB, PC Card, ExpressCard, Thunderbolt, NVLink, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, video projector, and/or the like) that display graphics. For example, a video card may be an AMD Radeon, an NVIDIA Geforce RTX, an Intel UHD Graphics, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be a Hauppauge ImpactVCB, a Hauppauge WinTV-HVR, a Hauppauge Colossus, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 7413. The processor may make use of the one or more audio devices in accordance with program instructions (e.g., WMMR program instructions) executed by the processor. In one implementation, an audio device may be a sound card that may obtain (e.g., via a connected microphone), process, output (e.g., via connected speakers), and/or the like audio data (e.g., WMMR data). A sound card may be connected to the system bus via an interface such as PCI, PCI Express, USB, PC Card, ExpressCard, Thunderbolt, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster, and/or the like. An audio device may be discreet, external, embedded, integrated into a motherboard (e.g., via a chipset), and/or the like. An audio device may operate in combination with other audio devices (e.g., in parallel) to provide improved capabilities, data throughput, audio quality, and/or the like.

In some embodiments, the input/output devices may include one or more network devices 7415. The processor may make use of the one or more network devices in accordance with program instructions (e.g., WMMR program instructions) executed by the processor. In one implementation, a network device may be a network card that may obtain (e.g., via a Category 6 Ethernet cable), process, output (e.g., via a wireless antenna), and/or the like network data (e.g., WMMR data). A network card may be connected to the system bus via an interface such as PCI, PCI Express, USB, FireWire, PC Card, ExpressCard, Thunderbolt, and/or the like. A network card may be a wired network card (e.g., 10/100/1000BASE-T, optical fiber), a wireless network card (e.g., Wi-Fi 802.11ac/ad/ax/ay, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), 5G, and/or the like, satellite modem, FM radio modem, radio-frequency identification (RFID) modem, infrared (IR) modem), and/or the like. For example, a network card may be an Intel Gigabit Adapter, a LINKSYS USB Ethernet Adapter, an ASUS wireless Bluetooth and Gigagbit WiFi adapter, a Motorola SURFboard Cable Modem, a U.S. Robotics Faxmodem, a Zoom ADSL Modem/Router, a TRENDnet Powerline Ethernet Adapter, a StarTech Gigabit Ethernet Multi Mode Fiber Media Converter, a Broadcom NFC controller, a Qualcomm Snapdragon 4G LTE and 5G modem, a Toshiba TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) (e.g., based on IEEE 802.3AD or IEEE 802.1AX standards) may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 7417. The processor may make use of the one or more peripheral devices in accordance with program instructions (e.g., WMMR program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a virtual reality (VR) headset, an augmented reality (AR) headset, a remote control, an audio line-in, an audio line-out, a microphone, headphones, speakers, a subwoofer, an amplifier, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a biometric sensor, a chemical sensor, a magnetometer, a radar, a sonar, a location sensor such as global positioning system (GPS), Galileo, GLONASS, and/or the like), a printer, a fax, a scanner, a copier, a card reader, a fingerprint reader, a pin entry device (PED), a Trusted Platform Module (TPM), a hardware security module (HSM), and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like; wireless such as Wi-Fi, Bluetooth, NFC, cellular, 5G, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the WMMR coordinator with a variety of input, output and processing capabilities.

In some embodiments, the input/output devices may include one or more storage devices 7419. The processor may access, read from, write to, store in, erase, modify, and/or the like a storage device in accordance with program instructions (e.g., WMMR program instructions) executed by the processor. A storage device may facilitate accessing, storing, retrieving, modifying, deleting, and/or the like data (e.g., WMMR data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, Thunderbolt, integrated drive electronics (IDE), serial advanced technology attachment (SATA), non-volatile memory express (NVMe), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, 5G, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool (e.g., for virtual storage, cloud storage, and/or the like). In yet another example, an SSD cache may be used with an HDD to improve speed.

Together and/or separately the system memory 7405 and the one or more storage devices 7419 may be referred to as memory 7420 (i.e., physical memory).

WMMR memory 7420 contains processor-operable (e.g., accessible) WMMR data stores 7430. Data stores 7430 comprise data that may be used (e.g., by the WMMR) via the WMMR coordinator. Such data may be organized using one or more data formats such as a database (e.g., a relational database with database tables, an object-oriented database, a graph database, a hierarchical database, a key-value NoSQL database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, WMMR coordinator elements, and/or the like) to facilitate WMMR operation. For example, WMMR data stores may comprise data stores 7430a-f implemented as one or more databases. A users data store 7430a may be a collection of database tables that include fields such as UserID, UserName, UserPreferences, AssociatedEmployerID, and/or the like. A clients data store 7430b may be a collection of database tables that include fields such as ClientID, ClientName, ClientDeviceType, ClientScreenResolution, and/or the like. A employers data store 7430c may be a collection of database tables that include fields such as EmployerID, EmployerPreferences, AssociatedEmployeeUserIDs, AssociatedQuestionIDs, and/or the like. A questions data store 7430d may be a collection of database tables that include fields such as QuestionID, QuestionType, IsQuestionDefault, IsQuestionCustom, associatedEmployerID, QuestionText, QuestionAvailableResponses, and/or the like. A misconduct reports data store 7430e may be a collection of database tables that include fields such as MisconductReportID, MisconductReportType, MisconductReportStatus, MisconductReportDateTime, AssociatedEmployeeUserID, AssociatedEmployerID, AssociatedWhatAnswers, AssociatedWhereAnswers, AssociatedWhenAnswers, AssociatedWhoAnswers, and/or the like. A metrics reports data store 7430f may be a collection of database tables that include fields such as MetricsReportID, MetricsReportType, MetricsReportTemplate, MetricsReportDateTime, MetricsReportFormat, MetricsReportChartsData, MetricsReportAssociatedEmployerID, and/or the like. The WMMR coordinator may use data stores 7430 to keep track of inputs, parameters, settings, variables, records, outputs, and/or the like.

WMMR memory 7420 contains processor-operable (e.g., executable) WMMR components 7440. Components 7440 comprise program components (including program instructions and any associated data stores) that are executed (e.g., by the WMMR) via the WMMR coordinator (i.e., via the processor) to transform WMMR inputs into WMMR outputs. It is to be understood that the various components and their subcomponents, capabilities, applications, and/or the like may be organized in any number of ways (i.e., using any number and configuration of components, subcomponents, capabilities, applications, WMMR coordinator elements, and/or the like) to facilitate WMMR operation. Furthermore, it is to be understood that the various components and their subcomponents, capabilities, applications, and/or the like may communicate among each other in any number of ways to facilitate WMMR operation. For example, the various components and their subcomponents, capabilities, applications, and/or the like may be combined, integrated, consolidated, split up, distributed, and/or the like in any number of ways to facilitate WMMR operation. In another example, a single or multiple instances of the various components and their subcomponents, capabilities, applications, and/or the like may be instantiated on each of a single WMMR coordinator node, across multiple WMMR coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous Javascript and XML (AJAX), WebSocket Protocol, Simple Object Access Protocol (SOAP), SSL, ColdFusion, Microsoft.NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), web frameworks (e.g., Ruby on Rails, AngularJS), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 7440 may include an operating environment component 7440a. The operating environment component may facilitate operation of the WMMR via various subcomponents.

In some implementations, the operating environment component may include an operating system subcomponent. The operating system subcomponent may provide an abstraction layer that facilitates the use of, communication among, common services for, interaction with, security of, and/or the like of various WMMR coordinator elements, components, data stores, and/or the like.

In some embodiments, the operating system subcomponent may facilitate execution of program instructions (e.g., WMMR program instructions) by the processor by providing process management capabilities. For example, the operating system subcomponent may facilitate the use of multiple processors, the execution of multiple processes, the execution of multiple threads, multitasking, and/or the like.

In some embodiments, the operating system subcomponent may facilitate the use of memory by the WMMR. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Apple File System (APFS), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the WMMR coordinator as a node in a computer network by providing support for one or more communications protocols. For example, the operating system subcomponent may include support for the internet protocol suite (i.e., Transmission Control Protocol/Internet Protocol (TCP/IP)) of network protocols such as IP, IPsec, Mobile IP, TCP, User Datagram Protocol (UDP), and/or the like. In another example, the operating system subcomponent may include support for security protocols (e.g., Wired Equivalent Privacy (WEP), Wi-Fi Protected Access (WPA), WPA2, WPA3) for wireless computer networks. In yet another example, the operating system subcomponent may include support for virtual private networks (VPNs).

In some embodiments, the operating system subcomponent may facilitate security of the WMMR coordinator. For example, the operating system subcomponent May provide services such as authentication, authorization, audit, network intrusion-detection capabilities, firewall capabilities, antivirus capabilities, and/or the like.

In some embodiments, the operating system subcomponent may facilitate user interaction with the WMMR by providing user interface elements that may be used by the WMMR to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, JavaFX, jQuery UI, GTK, Qt, and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Windows Metro, macOS X Aqua, macOS X Flat, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 10, Apple Mac OS X, Apple iOS, Google Android, and/or the like.

In some implementations, the operating environment component may include a database subcomponent. The database subcomponent may facilitate WMMR capabilities such as storage, analysis, retrieval, access, modification, deletion, aggregation, generation, and/or the like of data (e.g., the use of data stores 7430). The database subcomponent May make use of database languages (e.g., Structured Query Language (SQL), XQuery, Cassandra Query Language (CQL)), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, MongoDB, and/or the like.

In some implementations, the operating environment component may include an information handling subcomponent. The information handling subcomponent may provide the WMMR with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent, Bitcoin), and/or the like to handle communication of information such as web pages, files, multimedia content (e.g., streaming media), applications, transactions, and/or the like.

In some embodiments, the information handling subcomponent may facilitate the serving of information to users, WMMR components, nodes in a computer network, web browsers, and/or the like. For example, the information handling subcomponent May comprise a web server such as Apache HTTP Server, Microsoft Internet Information Services (IIS), Oracle Weblogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent May communicate with the database subcomponent via standards such as Open Database Connectivity (ODBC), Java Database Connectivity (JDBC), ActiveX Data Objects for.NET (ADO.NET), and/or the like. For example, the information handling subcomponent may use such standards to store, analyze, retrieve, access, modify, delete, aggregate, generate, and/or the like data (e.g., data from data stores 7430) via the database subcomponent.

In some embodiments, the information handling subcomponent may facilitate presentation of information obtained from users, WMMR components, nodes in a computer network, web servers, and/or the like. For example, the information handling subcomponent may comprise a web browser such as Microsoft Internet Explorer, Microsoft Edge, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate WMMR message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, Messaging Application Programming Interface (MAPI), Facebook API, a custom protocol, and/or the like to facilitate WMMR message communications. The messaging subcomponent may facilitate message communications such as email, instant messaging, Voice over IP (VOIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Domino, IBM Notes, Gmail, ICQ, Trillian, Skype, Google Hangouts, Apple FaceTime, Apple iChat, Facebook Chat, and/or the like.

In some implementations, the operating environment component may include a security subcomponent that facilitates WMMR security. In some embodiments, the security subcomponent may restrict access to the WMMR, to one or more services provided by the WMMR, to data associated with the WMMR (e.g., stored in data stores 7430), to communication messages associated with the WMMR, and/or the like to authorized users. Access may be granted via a login screen, via an API that obtains authentication information, via an authentication token, via a cryptographic key (e.g., stored in an HSM), and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, multi-factor authentication, and/or the like may be used to control access. For example, the security subcomponent may facilitate digital rights management (DRM), network intrusion detection, firewall capabilities, cryptographic wallet access (e.g., for cryptocurrencies such as Bitcoin, Ethereum, and/or the like), and/or the like.

In some embodiments, the security subcomponent may use cryptographic techniques to secure information (e.g., by storing encrypted data), verify message authentication (e.g., via a digital signature), provide integrity checking (e.g., a checksum), authorize transactions (e.g., using a private key), and/or the like by facilitating encryption and/or decryption of data. Furthermore, steganographic techniques may be used instead of or in combination with cryptographic techniques. Cryptographic techniques used by the WMMR may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Elliptic Curve Digital Signature Algorithm (ECDSA)), cryptographic hash functions (e.g., using algorithms such as Message-Digest 5 (MD5), Secure Hash Algorithm 3 (SHA-3)), and/or the like. For example, the security subcomponent may comprise a cryptographic system such as Pretty Good Privacy (PGP).

In some implementations, the operating environment component may include a virtualization subcomponent that facilitates WMMR virtualization capabilities. The virtualization subcomponent may include hypervisors (e.g., Type-1 native hypervisors, Type-2 hosted hypervisors), virtual machines (VMs), and/or the like. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via processing resources virtualization, memory virtualization, storage virtualization, data virtualization, network virtualization, and/or the like. For example, the virtualization subcomponent may comprise VMware software suite (e.g., VMware Workstation, VMware Player, VMware ESXi, VMware ThinApp, VMware Infrastructure), Parallels software suite (e.g., Parallels Server, Parallels Desktop), Virtuozzo software suite (e.g., Virtuozzo Infrastructure Platform, Virtuozzo), Oracle software suite (e.g., Oracle VM Server for SPARC, Oracle VM Server for x86, Oracle VM VirtualBox, Oracle Solaris 11), Wine, and/or the like.

In some embodiments, components 7440 may include a user interface component 7440*b*. The user interface component may facilitate user interaction with the WMMR by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 7440 may include any of the components MRDSG 7440*c*, etc. described in more detail in preceding figures and/or in appendices.

The Embodiments of the WMMR

The entirety of this disclosure (including the written description, figures, claims, abstract, appendices, and/or the like) for MISCONDUCT METRICS REPORTING GENERATION AND RENDERING ENGINE APPARATUSES, METHODS, SYSTEMS AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments May differ. In another example, the organizational, logical, physical, functional, topological, and/or the like structures of the WMMR coordinator, WMMR coordinator elements, WMMR data stores, WMMR components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the WMMR coordinator, WMMR coordinator elements, WMMR data stores, WMMR components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/ or the like. It is to be understood that while some embodiments of the WMMR discussed in this disclosure have been directed to harassment and/or discrimination, the innovations described in this disclosure may be readily applied to a wide variety of other fields and/or applications.

The following is claimed:

1. A reporting and rendering apparatus, comprising:
at least one memory;
at least one processor in communication with the at least one memory, the at least one processor configured to execute processing instructions stored in the at least one memory, in which the at least one processor executes processor-executable instructions to:
  obtain, via the at least one processor, a misconduct metrics report generation request datastructure;
  determine, via the at least one processor, misconduct metrics report parameters associated with the misconduct metrics report generation request datastructure, wherein the misconduct metrics report parameters specify a misconduct metric quantifying harassing, bullying or discriminating conduct;
  dynamically generate, via the at least one processor, a database query for the specified misconduct metric quantifying harassing, bullying or discriminating conduct, wherein the database query operates on structured data associated with existing misconduct reports obtained from at least one victim or witness of harassing, bullying or discriminating conduct;
  transform, via the at least one processor, a set of tuples resulting from execution of the dynamically generated database query into structured chart data for the specified misconduct metric quantifying harassing, bullying or discriminating conduct;
  generate, via the at least one processor, a chart image file for the specified misconduct metric quantifying harassing, bullying or discriminating conduct using the structured chart data for the specified misconduct metric quantifying harassing, bullying or discriminating conduct; and
  generate, via the at least one processor, rendered in-memory HTML using a template file and the generated chart image file for the specified misconduct metric quantifying harassing, bullying or discriminating conduct.

2. The apparatus of claim 1, wherein the misconduct metrics report parameters specify a company identifier for filtering the existing misconduct reports, and wherein the dynamically generated database query utilizes the specified company identifier.

3. The apparatus of claim 1, wherein the misconduct metrics report parameters specify a date range of occurrence of harassing, bullying or discriminating conduct for filtering the existing misconduct reports, and wherein the dynamically generated database query utilizes the specified date range.

4. The apparatus of claim 1, wherein the misconduct metrics report parameters specify the misconduct metric quantifying harassing, bullying or discriminating conduct by specifying a template identifier of the template file, and the misconduct metric quantifying harassing, bullying or discriminating conduct is one of a plurality of misconduct metrics specified in the template file.

5. The apparatus of claim 1, wherein the misconduct metric quantifying harassing, bullying or discriminating conduct is one of: the number of misconduct reports associated with each harassing, bullying or discriminating conduct category, the number of misconduct reports associated with each department of a company, the number of misconduct reports associated with each location of a company, the number of misconduct reports associated with a company.

6. The apparatus of claim 1, wherein structured data associated with an existing misconduct report regarding a misconduct comprises at least one of:
  structured data related to Who is the perpetrator of the misconduct;
  structured data related to What the misconduct is;
  structured data related to Where the misconduct occurred; and/or
  structured data related to When the misconduct occurred.

7. The apparatus of claim 1, wherein the instructions to dynamically generate the database query for the specified misconduct metric quantifying harassing, bullying or discriminating conduct further comprise instructions to:
  determine, via the at least one processor, a base query for the specified misconduct metric quantifying harassing, bullying or discriminating conduct specified in the template file;
  determine, via the at least one processor, a set of columns for the specified misconduct metric quantifying harassing, bullying or discriminating conduct specified in the template file;
  determine, via the at least one processor, a set of filters for the specified misconduct metric quantifying harassing, bullying or discriminating conduct specified in the misconduct metrics report parameters; and
  combine, via the at least one processor, the determined base query, the determined set of columns, and the determined set of filters via a query builder to dynamically generate a database language statement.

8. The apparatus of claim 1, wherein the structured chart data is a data structure in a table format.

9. The apparatus of claim 1, wherein the structured chart data is an object that has attributes and methods for plotting charts and adding chart styling.

10. The apparatus of claim 1, wherein the chart image file for the specified misconduct metric quantifying harassing, bullying or discriminating conduct is generated using chart styling parameters specified in the template file.

11. The apparatus of claim 1, wherein the chart image file for the specified misconduct metric quantifying harassing, bullying or discriminating conduct is generated using default chart styling parameters specified in a plotting function associated with the chart image file's chart type.

12. The apparatus of claim 1, wherein the template file utilizes a datastructure specifying key-value pairs to generate the rendered in-memory HTML, wherein a key specifies a chart name, and wherein a value specifies an image value.

13. The apparatus of claim 12, wherein the image value is a data structure that specifies a chart image file and a set of image stylings.

14. The apparatus of claim 13, further comprising instructions to:
  generate, via the at least one processor, a template chart input data structure associated with the chart image file by adding an entry corresponding to the specified misconduct metric quantifying harassing, bullying or discriminating conduct to the datastructure specifying key-value pairs.

15. The apparatus of claim 1, wherein the template file is structured to utilize data placeholders replaceable with server-side programming language expressions or data structures to generate the rendered in-memory HTML.

16. The apparatus of claim 1, further comprising instructions to:

generate, via the at least one processor, a misconduct metrics report PDF file using the rendered in-memory HTML.

17. A reporting and rendering processor-readable non-transitory physical medium storing processor-executable instructions, executable via at least one processor, to:

obtain, via the at least one processor, a misconduct metrics report generation request datastructure;

determine, via the at least one processor, misconduct metrics report parameters associated with the misconduct metrics report generation request datastructure, wherein the misconduct metrics report parameters specify a misconduct metric quantifying harassing, bullying or discriminating conduct;

dynamically generate, via the at least one processor, a database query for the specified misconduct metric quantifying harassing, bullying or discriminating conduct, wherein the database query operates on structured data associated with existing misconduct reports obtained from at least one victim or witness of harassing, bullying or discriminating conduct;

transform, via the at least one processor, a set of tuples resulting from execution of the dynamically generated database query into structured chart data for the specified misconduct metric quantifying harassing, bullying or discriminating conduct;

generate, via the at least one processor, a chart image file for the specified misconduct metric quantifying harassing, bullying or discriminating conduct using the structured chart data for the specified misconduct metric quantifying harassing, bullying or discriminating conduct; and generate, via the at least one processor, rendered in-memory HTML using a template file and the generated chart image file for the specified misconduct metric quantifying harassing, bullying or discriminating conduct.

18. A processor-implemented reporting and rendering method comprising executing processor-executable instructions, executable via at least one processor, to:

obtain, via the at least one processor, a misconduct metrics report generation request datastructure;

determine, via the at least one processor, misconduct metrics report parameters associated with the misconduct metrics report generation request datastructure, wherein the misconduct metrics report parameters specify a misconduct metric quantifying harassing, bullying or discriminating conduct;

dynamically generate, via the at least one processor, a database query for the specified misconduct metric quantifying harassing, bullying or discriminating conduct, wherein the database query operates on structured data associated with existing misconduct reports obtained from at least one victim or witness of harassing, bullying or discriminating conduct;

transform, via the at least one processor, a set of tuples resulting from execution of the dynamically generated database query into structured chart data for the specified misconduct metric quantifying harassing, bullying or discriminating conduct;

generate, via the at least one processor, a chart image file for the specified misconduct metric quantifying harassing, bullying or discriminating conduct using the structured chart data for the specified misconduct metric quantifying harassing, bullying or discriminating conduct; and generate, via the at least one processor, rendered in-memory HTML using a template file and the generated chart image file for the specified misconduct metric quantifying harassing, bullying or discriminating conduct.

\* \* \* \* \*